(12) United States Patent
Kratchman et al.

(10) Patent No.: US 12,119,760 B1
(45) Date of Patent: Oct. 15, 2024

(54) HIGH-POWER ELECTROSTATIC MACHINES

(71) Applicant: The Charles Stark Draper Laboratory, Inc., Cambridge, MA (US)

(72) Inventors: Louis Beryl Kratchman, Tampa, FL (US); James A. Bickford, Winchester, MA (US); Kasey Russell, Cambridge, MA (US); Paul A. Ward, Dedham, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 17/503,300

(22) Filed: Oct. 16, 2021

Related U.S. Application Data

(60) Provisional application No. 63/092,667, filed on Oct. 16, 2020.

(51) Int. Cl.
  *G01M 7/02* (2006.01)
  *H02N 1/00* (2006.01)
  *H02P 31/00* (2006.01)

(52) U.S. Cl.
  CPC .............. *H02N 1/002* (2013.01); *H02P 31/00* (2013.01)

(58) Field of Classification Search
  CPC ................................ H02N 1/002; H02P 31/00
  See application file for complete search history.

(56) References Cited

U.S. PATENT DOCUMENTS

| | | | | |
|---|---|---|---|---|
| 5,638,260 A | * | 6/1997 | Bees .................... | H02M 3/3376 363/17 |
| 2009/0128121 A1 | * | 5/2009 | Granat ............. | H02M 3/33584 307/31 |
| 2013/0336012 A1 | * | 12/2013 | Broussev ............ | H02M 3/1584 363/16 |
| 2018/0337552 A1 | * | 11/2018 | Osborne ............... | H02J 7/0031 |

* cited by examiner

*Primary Examiner* — Muhammad S Islam
(74) *Attorney, Agent, or Firm* — The Charles Stark Draper Laboratory, Inc.

(57) ABSTRACT

A control circuit for an electrostatic machine includes a current source or sink, an inductor, a switching network coupled between the current source or sink and the electrostatic machine, and between the inductor and the electrostatic machine. A controller is configured to automatically cause the switching network to connect the current source or sink to the electrostatic machine each half-cycle of a periodically alternating polarity. At each polarity alternation, the electrostatic machine is isolated from the current source or sink for a first period of time. At each polarity alternation, the inductor is connected to the electrostatic machine for a second period of time while the electrostatic machine is isolated from the current source or sink, and then disconnect the inductor from the electrostatic machine.

8 Claims, 66 Drawing Sheets

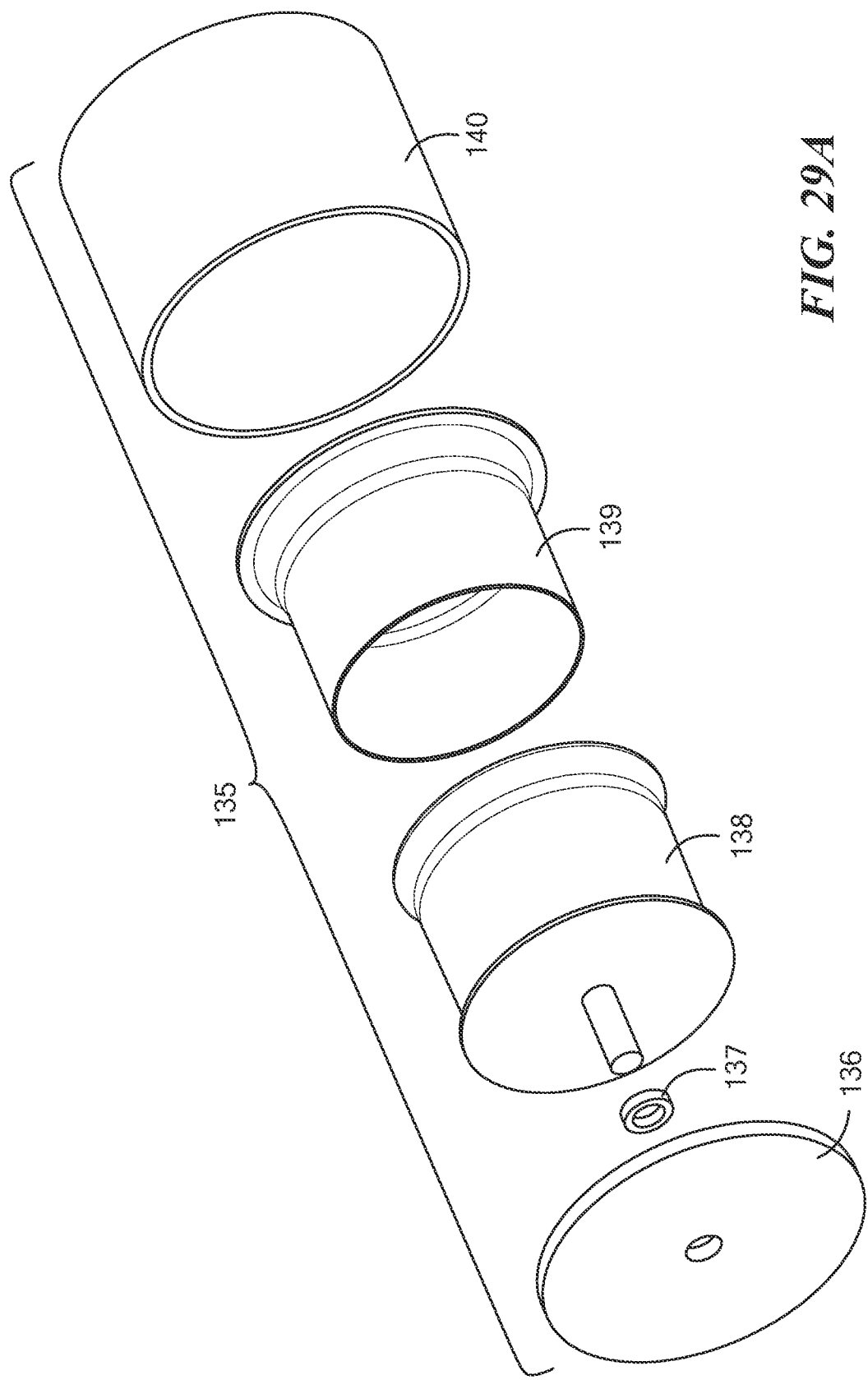

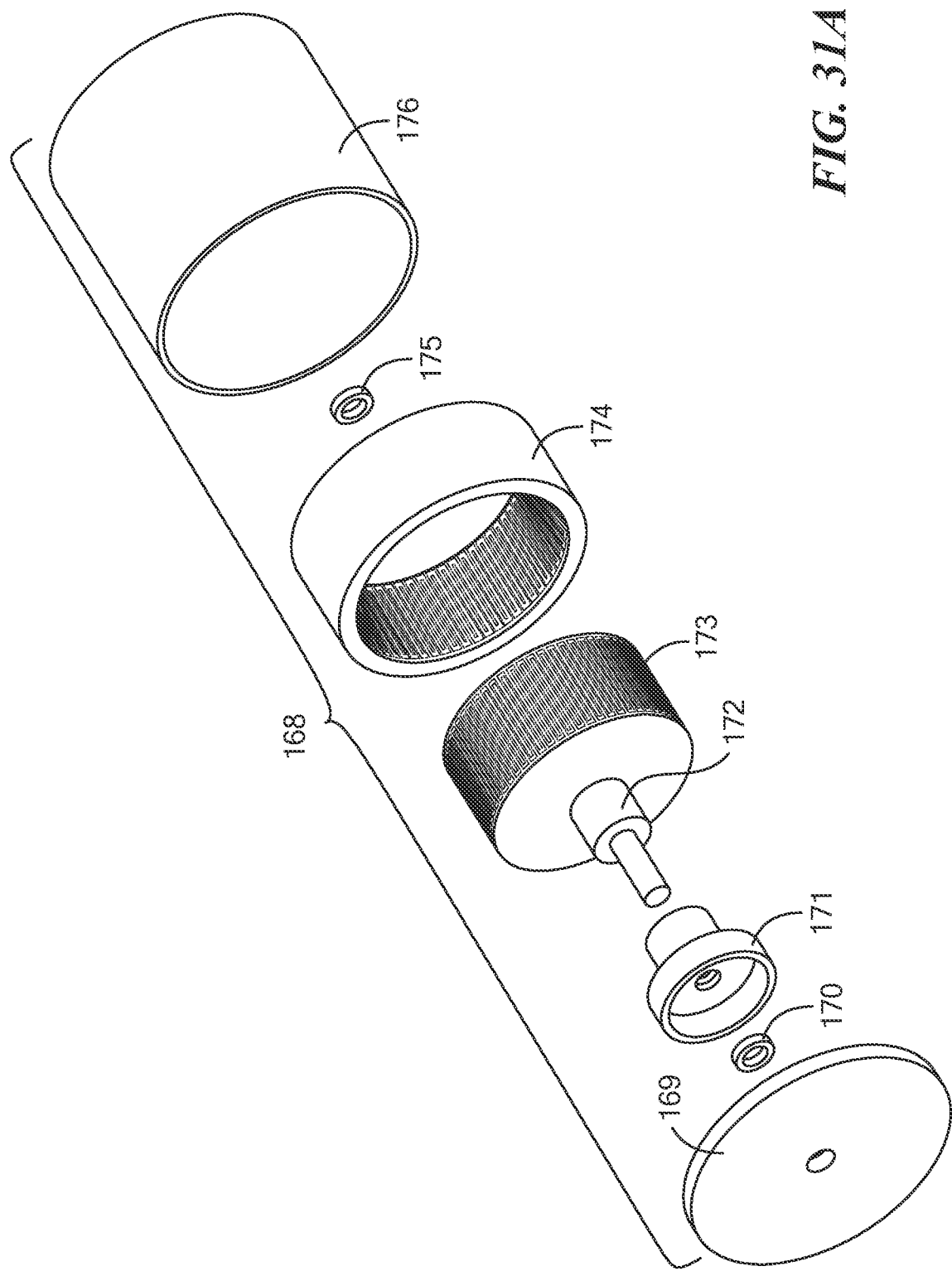

HIGH-POWER ELECTROSTATIC MACHINES

CROSS-REFERENCE TO RELATED APPLICATIONS

This application claims the benefit of U.S. Provisional Patent Application No. 63/092,667, filed Oct. 16, 2020, titled "High-Power Electrostatic Machines," the entire contents of which are hereby incorporated by reference herein, for all purposes.

BACKGROUND

Technical Field

The present invention relates to electrostatic machines and, more particularly, to electrostatic machines that can deliver high mechanical output power when operated as a motor or can generate high electrical power when operated as a generator.

Related Art

Various configurations of electrostatic motors have been used since the mid-1700s. However, these motors performed very poorly and largely fell out of favor as much more powerful electromagnetic motors became available. Most electric motors in use today rely on electromagnetic effects to produce torque, whereas electrostatic motors use electrostatic forces. Early efforts at electrostatic motor design are reviewed in by Oleg Jefimenko, "Electrostatic Motors, Their History, Types, and Principles of Operation," ISBN 978-1935023470, Integrity Research Institute, 2011.

Some early electrostatic motors were constructed with electrets. During the 1980s, several academic groups built MEMS-scale electrostatic motors that did not use electrets. None of these designs can be scaled up to be competitive with conventional electromagnetic motors, as they depend on physical effects suited only to micro-scale construction, inasmuch as they would operate very inefficiently if scaled to dimensions comparable to commercial electric motors.

Recently, Professor Daniel Ludois of the University of Wisconsin founded C-Motive Corporation to commercialize electrostatic motors. The company's electrostatic motor includes interleaved metal pegs or plates, which circulate in a dielectric fluid. See, for example, U.S. Pat. No. 9,479,085, U.S. Pat. Publ. No. 2016/0344306 and U.S. Pat. Publ. No. 2016/0099663.

Prior art electrostatic motors, even prior art electrostatic motors that include electrets or dielectric fluids, suffer from various problems. For example, maintaining proper spacing between rotors and stators, particularly small spacings, is difficult.

SUMMARY OF EMBODIMENTS

An embodiment of the present invention provides a control circuit for an electrostatic machine. The control circuit includes a current source or sink, an inductor, a switching network, and a controller. The switching network is coupled between the current source or sink and the electrostatic machine, and between the inductor and the electrostatic machine. The switching network is configured to automatically cause the switching network to connect the current source or sink to the electrostatic machine each half-cycle of a periodically alternating polarity. At each polarity alternation, the electrostatic machine is isolated from the current source or sink for a first period of time. At each polarity alternation, the inductor is connected to the electrostatic machine for a second period of time while the electrostatic machine is isolated from the current source or sink, and then the inductor is disconnected from the electrostatic machine.

Optionally, in any embodiment, the current source or sink includes a DC source.

Optionally, in any embodiment, the current source or sink includes an AC source.

Optionally, in any embodiment, the current source or sink includes a DC sink.

Optionally, in any embodiment, the current source or sink includes an AC sink.

Optionally, in any embodiment, the inductor is configured to form a resonant circuit with capacitance of the electrostatic machine. The resonant circuit has a resonant frequency related to a speed of operation of the electrostatic machine.

Optionally, any embodiment further includes a snubber in parallel with the inductor.

Optionally, in any embodiment, the switching network includes an H-bridge. The H-bridge includes a first switch, a second switch, a third switch, and a fourth switch. One terminal of the first switch is coupled to one terminal of the third switch at a first node. The first node is connected to a first terminal of the current source or sink. One terminal of the second switch is coupled to one terminal of the fourth switch at a second node. The second node is connected to a second terminal of the current source or sink. The first switch is coupled in series with the second switch at a third node. The third node is on an opposite side of the first switch from the first node, and on an opposite side of the second switch from the second node. The third switch is coupled in series with the fourth switch at a fourth node. The fourth node is on an opposite side of the third switch from the first node, and on an opposite side of the fourth switch from the second node. The third and fourth nodes are connected to respective terminals of the electrostatic machine.

The switching network includes a fifth switch. The fifth switch is in series with the inductor to form a series arrangement. The series arrangement is connected between the third and fourth nodes. The controller is configured to automatically repeatedly actuate the first, second, third, fourth and fifth switches such that the first, second, third and fourth switches open and close to repeatedly alternate polarity of the first and second nodes. At each polarity alternation, the first, second, third and fourth switches are open for at least the first period of time. At each polarity alternation, the fifth switch is closed for the second period of time while all of the first, second, third and fourth switches are open, and then the fifth switch is open.

Optionally, any embodiment also includes a first diode, a second diode, a third diode and a fourth diode. The inductor includes a first inductor and a second inductor. The switch includes a first sub-switch and a second sub-switch. One terminal of each of the first and second sub-switches is grounded.

The first diode, the first sub-switch and the second diode are in series to form a first series switch circuit. The third diode, the second sub-switch and the fourth diode are in series to form a second series switch circuit. The first series switch circuit is in parallel with the second series switch circuit to form a parallel switch circuit. The parallel switch circuit is coupled in series between the first inductor and the second inductor.

Optionally, any embodiment further includes a secondary circuit configured to automatically repeatedly charge the inductor.

Optionally, in any embodiment that includes a secondary circuit, the inductor includes a first winding of a transformer. The transformer includes a second winding. The secondary circuit includes an H-bridge coupled to the second winding. The secondary circuit is configured to automatically repeatedly alternate polarity of power to the second winding.

Another embodiment of the present invention provides a control circuit for an electrostatic machine. The control circuit includes a parallel capacitor-inductor resonant circuit. The parallel capacitor-inductor resonant circuit has an adjustable resonant frequency. An oscillator is coupled in parallel to the resonant circuit and to the electrostatic machine. A controller is configured to automatically repeatedly adjust the resonant frequency to match output frequency of the oscillator.

Optionally, in any embodiment that includes a parallel capacitor-inductor resonant circuit, the resonant circuit includes a variable inductor. The resonant frequency depends at least in part on inductance of the variable inductor. The controller is configured to adjust the inductance of the variable inductor.

Optionally, in any embodiment that includes a parallel capacitor-inductor resonant circuit, the resonant circuit includes a variable capacitor. The resonant frequency depends at least in part on capacitance of the variable capacitor. The controller is configured to adjust the capacitance of the variable capacitor.

Yet another embodiment of the present invention provides a control circuit for an electrostatic machine. The control circuit includes an H-bridge, a resonant drive circuit, and a controller. The controller is configured to automatically couple the H-bridge to the electrostatic machine for operation up to a first operating speed, and to automatically couple the resonant drive circuit to the electrostatic machine for operation above the first operating speed.

Optionally, in any embodiment that includes an H-bridge and a resonant drive circuit, the H-bridge includes a first switch, a second switch, a third switch, and a fourth switch. One terminal of the first switch is coupled to one terminal of the third switch at a first node, and the first node is connected to a first terminal of a current source or sink. One terminal of the second switch is coupled to one terminal of the fourth switch at a second node, and the second node is connected to a second terminal of the current source or sink.

The first switch is coupled in series with the second switch at a third node. The third node is on an opposite side of the first switch from the first node, and on an opposite side of the second switch from the second node. The third switch is coupled in series with the fourth switch at a fourth node. The fourth node is on an opposite side of the third switch from the first node, and on an opposite side of the fourth switch from the second node. The third and fourth nodes are connected to respective terminals of the electrostatic machine.

A fifth switch is in series with the inductor to form a series arrangement. The series arrangement is connected between the third and fourth nodes.

The controller is configured to automatically repeatedly actuate the first, second, third, fourth and fifth switches such that the first, second, third and fourth switches open and close to repeatedly alternate polarity of the first and second nodes. At each polarity alternation, the first, second, third and fourth switches are open for at least the first period of time. At each polarity alternation, the fifth switch is closed for the second period of time while all of the first, second, third and fourth switches are open, and then the fifth switch is open.

The resonant drive circuit includes a parallel capacitor-inductor resonant circuit having an adjustable resonant frequency. An oscillator is coupled in parallel to the resonant circuit and to the electrostatic machine.

The controller is configured to automatically repeatedly adjust the resonant frequency to match output frequency of the oscillator.

An embodiment of the present invention provides a control circuit for an electrostatic machine. The control circuit has two primary modes of operation. In the first mode of operation, the control circuit provides alternating current to the electrostatic machine such that the electrostatic machine is operated as a motor to perform mechanical work. In the second mode of operation, the electrostatic machine is operated as a generator, and the control circuit converts the electrical output of the electrostatic machine to a direct current.

In another embodiment of the invention, the stator of an electrostatic machine is divided into a plurality of regions. Each region contains two conductive paths, formed into a plurality of electrodes. The distance between each region, and the counterfacing surface of a rotor, is measured by measuring the capacitance between conductive paths in each region.

In another embodiment of the invention, the stator of an electrostatic machine is divided into a plurality of regions. Each region contains two conductive paths, formed into a plurality of electrodes. A tunable, all-pass filter causes alternating current power from a power supply to undergo a phase shift. The phase shift is selected to compensate for differences in stator electrode to rotor electrode alignment in different regions of the machine.

In another embodiment, a capacitor is attached to the rotor of an electrostatic machine. The capacitor's terminals are connected to electrodes that face the surface of the rotor. The electrodes may be on the surface or just under the surface, coated with a dielectric. An electrical current is provided at low voltage through a rotary electrical joint and then amplified to charge the capacitor to a high voltage.

In another embodiment, a capacitor is attached to the rotor of an electrostatic machine. The capacitor's terminals are connected to electrodes that face the surface of the rotor. An electrical current is provided at high voltage to charge the capacitor through centrifugal switches, which open when the rotor reaches a predetermined speed.

In another embodiment, an electret is encapsulated within a chamber that is attached to the rotor of an electrostatic machine. The poles of the electret are connected to electrodes that face the surface of the rotor through an electrical circuit that periodically disconnects or reverses the polarity of the connection between the electrets and the electrodes to remove accumulated charges from the electrodes.

In another embodiment, an electrostatic machine comprises an electrostatic generator that provides high voltage to the rotor electrodes of the machine.

In another embodiment an electrostatic machine comprises an electromagnetic generator that provides low voltage, which is amplified to provide high voltage to the rotor electrodes of the machine.

In another embodiment, an electrostatic machine comprises a rotor with two materials arranged in alternating lines and a dielectric fluid. When the rotor rotates, the motion of the rotor relative to the fluid causes the two materials on the rotor to become alternately charged negatively and positively. The charging of materials is caused by the triboelectric effect.

In another embodiment, an electrostatic machine comprises a four degree of freedom manipulator that adjusts the position and orientation of a stator relative to a rotor, or of a rotor relative to a stator.

In another embodiment, an electrostatic machine comprises a stator with a plurality of moveable panels that are actuated such that the distance between each panel and the rotor of the machine can be independently controlled.

In another embodiment, an electrostatic machine comprises a stator with a plurality of moveable panels. An actuator on the rotor adjusts the distances of the panels from the surface of the rotor using protruding spacing elements that set a fixed gap distance. Lockable joints immobilize the panels after their distance has been adjusted.

In another embodiment, an electrostatic machine comprises a stator with a plurality of moveable panels. Springs force the panels towards the surface of the rotor. A flow of pressurized fluid is provided through each panel, forcing each panel to separate from the surface of the rotor by a very small distance.

In another embodiment, a cylindrical shell is divided into sections that are separated by actuators. The actuators are actuated to change the diameter of the cylindrical shell, and to change the shape of the cylindrical shell. The shell is used as the stator or rotor of an electrostatic machine.

In another embodiment, the gap between the stator and rotor of an electrostatic machine is filled with a high pressure fluid that inhibits electrical breakdown. The machine includes a shaft seal to maintain the high pressure by slowing leakage of the fluid where the shaft penetrates the case.

In another embodiment, an electrostatic machine is provided with a heater that heats a dielectric fluid, which occupies the space between the stator and rotor of the machine. Heating the fluid causes its viscosity to decrease, thereby lowering viscous energy dissipation and improving the efficiency of the machine.

In another embodiment, an electrostatic machine is provided with heaters that heat the material that comprises the stator and rotor of the machine. The heaters cause the stator and rotor to expand, thereby providing control of the diameter and shape of the stator and rotor. By controlling the diameter and shape of the rotor and stator, this embodiment enables the rotor-stator gap distance to be controlled to increase the power output of the machine.

In another embodiment, electrodes of an electrostatic machine are coating in a layer of electrically insulating material. The insulating material enables the machine to be operated at high voltages without formation of damaging, high-current electrical arcs.

In another embodiment, the stator of an electrostatic machine contains many more electrodes than the rotor of the same machine. The additional electrodes on the stator enable the circumferential positions of fields generated by the stator to be finely controlled, thereby increasing the power output of the machine.

In another embodiment, an electrostatic machine uses water as a dielectric material, and is operated by applying brief pulses of high voltage to stator electrodes.

Another embodiment of the invention provides a method for manufacturing a stator and rotor of an electrostatic machine from a plurality of deep-drawn, thin-walled cylinders.

BRIEF DESCRIPTION OF THE DRAWINGS

The invention will be more fully understood by referring to the following Detailed Description of Specific Embodiments in conjunction with the Drawings, of which:

FIG. 29A shows an exploded view of an electrostatic machine comprising a stator and a rotor, each further comprised of a plurality of thin, concentric shells, according to an embodiment of the present invention.

FIG. 31A shows an exploded view of an electrostatic machine comprising a port to admit pressurized fluid and a labyrinthine seal to inhibit release of pressurized fluid, according to an embodiment of the present invention.

DETAILED DESCRIPTION OF SPECIFIC EMBODIMENTS

Definitions

Figure 1:
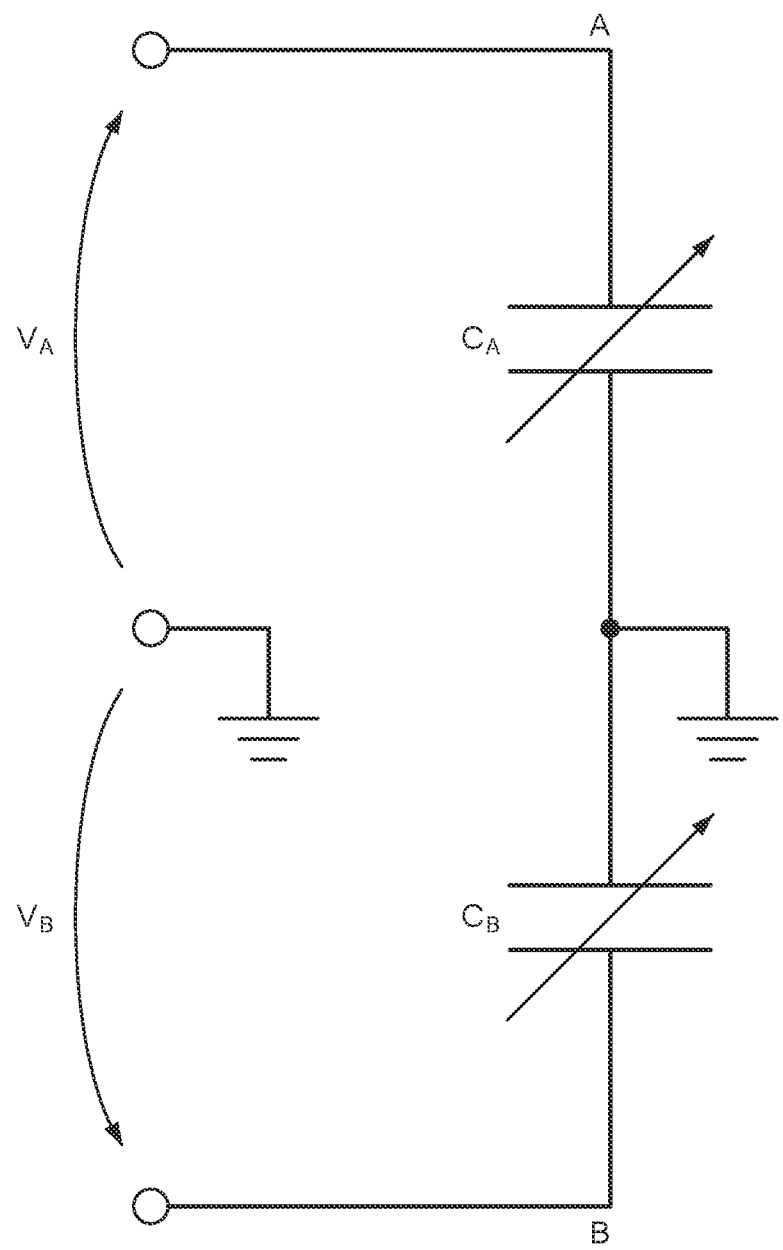
FIG. 1 is a schematic circuit diagram equivalent of a single-phase electrostatic motor with two electrode groups, A and B, and drive voltages VA and VB, respectively, according to the prior art.

As used herein, including in the claims, unless otherwise indicated in context, the following terms shall have the following meanings.

An electrostatic machine is a power conversion device that includes a fixed member, called a stator, and a moving member, called a rotor (for rotational movement) or mover (for translational movement). Thus, an electrostatic machine may be a rotary machine or a translational machine. In a rotary electrostatic machine, the rotor rotates about an axis in space. In a translational electrostatic machine, the moving member translates along a path in space. The path may, but need not necessarily, be linear. However, for simplicity of explanation, the terms "linear electrostatic machine" and "linear machine" are used herein to refer to translational electrostatic machines, even if their moving members translate along non-linear paths, and to distinguish them from rotary machines. Also for simplicity of explanation, rotary electrostatic machines are described, although principles described herein apply to translational electrostatic machines, mutatis mutandis, unless otherwise noted. Thus, examples and explanations that refer to rotors and rotation also apply to translational movers and translation, mutatis mutandis.

Some electrostatic machines operate as motors, and some electrostatic machines operate as generators. Some electrostatic machines can operate as both motors and as generators, although generally not at the same time. When an electrostatic machine is operated as a motor, one or more electrical currents are provided to the electrostatic machine, which causes the moving member to either rotate or translate, depending on whether the machine is as a rotary or a translatory electrostatic machine. When an electrostatic machine is operated as a generator, motion of the moving member causes the electrostatic machine to output one or more electrical currents to an external load. In both motors and generators, the electrostatic machines convert between electrical power and mechanical power.

A power inverter is an electrical device with one or more inputs and one or more outputs. Direct current electrical power is inputted to the inputs of the power inverter. The power inverter converts the direct current electrical power to alternating current electrical power, which is outputted to the outputs of the power inverter.

A saturable reactor is a kind of inductor that includes a permeable core, a first (primary) winding and a second (control) winding. The primary winding is used as an inductor, which is a common component in electrical circuits. A direct current control is applied to the control winding to control the level of saturation in the core. Since the inductance of the primary winding is a function of the permeability of the core, the inductance of the primary winding is controlled by the level of the control current. Alternating current in the primary winding is roughly proportional to the direct current through the control winding.

An all-pass filter is a type of electronic filter that changes the phase relationships of electrical signals applied to its inputs, but does not modify the amplitudes of the same signals.

The phrase "front section view" denotes, if not accompanied by further description, a section view of an electrostatic machine or component therein in which the section cutting plane is orthogonal to the rotational axis of the machine, and is located at the center of the electrostatic machine.

The phrase "side section view" denotes, if not accompanied by further description, a section view of an electrostatic machine or component therein in which the section cutting plane is parallel to the rotational axis of the machine, and passes through the rotational axis of the machine.

As used herein, a "flexure" is a machine element used to store and release mechanical strain energy and to constrain motion to a desired path. A flexure is a kind of spring mechanism, and it shall be understood that in descriptions of embodiments that comprise flexures, these descriptions also include embodiments that comprise a general class of machine elements. Where the word "flexure" is used, in embodiments, either a machined spring or a formed spring, such as a helical coil spring, may be used.

The term "microprocessor" as used herein denotes the broad class of electronic devices that can execute instructions from stored memory. This class comprises microcontrollers, personal computers, field programmable gate arrays (FPGAs), system on chip (SoC) devices, application specific integrated circuits (ASICs), system in package (SIP) devices, and similar devices.

A cylinder (or circular cylinder) is a curvilinear surface, not necessarily a solid. A cylinder is the locus of points traced by a finite-length line segment rotated about an axis, where the line segment is co-planar with the axis, but the line segment is not perpendicular to the axis. The line segment may be straight, curved or formed of a plurality of straight and/or curved sub-segments. If the line segment is parallel to the axis, the cylinder is a conventional right cylinder. If, however, the line segment is not parallel to the axis, the cylinder may be tapered, i.e., shaped like a cone or a portion of a cone.

A circular hollow cylinder (or cylindrical shell) is a three-dimensional region bounded by two circular cylinders having the same axis, two parallel (or at least spaced apart) sides, but different radii, and two parallel (not necessarily equal diameter) annular bases perpendicular to the cylinders' common axis.

The phrase "free state" refers to a condition of a flexible component in which the component is not deformed (e.g., compressed, elongated, or otherwise distorted) by external forces. For example, a helical compression spring in its free state occupies larger volume than when the same spring is compressed by an external force.

High-Power Electrostatic Machines

Electrostatic machines are characterized by the use of electrical fields to store and release energy. A device that stores energy in an electric field is a capacitor, and it is instructive to view electrostatic machines as variable capacitors in which a shaft or other mechanical interface is provided to adjust the capacitance of the machine. When operated as a motor, the capacitance of the machine decreases when mechanical power is outputted as a rotation of the shaft. When operated as a generator, a torque is applied to the shaft, which causes it to rotate and thereby increases the capacitance of the machine.

The mechanical output power, $P_m$, of an electrostatic machine with capacitance C, driven at a voltage V, with a rotor rotating at angular velocity $\omega$ through angle $\theta$, can be approximated by:

$$P_m = VC\frac{dV}{dt} + V^2\omega\frac{dC}{d\theta} - P_L, \quad \text{Equation 1}$$

in which t represents time and $P_L$ represents energy dissipated by various loss mechanisms. Equation 1 indicates that the mechanical output power increases if the drive voltage, capacitance, and $$\frac{dC}{d\theta},$$

the derivative of capacitance with respect to angle, increase.

One problem with constructing an electrostatic machine to operate at very high drive voltages is that there are few switching devices that can be operated reliably at high voltages. Of the available switching devices that can be reliably operated at high voltages, many are inefficient to operate at both high voltages and high frequencies. High-frequency switching (above approximately 50 kHz) is advantageous for operating an electrostatic machine at a fast speed and high output power. For example, silicon-based metal-oxide semiconductor field effect transistors (Si MOSFETS) are commonly used for switching purposes in circuits that drive electric motors, but typically fail at voltages above 1000 V, which are advantageous for driving high power electrostatic machines. Furthermore, switching losses in $S_1$ MOSFETS are proportional to the switching frequency, and motor drive circuits that require switching $S_1$ MOSFETS at high frequency are susceptible to power losses in the form of heat dissipated by the transistors. Other types of transistors, namely wide-bandgap transistors such as those built with silicon carbide (SiC) or gallium nitride (GaN) semiconductor materials, can operate at higher voltages than semiconductors made from silicon semiconductors. However, transistors made from wide-bandgap semiconductors suffer from high thermal dissipation losses at high frequencies. Soft-switching is one commonly used solution to switching at high frequencies. Soft-switching involves circuit topologies that minimize switching losses by causing transistor switching events to occur at zero voltage ("zero-voltage switching" (ZVS)) or at zero current ("zero-current switching" (ZCS)). A disadvantage of soft-switching is that the circuits needed to implement the technique tend to be more complex to design, and to require more components than circuits that do not implement soft-switching.

It is desirable to increase the voltage at which an electrostatic machine is operated, since doing so results in higher mechanical output power when used as a motor, and higher electrical output power when used as a generator. However, the operating voltage of an electrostatic machine is limited by the breakdown strength of the electrodes, which depends on the shapes and materials of the electrodes and the materials between the electrodes. Previous electrostatic machines have used a high vacuum or dielectric fluid to elevate the breakdown voltage between electrodes. However, equipment to produce a high vacuum can increase the cost and complexity of an electrostatic machine, and sealing the machine to maintain a high vacuum requires special components and materials, such as a vacuum-compatible rotary shaft seal. The shape of electrodes may be chosen to reduce the electrical stress near the electrodes, thereby increasing the breakdown voltage. For example, conductors with a circular cross section, a Rogowski profile or a Borda profile, are used in high voltage equipment in favor of conductors with rectangular cross-sections, or other cross-sections with sharp corners. However, conventional manufacturing processes for fabricating closely spaced electrodes include deposition processes and etching processes, which result in flat electrodes with sharp edges with low breakdown voltages in comparison to the breakdown voltages of electrodes with rounded geometries of similar dimensions. Methods exist to deposit round electrodes on a flat surface, however these methods deposit one conductor at a time, and are thus slow and inefficient solutions for fabricating the electrodes of an electrostatic machine, which requires a large number of electrodes, typically several hundred to several thousand electrodes.

Another problem with operating an electrostatic machine at high voltages pertains to electrostatic machines that have an energized rotor. An energized rotor is characterized by electrodes, or electrically charged regions, that are charged by methods other than electrostatic induction charging from fields applied by stator electrodes. One example of an energized rotor is one that is connected to a power supply through a rotary electrical joint. Another example of an energized rotor is one that includes charged electrets, for example as described in U.S. Pat. Publ. No. 2019/0253000, titled "Electrostatic Motor," and assigned to the assignee of the present application, the entire contents of which are hereby incorporated by reference herein, for all purposes. One problem with rotors or movers that require continual delivery of power through rotary or linear electrical joints is that such electrical joints suffer damage when operated at high voltages. For example, slip rings are prone to electrical arcing between brushes and rings when operated at high voltages. Such arcing causes progressive damage to metal surfaces of the slip ring and ejection of debris that can damage or degrade performance of other components of an electrostatic machine, such as bearings or electrode surfaces. A problem with energized rotors or movers that include electrets is that their charge can become depleted when charged particles from the environment accumulate on the surfaces of the electrets.

The operating voltage of an electrostatic machine can be increased by filling the gap between the stator and rotor with a dielectric fluid to prevent arcing. One disadvantage of dielectric fluids, in particular dielectric liquids, is that their viscosity causes a mechanical resistance force, or drag, to be exerted on components as they are moved while in contact with the fluid. One method to reduce viscous drag is to use components that are shaped to minimize the magnitude of drag, such as concentric, smooth-walled cylinders, as described in U.S. Pat. Publ. No. 2019/0253000. Although surfaces can be designed to reduce drag, any remaining magnitude of drag is undesirable as it reduces the power conversion efficiency of an electrostatic machine. Another solution to reduce drag from dielectric liquid is to select a dielectric with very low viscosity, but doing so limits the choice of available liquids, and it is advantageous to select liquids that meet design objectives other than reduced drag, such as dielectric breakdown strength, cost, flammability and environmental safety. Furthermore, although the drag caused by low-viscosity dielectric liquids is lower than the drag caused by high-viscosity liquids, it is still much higher than could be obtained with a vacuum or gas dielectric.

The capacitance of an electrostatic machine, C, can be increased by enlarging the total surface area of electrodes, or by decreasing the distances between electrodes (hereinafter "intra-electrode distances"). We shall distinguish between two types of intra-electrode distances. The first type of distance, which we shall call the "pitch" of electrodes, denotes the spacing between adjacent electrodes that are disposed on a common substrate, such as a stator or a rotor. The second type of distance, which we shall refer to as the "gap" distance, denotes distances between counterfacing electrodes on the stator and rotor, respectively. For both pitch and gap distances, very small distances, under approximately 1000 micrometers, are advantageous for constructing an electrostatic machine with high power output, because such small distances enable a large magnitude of torque to be developed at low voltages relative to larger pitch and gap distances Low voltages are advantageous because they enable use of a wider selection of electronic components, which often have limited voltage ranges. A large magnitude of torque is developed with small distances because torque is proportional to the capacitance, C which is approximately inversely proportional to the gap distance, g:

$$C \propto \frac{1}{g}, \quad \text{Equation 2}$$

For an electrostatic machine, the derivative of electrostatic machine capacitance as a function of rotor angle, $$\frac{dC}{d\theta},$$

can be made large by arranging electrodes on the stator and rotor such that rotation of the rotor through a very small angle causes many counterfacing electrodes to become aligned and overlapping, if initially misaligned, or misaligned, if initially aligned. For example, if electrodes are arranged on both the rotor and stator as parallel, equally spaced, thin strips of conductive material that are oriented approximately parallel to the axis of rotation, rotating the rotor by a small angle will cause a large number of electrodes to suddenly overlap one another, if they were initially non-overlapping. Conversely, if the electrodes initially overlap, a small rotation will cause them to become non-overlapping. The overall capacitance of such an electrostatic machine depends on the total area of overlapping electrodes. Thus, a small angular displacement can result in a large derivative of capacitance, as a result of a suitable arrangement of a large number of electrodes.

To construct an electrostatic machine that supplies high power at relatively low voltages, it is advantageous to use a stator and a rotor with intra-electrode distances (pitch and gap) that are very small in comparison with the dimensions of the stator and rotor. A problem with constructing such a machine is that the positions and orientations of the stator and rotor are likely to become displaced from the positions and orientations they were designed to occupy. Position and orientation displacements occur frequently during the process of assembling a machine from its parts, due to manufacturing non-idealities, such as variations in the dimensions of the parts, and from placement errors that occur when assembling the parts. Since these displacements remain approximately constant during operation of the machine, they are referred to herein as "static displacements." In addition to static displacements, the rotor and stator may become displaced from their respective intended locations during operation of the machine, due to thermal expansion of materials, mechanical vibrations, wear, gravity, electrostatic forces and other physical causes that are not necessarily constant over time. Displacements resulting from causes that vary over time are referred to herein as "dynamic displacements." Regardless of whether displacements of parts are static or dynamic, if the rotor or stator become displaced by distances close to the intra-electrode distances, the electrodes can become misaligned, to an extent that the performance of the machine is significantly degraded. For example, if the rotation axis of the rotor undergoes a large displacement in a radial direction from the rotation axis of the stator, a portion of the counterfacing electrodes on the stator and rotor may become misaligned. A consequence of this misalignment is that a portion of the rotor may experience a positive torque, while another portion experiences a reduced or even negative torque. Furthermore, if static or dynamic displacements are sufficiently large, the rotor and stator may physically collide during rotation, thereby damaging one or both the rotor and/or stator, or causing the machine to become seized.

Components of an electrostatic machine may become distorted, in addition to becoming statically or dynamically displaced. The shape of a distorted component differs from the shape it was designed to have. Static distortions can result from manufacturing errors and residual stresses. Dynamic distortions can result from the same time-varying forces that cause dynamic displacements. Dynamic distortions can cause parts to mechanically collide, resulting in seizure and/or damage to the machine.

One solution to avoid static distortions of parts and static displacements of parts during assembly of an electrostatic machine is to prescribe very small manufacturing tolerances for the parts, but doing so raises the cost and time required to fabricate them. Static displacements that occur during assembly can be reduced by very accurate assembly methods, but such methods require special equipment, and require more time to implement than assembly methods that require lower accuracy.

One solution to avoid dynamic displacements and dynamic distortions of parts is to design the parts to be very rigid. Rigid parts can be constructed by using stiff materials and by choosing part dimensions that provide rigidity. However, many stiff materials, such as steel, are dense and therefore use of these materials would increase the weight of an electrostatic machine. Other stiff materials, such as carbon fiber-reinforced polymers, are not dense, but are expensive to manufacture. Rigidity may also be provided by using materials that are not stiff by designing parts with certain dimensions that are made large to provide rigidity. For example, a rigid stator having the shape of a cylindrical shell can be made from a material with relatively low stiffness by making the shell very thick. However, the quantity of material needed to form a thick shell increases the weight of the machine, as compared to a thin shell, and also reduces the space available to place other components within the volume of the machine.

Components of an electrostatic machine can undergo dynamic displacements during temperature variations if components are made of materials with different coefficients of thermal expansion (CTE). As an example of a problem that can result from such displacements, the rotor-stator gap could close if the rotor expands more than the stator, resulting in damage to the rotor and stator as the two components rub against one another. Such displacements can be reduced by designing the machine to be made of materials with similar CTEs, for example. However, selecting materials based on their CTEs limits the choice of materials. It is advantageous to have available a wide choice of materials to optimize the design to meet other design objectives, such as to minimize the weight and cost of the machine, and to maximize the operating voltage.

From an electrical standpoint, electrostatic motors are time-varying capacitors. Although the time variation of capacitance is the key component that enables mechanical work to be done, the overall capacitive nature of the motor is what dictates the design of the drive electronics. For a bipolar electrostatic motor with two electrode groups 'A' and 'B,' the equivalent circuit is given by FIG. 1. This is just for a single-phase motor. One approach to making a multi-phase motor would be to simply have single-phase units operating in parallel within the motor. In many cases, the electrodes A and B are on the stator, whereas the rotor has electrets or electrodes (either AC or DC, including 0V), the motion of which within the stator causes the time-variation of capacitance observed on the stator terminals. Typically, the motor has many electrodes that alternate in a repeating pattern. For a single-phase motor, this pattern is simply ABABAB, etc. FIG. 1 is a schematic circuit diagram equivalent of a single-phase electrostatic motor with two electrode groups, A and B, and drive voltages VA and VB, respectively.

Figure 2:
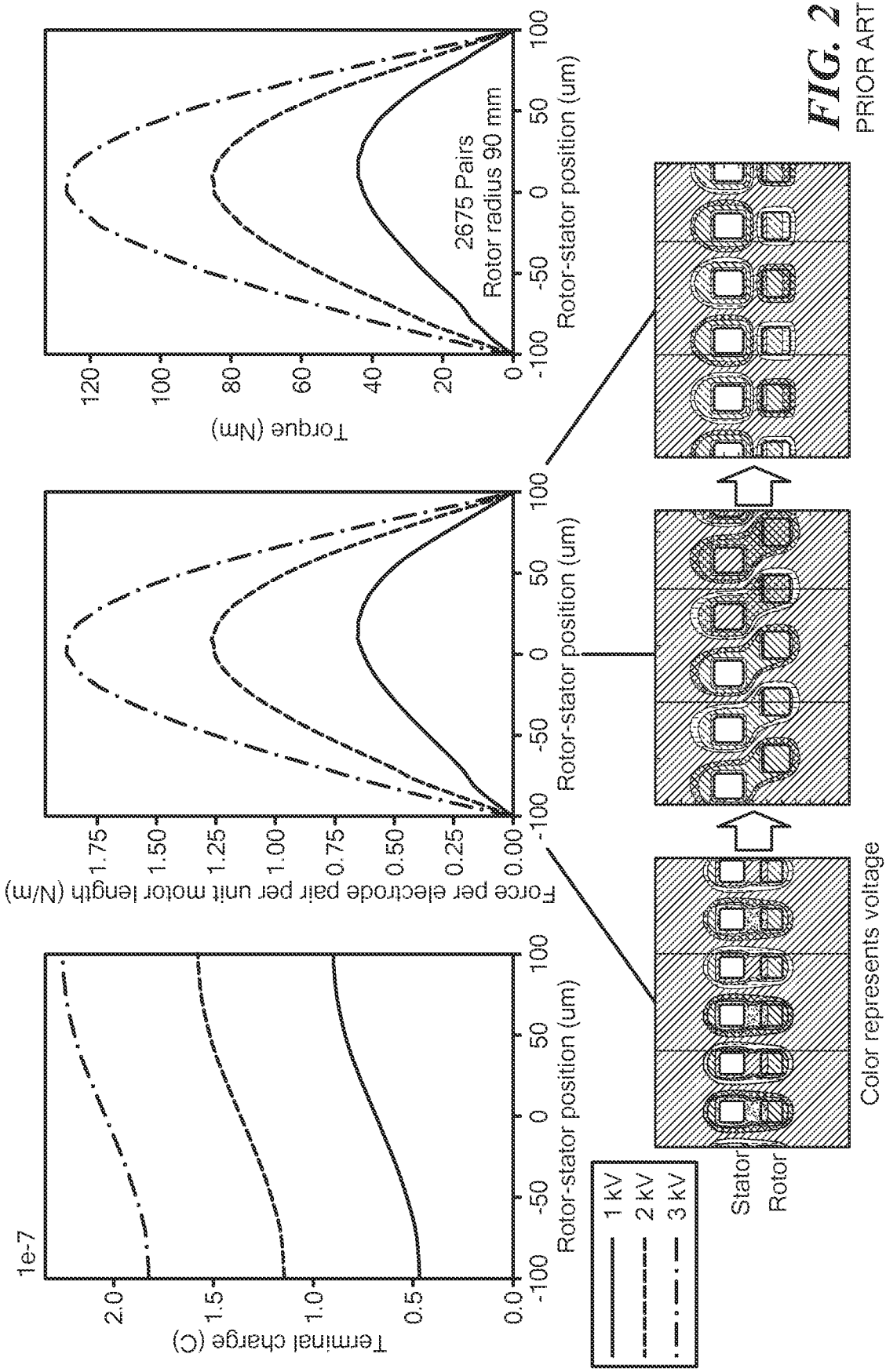
FIG. 2 shows graphs resulting from a planar 2D finite element model of an example rotor moving relative to a stator through the distance of one inter-electrode spacing, according to the prior art.

With a given voltage on terminal A, $V_A=V_E$, and therefore voltage $V_B=-V_E$ on terminal B, the rotor will move to minimize the energy of the system. To advance the motor further, the voltage on terminals A and B must be reversed so that $V_A=-V_E$ and $V_B=V_E$. While the voltages in general will be smoothly time-varying, it can be easier to describe the operational concepts using voltages that change in a step-like manner. If given sufficient time and torque, the rotor will then move forward by a distance equal to the distance from terminal A to terminal B, as shown in FIG. 2. FIG. 2 assumes stator electrode voltages are DC+/−1, 2, and 3 kV; rotor terminals have fixed surface charge densities of 1 mC/m² for an equivalent surface charge of ~2 kV. The terminal charge (left plot) is per electrode, per meter electrode length. As the rotor moves, and as charges or voltages change on any time-varying rotor terminals, capacitances CA and CB vary, requiring additional charge to flow onto terminals A and B to maintain their respective voltages. The electrical energy necessary to add this additional charge is converted into mechanical work by the motion of the rotor.

At each switching event the voltages on terminals A and B must reverse sign. If this polarity reversal is done in a "brute force" way, for example within the conventional H-bridge topology shown in FIG. 3, then the energy required to charge the motor capacitances CA and CB must be supplied by the power supply.

Figure 3:
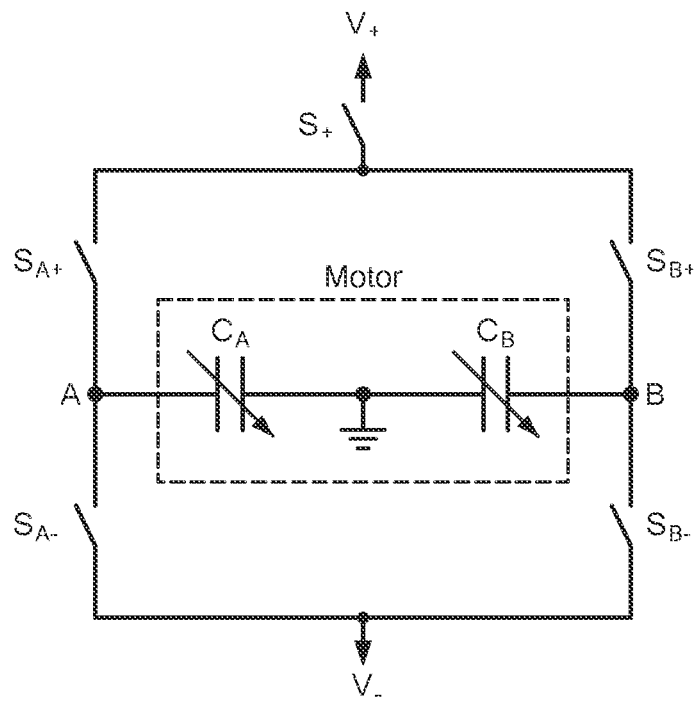
FIG. 3 is a schematic circuit diagram of an electrostatic motor driven in a conventional H-Bridge circuit, according to the prior art.

In FIG. 3, switch $S_+$ is included to allow discharge of $C_A$ and $C_B$. Even if the stored energy in the capacitors is first allowed to discharge, for example, by opening switch S+ and closing switches $S_{A+}$ and $S_{B+}$, similar to the idea in [1], there still needs to be electrical energy supplied to charge the capacitor to the opposite polarity. For capacitor $C_A$, this energy is given by $U_{A0}=\Delta Q_{A0} V_A$, where $\Delta Q_{A0}$ is the quantity of charge that must be added to capacitor $C_A$ to charge it to voltage $V_A$ at the beginning of the cycle, e.g. at rotor-stator position of −100 μm in FIG. 2.

For this simple example, rotor electrodes have fixed surface charges and stator electrodes are held fixed at voltages $V_A$ and $V_B$, respectively, between switching events. As the rotor moves, electrical energy $W=\Delta Q_{AW} V_A$ is supplied to the motor, where $\Delta Q_{AW}$ is the charge added to electrode (group) A. From the left plot of FIG. 2, W for each electrode voltage can be calculated using the net change in charge. These values agree within 10% with values of mechanical work computed directly from the integrals of the force-vs-distance traces in the middle plot.

When charging electrodes directly each cycle in this way, the maximum efficiency is $n=W/(W+U_A)$. Clearly, there is a strong incentive to minimize $U_{A0}$ and thus $\Delta Q_{A0}$, the amount of charge required to energize the stator electrodes. (Trump referred to this energizing charge as 'minimum capacitance' [2].) Reducing $\Delta Q_{A0}$ can be accomplished two ways, both of which reduce the mechanical output power of the motor. Either $V_A$ can be reduced, or the capacitance between adjacent stator electrodes can be reduced. Reducing capacitance between adjacent stator electrodes requires reducing the density of electrodes, which, for a fixed stator diameter, results in a reduced number of "poles" of the motor, thereby reducing torque. The motor modeled in FIG. 2, for example, has high torque owing to its 2675 pairs of stator electrodes.

Figure 4:
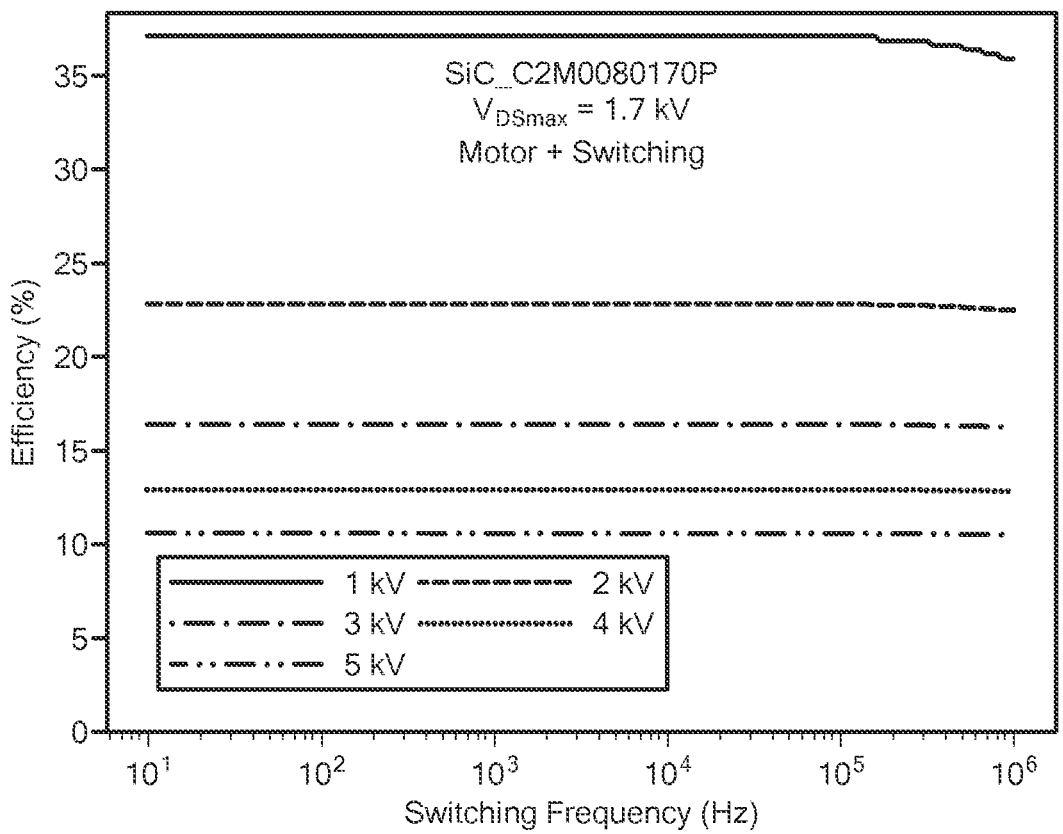
FIG. 4 is a graph of estimated maximum system efficiency versus frequency for a single-phase electrostatic motor that is driven with a conventional H-Bridge drive circuit using SiC MOSFETs, according to the prior art.

At an electrode bias of +/−1 kV, however, it has a maximum possible efficiency of only ~40% if the electrodes are charged directly from the power supply on each polarity reversal (FIG. 4). The motor's 2675 pairs of stator electrodes are arranged in two groups, with a minimum capacitance of ~50 nF per group. At higher electrode bias, efficiency is even lower. Any parasitic or switching losses would further reduce efficiency. Thus, although the electrostatic motor itself may have a very high efficiency, the overall system efficiency can be severely limited by the efficiency of the drive electronics.

Modified, Hard-Switched Inductive H-Bridge Circuit General Operation

Figure 5:
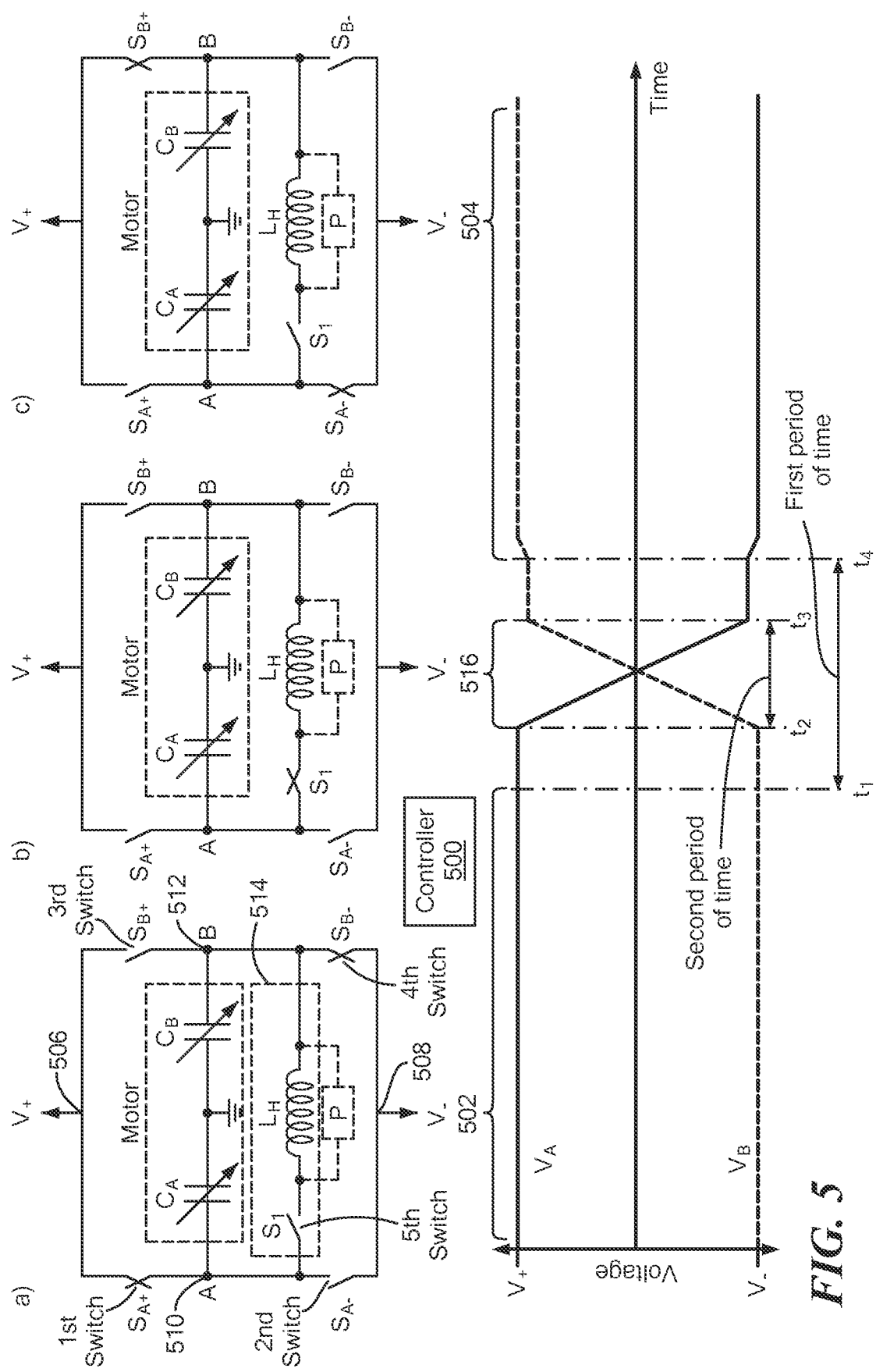
FIG. 5 is a graph showing time evolution of electrode voltages VA and VB in an electrostatic motor driven by an H-bridge with switchable inductive shunt, as well as three schematic circuit diagrams with respective electrode voltages held at three respective polarities, according to an embodiment of the present invention.

As described above, the energy required to charge the electrodes in an electrostatic motor can be comparable to (or even exceed) the mechanical work done per charge cycle. If the charging energy must be supplied on every polarity reversal, this will therefore result in a low system efficiency. To achieve system efficiencies near 100%, the electrostatic energy stored in the charged electrode cannot be allowed to dissipate. One approach in an embodiment of the present invention, shown in FIG. 5, is to connect an inductor and switch across the bridge circuit in parallel with the motor. Assume the two electrode groups of the motor are attached to opposite polarity DC power sources. When the power sources are disconnected and the parallel inductor is connected (by closing switch $S_1$, as in FIG. 5*b*), a resonant LC circuit is formed from the motor capacitance and inductor $L_H$. When the switch $S_1$ is first closed, the current in $L_H$ is zero. At a time equal to half the period of the resonant LC circuit ($t_3$ in FIG. 5), the current through $L_H$ is again zero, the polarity of electrodes A and B has reversed, and switch $S_1$ is opened to prevent further charge oscillation. The electrodes are then connected to the appropriate polarity power supplies at time $t_4$, allowing charge to flow onto the electrodes to compensate any energy lost due to non-zero series resistance.

The timing of the switching events could be controlled through a variety of approaches of varying levels of sophistication. In principle, the duration between $t_2$ and $t_3$ should be sufficiently stable to enable a fixed-duration (analog) timing circuit to control re-opening of switch $S_1$. Alternatively, it could be actively (digitally) controlled by the same controller that controls switches $S_{A+/−}$ and $S_{B+/−}$, or it could be controlled using a current-sensing or voltage-sensing circuit that monitors, e.g., the current flowing in inductor $L_H$.

Thus, FIG. 5 schematically illustrates an embodiment of the present invention, which provides a control circuit for an electrostatic machine. For simplicity of explanation, in FIG. 5, the electrostatic machine is represented by two variable capacitors $C_A$ and $C_B$ and collectively labeled Motor, although as discussed herein, the electrostatic machine can be a motor or a generator. Electric power terminal of the electrostatic machine are labeled A and B.

The electrostatic machine can, but need not necessarily, be part of the embodiment. In other words, the electrostatic machine may be considered a "workpiece" controlled by the control circuit.

The control circuit includes a current source or sink, for example depending on whether the electrostatic machine is a motor or generator, although in some cases, an electrostatic machine that acts as a generator is coupled to a current source to charge its electrodes. In the embodiment of FIG. 5, the current source or sink is represented by $V_+$ and $V_−$. A voltage (potential difference) between points in a circuit cause an electric current to flow from a source to a sink. Thus, one could consider a voltage source and a voltage sink as two points in a circuit having different voltages. As used herein, the term "current source" includes a voltage source, and the term "current sink" includes a voltage sink.

The control circuit also includes an inductor $L_H$ and a switch $S_1$ in series with the inductor $L_H$.

The control circuit includes a switching network coupled between the current source or sink $V_+$ and $V_−$, and the electrostatic machine Motor, and between the inductor $L_H$ and the electrostatic machine Motor.

A controller 500 is configured to automatically cause the switching network to connect the current source or sink $V_+$ and $V_−$ to the electrostatic machine Motor each half-cycle of a periodically alternating polarity, for example, during time periods 502 and 504.

The controller 500 is configured such that, at each polarity alternation, for example during time period 505, the switching network electrically isolates the electrostatic machine Motor from the current source or sink $V_+$ and $V_−$ for a first period of time, for example between $t_1$ and $t_4$. At each polarity alternation, the controller 500 causes the switching network to connect the inductor $L_H$ to the electrostatic machine Motor for a second period of time, for example between $t_2$ and $t_3$, while the electrostatic machine Motor is isolated from the current source or sink $V_+$ and $V_−$, and then disconnect the inductor $L_H$ from the electrostatic machine Motor.

In this embodiment, the switching network includes controls switches $S_{A+}$, $S_{B+}$, $S_{A−}$ and $S_{B−}$. However, in other embodiments, the switching network can be implemented differently.

In the embodiment shown in FIG. 5, the current source or sink $V_+$ and $V_−$ is a DC source or sink. Operation of the switching network, under direction of the controller 500, includes opening and closing the controls switches $S_{A+}$, $S_{B+}$, $S_{A−}$, and $S_{B−}$ so as to repeatedly alternate polarity of the electrostatic machine Motor. In another embodiment, the current source or sink is an AC current source or sink. In this context, AC means polarity alternates on a regular basis, although amplitude (voltage) need not necessarily vary smoothly. For example, an AC current source or sink may, for example, conform to a square wave, and it need not necessarily conform to a sine wave. Thus, the current source or sink may include a DC source, an AC source, a DC sink, or an AC sink. As used in this context, "alternating polarity" can refer to the polarity of the electrodes of the machine as the machine operates, which is separate from the characteristics of the current or source or sink, to which the electrostatic machine is connected.

As noted, optionally, the inductor $L_H$ is configured to form a resonant circuit with capacitance $C_A$ and $C_B$ of the electrostatic machine Motor, the resonant circuit having a resonant frequency related to a speed of operation of the electrostatic machine Motor.

In an actual implementation of the modified H-Bridge circuit shown in FIG. 5, several factors may influence the implementation of switch $S_1$. When switch $S_1$ is open, the voltage across it will equal $V_+$–$V_-$, which leads to high switching losses and may require combinations of transistors to reach the needed holding voltage [3]. If connected directly to one of the motor electrodes, as shown in FIG. 5, the voltage on the switch will swing through the entire voltage range of the electrode, which may require complicated gate drive circuitry to ensure the switch operates as intended. The polarity of the voltage across switch $S_1$ oscillates, which may complicate gate drive circuitry. The choice of the inductance $L_H$ will be determined by a tradeoff between switching speed (small inductance yields faster switching) and peak current (large inductance yields lower peak current). There may or may not be any need for the snubber protection circuitry "P" shown in FIG. 5 if it can be determined that switch $S_1$ would only be opened when there is negligible current in $L_H$. Thus, optionally, a snubber P is connected in parallel with the inductor $L_H$.

A variety of tradeoffs would be involved in determining how best to implement switch $S_1$ as well as its drive circuitry. For example, adding a few diodes and splitting $L_H$ into two equal halves enables the inductive-bridge switches to be referenced to ground and, in the case that the switches are implemented in a technology that has a preferred direction, protects against reverse current flow, as shown in FIG. 6.

Figure 6:
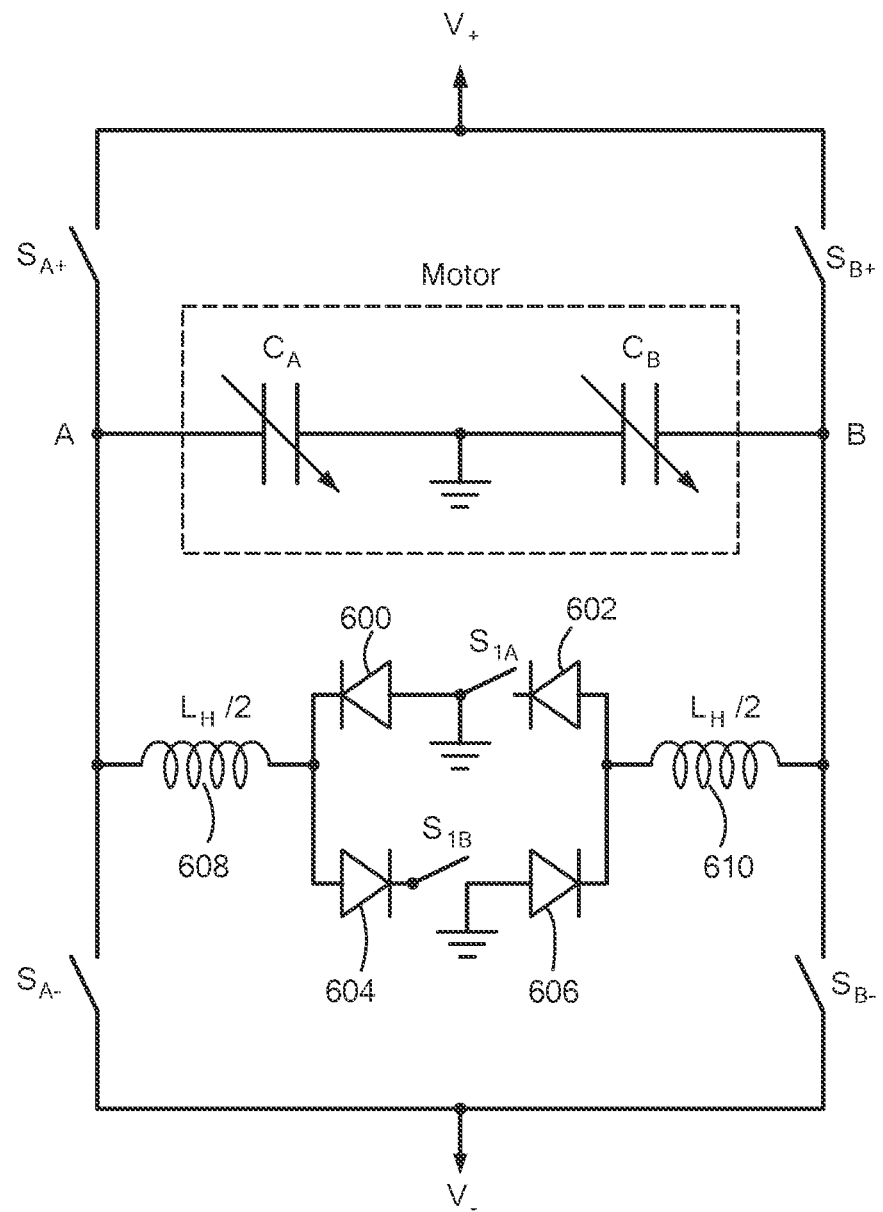
FIG. 6 is a schematic circuit diagram of a modified H-Bridge circuit with ground-referenced switches on the inductive shunt, according to an embodiment of the present invention.

Thus, as shown in FIG. 6, in an embodiment, the control circuit includes a first diode 600, a second diode 602, a third diode 604 and a fourth diode 606. The inductor $L_H$ includes a first inductor 608 and a second inductor 610. The switch $S_1$ includes a first sub-switch $S_{1A}$ and a second sub-switch $S_{1B}$. One terminal of each of the first and second sub-switches $S_{1A}$ and $S_{1B}$, is grounded.

The first diode 600, the first sub-switch $S_{1A}$ and the second diode 602 are in series to form a first series switch circuit. The third diode 604, the second sub-switch $S_{1B}$ and the fourth diode 606 are in series to form a second series switch circuit. The first series switch circuit is in parallel with the second series switch circuit to form a parallel switch circuit. The parallel switch circuit is coupled in series between the first inductor 608 and the second inductor 610.

FIG. 5 includes a graph showing time evolution of electrode voltages $V_A$ and $V_B$ in an electrostatic motor driven by an H-bridge with switchable inductive shunt, as well as three schematic circuit diagrams with respective electrode voltages held at three respective polarities driving an electrostatic motor, according to an embodiment of the present invention. In the left portion of FIG. 5 (labeled a), electrode voltages are held at the first polarity. In the center portion of FIG. 5 (labeled b), the electrode polarities are reversed. In the right portion of FIG. 5 (labeled c), the electrode voltages are held at the second polarity. Below the three schematic circuit diagrams (a, b and c), FIG. 5 shows a graph of the time evolution of the electrode voltages $V_A$ and $V_B$. Prior to time $t_1$, switches $S_{A+}$ and $S_{B-}$ are closed, making $V_A$ and $V_B$ equal to $V_+$ and $V_-$, respectively. At time $t_1$, all switches $S_{A+}$ and $S_{B-}$ are opened. At time $t_2$, switch $S_1$ is closed, allowing current to flow between electrodes A and B through inductor $L_H$. At time $t_3$, switch $S_1$ is opened. At time $t_4$, switches $S_{A+}$ and $S_{B-}$ are closed, making $V_A$ and $V_B$ equal to V. and $V_+$, respectively.

In some embodiments, as shown in FIG. 5, the switching network includes an H-bridge that includes first, second, third and fourth switches, represented respectively by $S_{A+}$, $S_{A-}$, $S_{B+}$, and $S_{B-}$. One terminal of the first switch $S_{A+}$ is coupled to one terminal of the third switch $S_{B+}$ at a first node 506, and the first node 506 is connected to a first terminal $V_+$ of the current source or sink. One terminal of the second switch $S_{A-}$ is coupled to one terminal of the fourth switch $S_{B-}$ at a second node 508, and the second node 508 is connected to a second terminal $V_-$ of the current source or sink.

The first switch $S_{A+}$ is coupled in series with the second switch $S_{A-}$ at a third node 510, wherein the third node 510 is on an opposite side of the first switch $S_{A+}$ from the first node 506, and on an opposite side of the second switch $S_{A-}$ from the second node 508. The third switch $S_{B+}$ is coupled in series with the fourth switch $S_{B-}$ at a fourth node 512, wherein the fourth node 512 is on an opposite side of the third switch $S_{B+}$ from the first node 506, and on an opposite side of the fourth switch $S_{B-}$ from the second node 508. The third and fourth nodes 510 and 512 are connected to respective terminals A and B of the electrostatic machine Motor.

The switching network also includes a fifth switch $S_1$ in series with the inductor $L_H$ to form a series arrangement 514. The series arrangement 514 is connected between the third and fourth nodes 510 and 512.

The controller 500 is configured to automatically repeatedly actuate the first, second, third, fourth and fifth switches $S_{A+}$, $S_{A-}$, $S_{B+}$, $S_{B-}$, and $S_1$, such that the first, second, third and fourth switches $S_{A+}$, $S_{A-}$, $S_{B+}$, and $S_{B-}$ open and close to repeatedly alternate polarity of the first and second nodes 510 and 512. At each polarity alternation, the first, second, third and fourth switches $S_{A+}$, $S_{A-}$, $S_{B+}$, and $S_{B-}$ are open for at least the first period of time, exemplified by the time period 505 from $t_1$ to $t_4$. At each polarity alternation, the fifth switch $S_1$ is closed for the second period of time, exemplified by the time period 516 from $t_2$ to $t_3$, while all of the first, second, third and fourth switches $S_{A+}$, $S_{A-}$, $S_{B+}$, and $S_{B-}$ are open, and then the fifth switch $S_1$ is open.

Modified, Soft-Switched H-Bridge Circuit

The fact that electrostatic machines/motors are, in the ideal case, purely capacitive loads provides the opportunity to explore circuit topologies that would not be suitable for more common resistive or inductive loads. For example, as shown in the example circuit in FIG. 7, it allows us to implement non-resonant soft switching by using an auxiliary circuit to charge up the parallel inductor, here replaced by a transformer $T_Z$ that has an inductive load, $L_Z$ on the secondary, prior to closing switches $S_1$ and $S_2$. As used herein, the term "charge up," when used in reference to an inductor, means store energy in a magnetic field of the inductor, such as by passing a current through the inductor or inducing a current in the inductor. "Charge up," when used in reference to an inductor, does not mean store an electrical charge, as in storing an electrical charge in a capacitor. Inductor $L_Z$ may include a snubber in parallel (not shown). This circuit is slightly more complex than the hard-switched version shown in FIGS. 5 and 6, but it can significantly reduce switching losses. Relative to the resonant/quasi-resonant circuit described below, this circuit shown in FIG. 7 does not require a variable inductor or capacitor.

Figure 7:
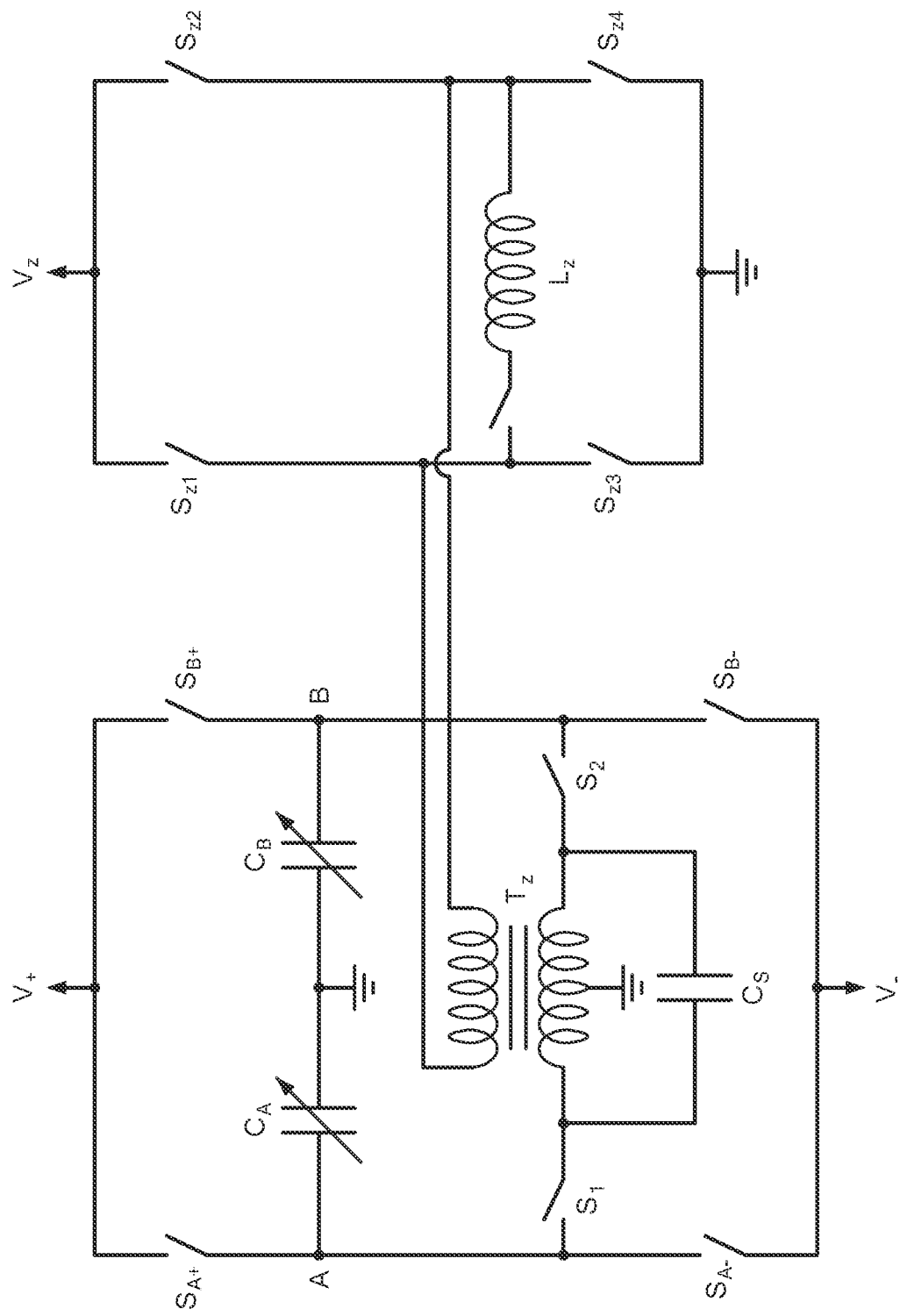
FIG. 7 is a schematic circuit diagram of a modified H-Bridge drive circuit incorporating zero-voltage switching of bridge switches, according to an embodiment of the present invention.

Thus, as exemplified in FIG. 7, an embodiment of the present invention provides a control circuit, as discussed above, for example with respect to FIG. 5, and further including a secondary circuit 700 configured to automatically repeatedly charge the inductor $L_H$. Optionally, in such an embodiment, the inductor $L_H$ includes a first winding of a transformer $T_Z$. The transformer $T_Z$ includes a second winding, and the secondary circuit includes an H-bridge coupled to the second winding and configured to automatically repeatedly alternate polarity of power to the second winding.

Driving With Resonant ZVS

Figure 8:
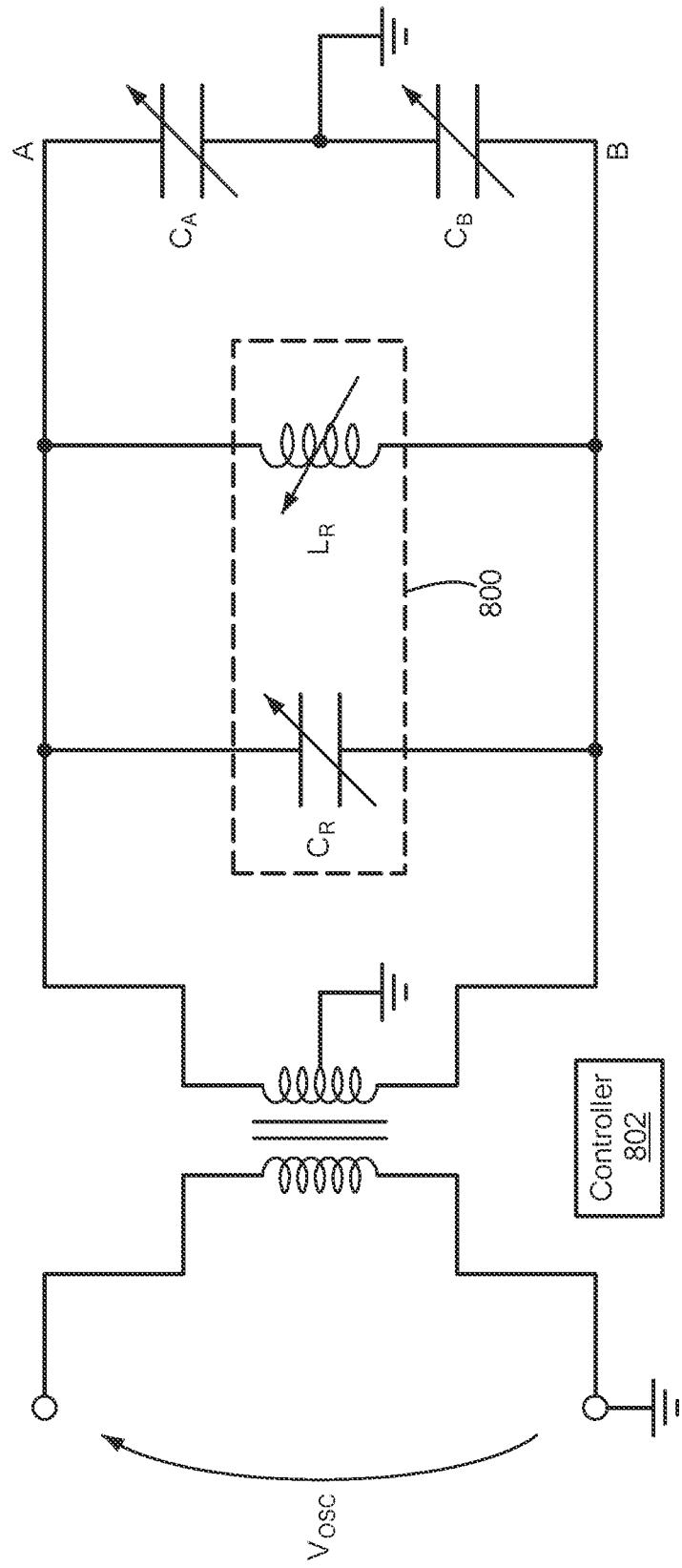
FIG. 8 is a schematic circuit diagram of a resonant drive circuit for an electrostatic motor using an oscillating signal $V_{OSC}$, according to an embodiment of the present invention.

FIG. 8 is a schematic circuit diagram of a resonant drive circuit for an electrostatic motor using an oscillating signal $V_{OSC}$, according to an embodiment of the present invention. Variable inductor $L_R$ and, optionally, variable capacitor CR are connected in parallel with the motor to enable tuning the resonant frequency of the LC circuit to approximately match the frequency of $V_{OSC}$. Here the drive is coupled to the motor via a transformer. Although this is not required for the circuit to function, it may be useful for high-voltage isolation.

In the modified, hard-switched H-Bridge circuit above, the voltage across the switch is very high, leading to increased switching losses. To reduce switching losses, particularly at high frequencies, switches should be opened and closed when there is negligible voltage or current across the switch. These strategies are known as "zero voltage switching" (ZVS) or "zero current switching" (ZCS), respectively, and are commonly used in high efficiency resonant power converters.

To utilize one of the many published ZVS or ZCS power conversion topologies to (efficiently) drive an electrostatic motor, we need to ensure that the load presented by the motor is compatible with the resonant drive circuitry. In this scenario, the electrostatic motor is attached as a load on the output of a resonant (or quasi-resonant) power converter and is therefore driven with an alternating voltage $V_{OSC}$. Typically the power converter will utilize a power transformer to both increase the peak voltage and to enable bipolar drive of the electrostatic motor. In this case, the resonant drive circuitry would be driving the primary side of the transformer, and the electrostatic motor would be attached to the secondary of the transformer.

The input impedance $Z_{IN}$ of a transformer, as viewed from the electronics driving the primary, can be written as:

$$Z_{IN} = \frac{L_P}{L_S} Z_{LOAD} \frac{1}{1 + \frac{Z_{LOAD}}{j\omega L_S}},$$

Where $Z_{LOAD}$ is the impedance of the circuit connected to the secondary of the transformer and $L_P$ and $L_S$ are the inductances of the primary and secondary of the transformer, respectively. Since we will typically be operating at high electrode bias, we will typically choose a step-up transformer with $L_S > L_P$. Electrostatic motors are primarily capacitive loads; if $Z_{LOAD}$ was comprised of only a motor, then $Z_{LOAD} \sim 1/j\omega C_M$ for aggregate average motor capacitance $C_M$. Such a load would be difficult to drive at high frequencies for most power converter designs.

To improve power transfer and efficiency in embodiments of the present invention, an inductor $L_R$ can be connected in parallel with the motor to form a parallel resonant LC circuit, as shown in FIG. 8. The inductance of $L_R$ should be chosen such that the resonant frequency of the circuit matches the frequency of the drive, $V_{OSC}$. Since in general this frequency will be variable, $L_R$ may need to be a variable inductor. To achieve a very wide frequency range, it may also be necessary to also include a variable capacitor ($C_R$) in parallel with the motor, or to replace the single inductor $L_R$ with a combination of (likely variable) inductors that can be connected to the circuit depending on the desired drive frequency.

Thus, and embodiment of the present invention provides a control circuit for an electrostatic machine. The control circuit includes a parallel capacitor-inductor resonant circuit 800 having an adjustable resonant frequency. An oscillator, represented by $V_{OSC}$, is coupled in parallel to the resonant circuit 800 and to the electrostatic machine. A controller 802 is configured to automatically repeatedly adjust the resonant frequency to match output frequency of the oscillator $V_{OSC}$.

Optionally, the resonant circuit 800 includes a variable inductor $L_R$, and the resonant frequency depends at least in part on inductance of the variable inductor $L_R$. In such an embodiment, the controller 802 is configured to adjust the inductance of the variable inductor $L_R$.

Optionally or alternatively, the resonant circuit 800 includes a variable capacitor $C_R$, and the resonant frequency depends at least in part on capacitance of the variable capacitor $C_R$. In such an embodiment, the controller 802 is configured to adjust the capacitance of the variable capacitor $C_R$.

Separate Low-Frequency and High-Frequency Circuits

Figure 9:
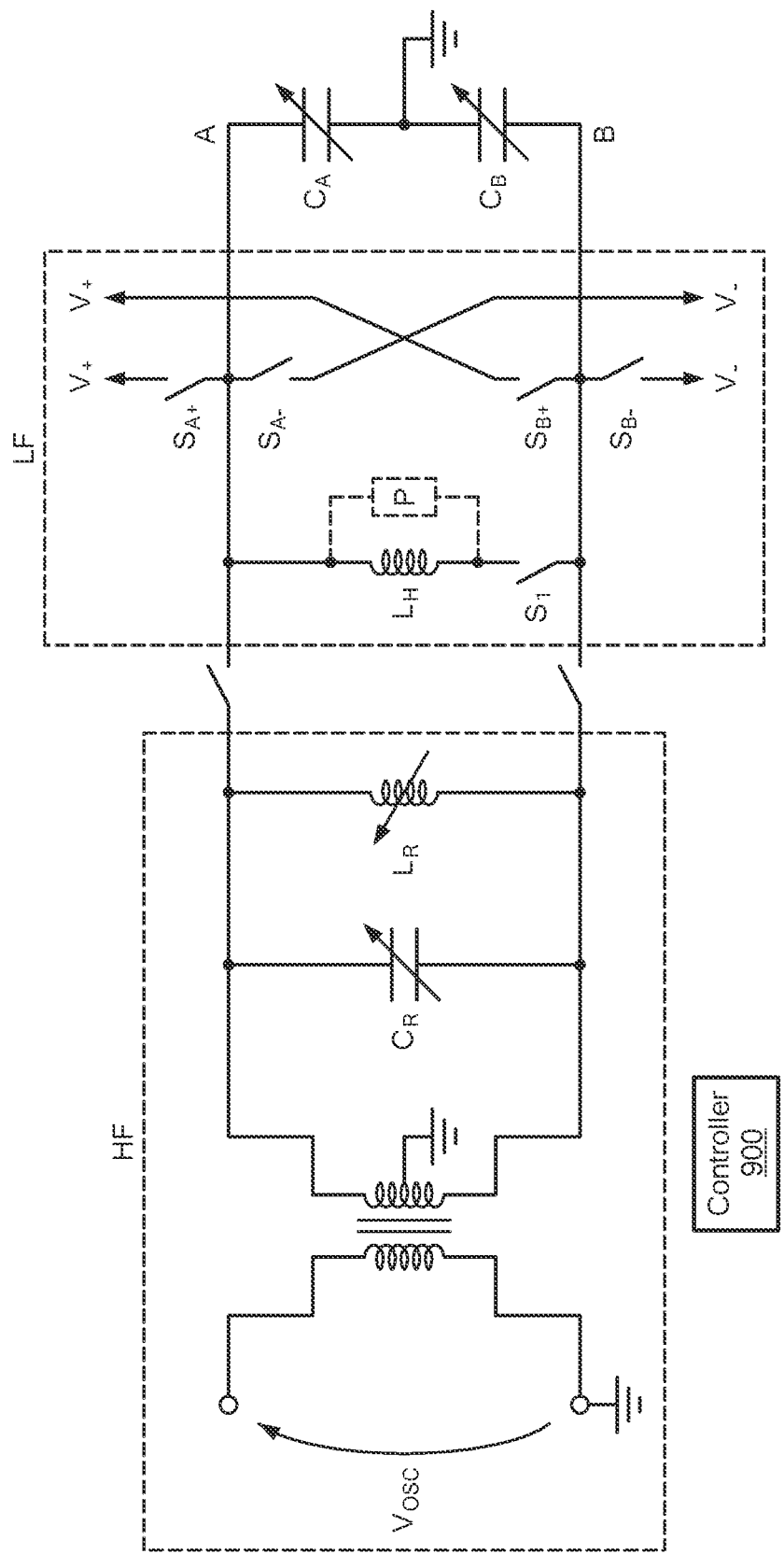
FIG. 9 is a schematic circuit diagram of an electrostatic drive circuit with separate low frequency (LF) and high frequency (HF) sub-circuits, according to an embodiment of the present invention.

If driving with a resonant ZVS circuit at high frequencies, it may be difficult to achieve resonant operation at the lowest drive frequencies required for motor operation. To enable operation all the way down to DC (i.e. holding the motor in a fixed position), it may be necessary to utilize different sub-circuits within different frequency ranges, for example using a modified H-Bridge circuit for low frequencies and a resonant drive circuit for high frequencies, as shown in FIG. 9. The circuit shown here utilizes a hard-switched modified inductive H-Bridge circuit for the low-frequency regime, but some embodiments may utilize the soft-switched modified inductive H-Bridge circuit shown in FIG. 7.

Thus, an embodiment of the present invention provides a control circuit for an electrostatic machine. In such an embodiment, the control circuit includes an H-bridge (LF), a resonant drive circuit (HF), and a controller 900 configured to automatically couple the H-bridge (LF) to the electrostatic machine for operation up to a first operating speed, and to automatically couple the resonant drive circuit (HF) to the electrostatic machine for operation above the first operating speed.

The H-bridge (LF) may be implemented as described herein, for example with reference to FIG. 5, and the resonant drive circuit (HF) may be implemented as described herein, for example with reference to FIG. 8.

Comparison with Prior Art

Trump—1933 Thesis (MIT PhD)

In Trump's experimental implementation of an electrostatic motor [2], the motor was connected directly to the AC main line via a high voltage transformer. Such an implementation would be equivalent to the low efficiency, direct H-Bridge approach described above. Since Trump's motor only had two poles, however, there was presumably very little "minimum capacitance" in the motor, resulting in high efficiency at the expense of lower power and torque. We're aiming for higher power and many, many more poles with likely orders of magnitude more "minimum capacitance," so Trump's approach won't work for our implementation.

Weston Johnson/Electric Force Motors, LLC

Figure 10:
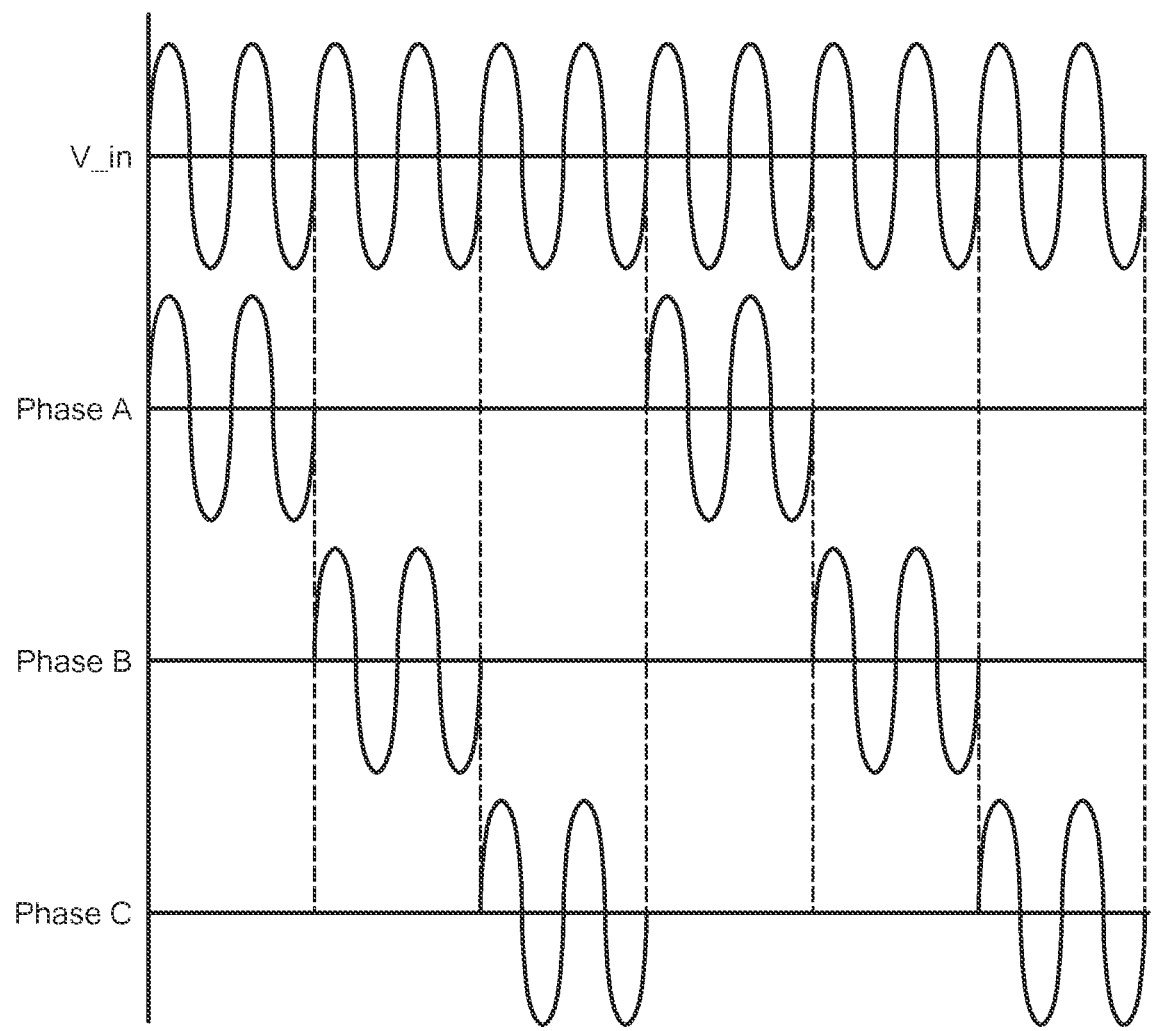
FIG. 10 is a graph showing an AC switching scheme, according to the prior art.

In Weston Johnson's PHD thesis [4], he correctly observes that if the terminals are simply shorted, then the charge is lost as heat and efficiency will be reduced. He mentions and then dismisses what in essence is a charge-recycling scheme (which he claims in his subsequent patent [5]): "Another solution is to connect the terminals to a lower voltage bus, thus removing the charge while permitting it to be collected and reused rather than destroyed. This solution, however, requires multiple buses and added complexity." In his thesis, he argues that a simpler solution is to simply drive different phases of the motor at different periods in a sinusoidal drive, as shown in FIG. 10 (FIG. 107 in [4]). Since only a single phase is being driven at any one time, this would reduce the output power by a factor of three, so it is not an optimal solution.

Figure 11:
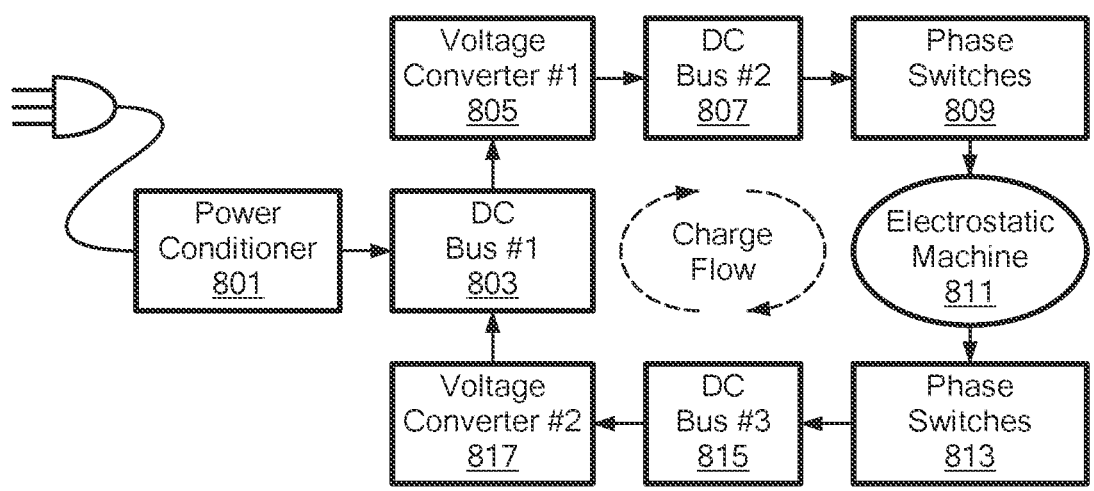
FIG. 11 is a block diagram of an exemplary charge recycling circuit, according to the prior art.

Johnson's subsequent patent filing from his company, Electric Force Motors, LLC claimed a drive circuit with charge recycling [5]. Although he does not provide any suggested implementations, his overview schematic (see FIG. 11, which corresponds to FIG. 107 in Ref. [4]) is consistent both with the description of charge being "collected and reused" that he gave in his thesis as well as with my understanding of how "charge recycling" is typically implemented: the charge is moved off of one node and onto a storage node for use during a subsequent cycle. Both of the independent claims in his patent mention "removing" charge from the plurality of isolated poles.

In principle and if properly implemented, charge recycling should provide significantly higher efficiency than allowing the charge to dissipate. Our approach, in contrast, can yield as good or better efficiency and is significantly simpler because it takes advantage of the bipolar nature of the motor to avoid the need for a storage node; the charge simply transfers within different electrodes of the motor.

C-Motive/Ludois

Figure 12:
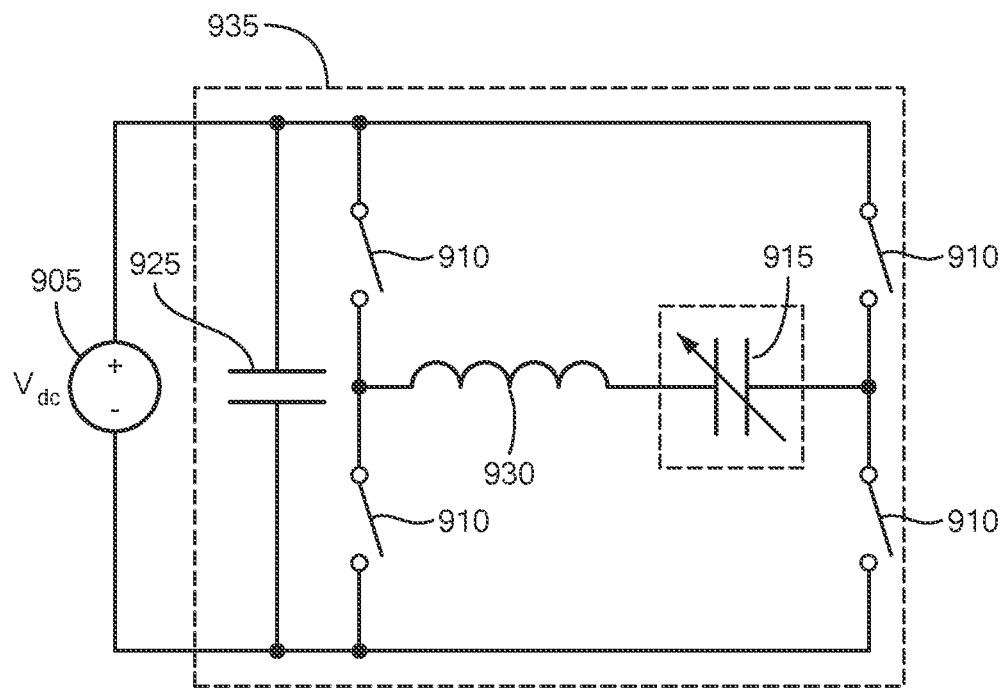
FIG. 12 is a schematic circuit diagram of an H-bridge drive circuit for an electrostatic motor, according to the prior art.
Figure 13:
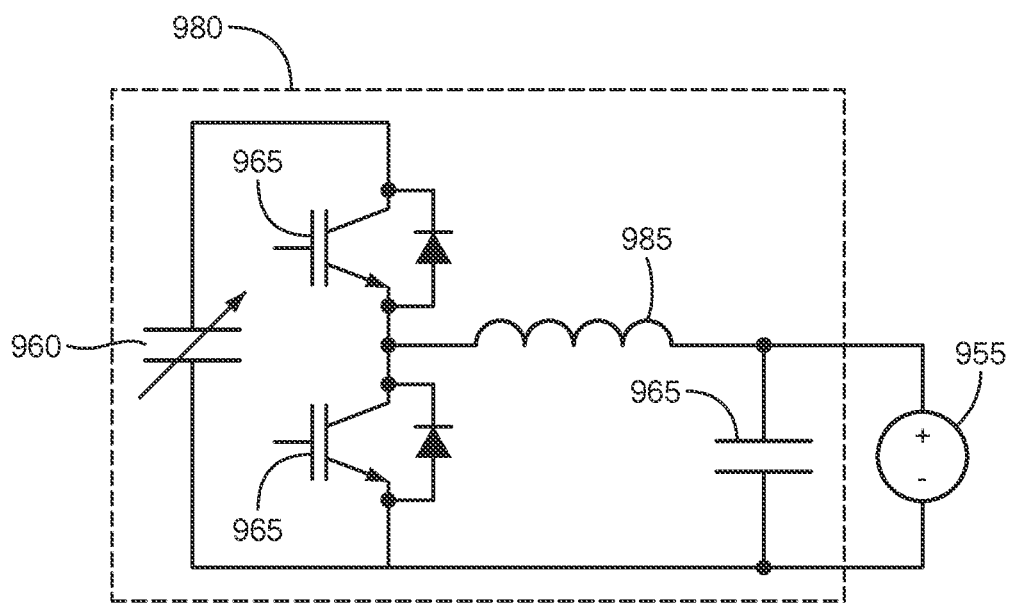
FIG. 13 is a schematic circuit diagram of a driver for an electrostatic motor with a boost configuration, according to the prior art.

One of the patents filed by electrostatic motor company C-Motive, LLC founded by the University of Wisconsin professor Daniel Ludois, describes various ways to drive an electrostatic motor [6]. These methods include driving with a conventional H-Bridge similar to what we showed in FIG. 3. The closest diagram they have to our modified H-Bridge is shown in FIG. 12 (which corresponds to FIG. 8 in Ref. [5]), but their inductor is in series instead of parallel and is not independently switchable. They also discuss using buck or boost converters to drive electrostatic motors (see FIG. 13, which corresponds to FIG. 9D in Ref. [6]), which would in principle provide a way of recycling charge and increasing efficiency. Their circuit apparently does not enable polarity reversal, which of course is essential. Reference should also be had to Mayank Garg, et al., for a description of a scheme to drive a capacitive load with a buck/boost circuit.

Richard Post/Parametric Oscillator Design

Figure 14:
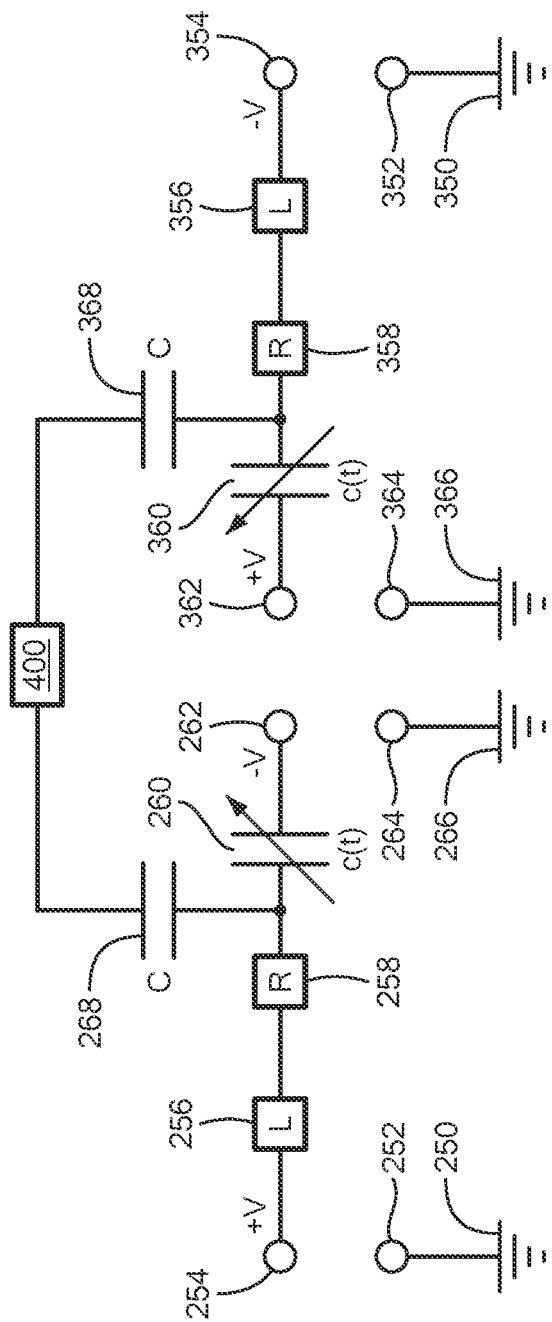
FIG. 14 is a schematic circuit diagram of a drive circuit for an electrostatic machine, here configured as a generator, utilizing series inductors to create a parametric resonance, according to the prior art.

Richard Post at Lawrence Livermore National Labs invented a design that uses variable inductors coupled with the motor to create a parametric oscillator [7] (see FIG. 14, which corresponds to FIG. 9F in Ref. [6]). However, this design doesn't operate over a wide enough frequency range to be useful, on its own, for driving a motor. Post was apparently primarily interested in using electrostatic machines as flywheel energy storage devices. Furthermore, Post's design does not appear to be as responsive as a directly-switched motor.

Mayank Garg et al./Texas Instruments Driver for Capacitive Loads

Designed for lower-voltage applications, like piezoelectric transducers for mobile phone haptics, but relevant for electrostatic motors. Similar to (but significantly before) one of the C-Motive ideas discussed above in FIG. 12, Garg et al. drive the capacitor with a buck/boost circuit that has an inductor in series with the capacitive load [8]. The version from Garg seems much more complete and would actually work (see FIG. 15).

An advantage of using a buck/boost approach like this is that they can step up the voltage while driving the load. This could be useful when driving an electrostatic motor, which typically requires high voltages.

Although our approach does not step up the voltage, it is possible for the high voltage portion of our circuit to be isolated via a transformer anyway, in which case the transformer may as well be used for stepping up the voltage.

Furthermore, our approach requires fewer components and can be more efficient than a buck/boost approach. As drawn, these buck/boost approaches drive each group of electrodes (e.g. 'A' or 'B' in our description above) independently and in reference to the battery ground. By taking advantage of the fact that 'A' and 'B' will always be symmetric and opposite, our circuit drives group 'A' and 'B' simultaneously, requiring approximately half as many components. Buck/boost designs also typically require multiple switching operations per cycle, which would reduce efficiency and increase electromagnetic emissions, particularly as there is no provision for zero-voltage switching, and the switches are opened and closed when large voltage is present across the switch.

Fitzi and Dobretsberger/Bridge Circuit with Inductive and Capacitive Load

Figure 15:
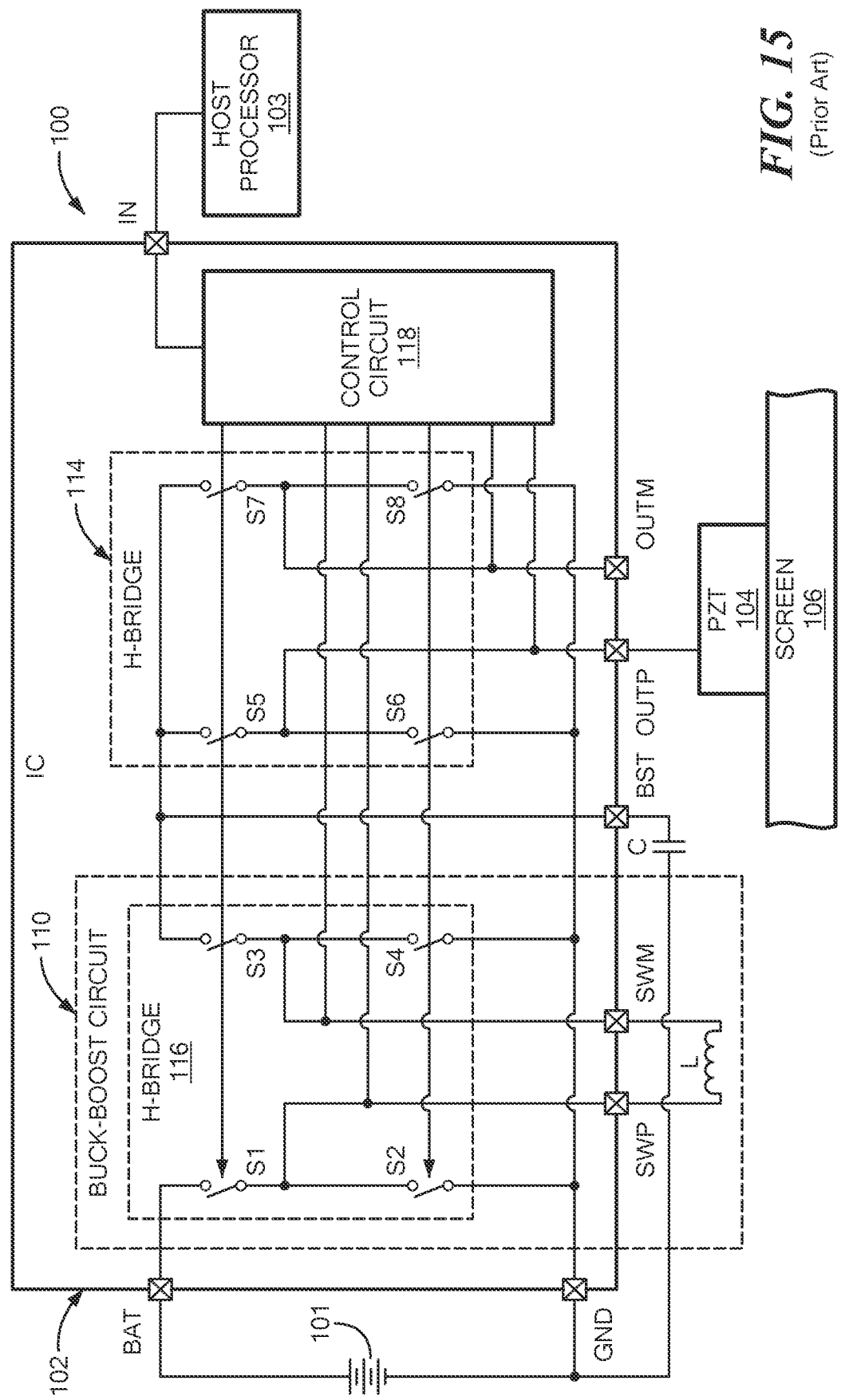
FIG. 15 is a schematic circuit diagram of a driver for capacitive loads featuring a buck/boost circuit, according to the prior art.
Figure 16:
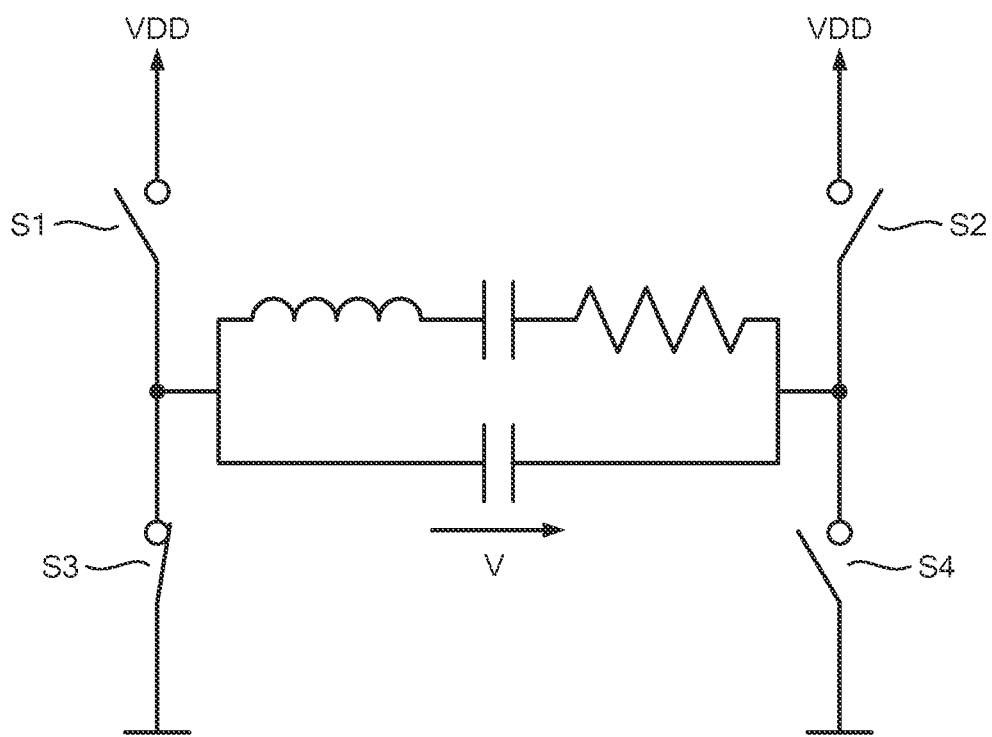
FIG. 16 is a schematic circuit diagram of an inductive and capacitive load across a bridge circuit, according to the prior art.

In their patent [9], Fitzi and Dobretsberger provide a method for switching an electrical load having at least one capacitive component and one inductive component in a bridge branch of a bridge circuit (see FIG. 16, which corresponds to FIG. 15 in Ref. [7]). Compared to our modified H-Bridge circuit from FIGS. 5-7, the key difference is that the inductor in Fitzi's bridge circuit is part of the load and therefore cannot be independently switched. If an inductor were added in parallel with an electrostatic motor and the inductor was not independently switchable, it would drastically increase power use at frequencies lower than the LC resonance of the electrostatic motor/inductor circuit. At frequencies comparable to the LC resonance, the inductor would not need to be independently switched, but the hard-switching topology would result in higher switching losses than a zero-voltage switching design. Using the method from Fitzi would therefore result in lower efficiency in all cases, and in some cases drastically so.

Dynamic Gap Measurement

Another embodiment of the invention provides a solution to measure the gap between the rotor and stator of an electrostatic machine at a plurality of locations. The stator is divided into a plurality of spatial regions, wherein each region comprises two conductors that are patterned to form electrodes. The regions can be manufactured by patterning metal on an insulating substrate, using methods such as electroplating, sputtering, etching, or wire deposition. The two conductors of each region are connected to a capacitance measuring circuit. A variety of capacitance measuring circuits are known to persons having ordinary skill in the art;

a capacitive Wheatstone bridge is one well-known example. The capacitance between the two conductors in each region depends on the distance between the stator and the rotor in the region. Therefore, the gap between the stator and the rotor can be measured in each region by measuring the capacitance between the two electrodes in each region.

Electrode Misalignment Compensation

Another embodiment of the invention solves the problem of misaligned electrodes by adjusting the phase of a drive voltage waveform as it is applied to different regions of the stator. The stator is divided into a plurality of spatial regions, wherein each region comprises two conductors that are patterned to form electrodes. The regions can be manufactured by patterning metal to form an electrode array on an insulating substrate, using methods such as electroplating, sputtering, etching, or wire deposition. A single electrode array is shown in FIG. 27D, which comprises a insulating substrate 121, and a first conductive region 122 and a second conductive region 123.

Figure 27A:
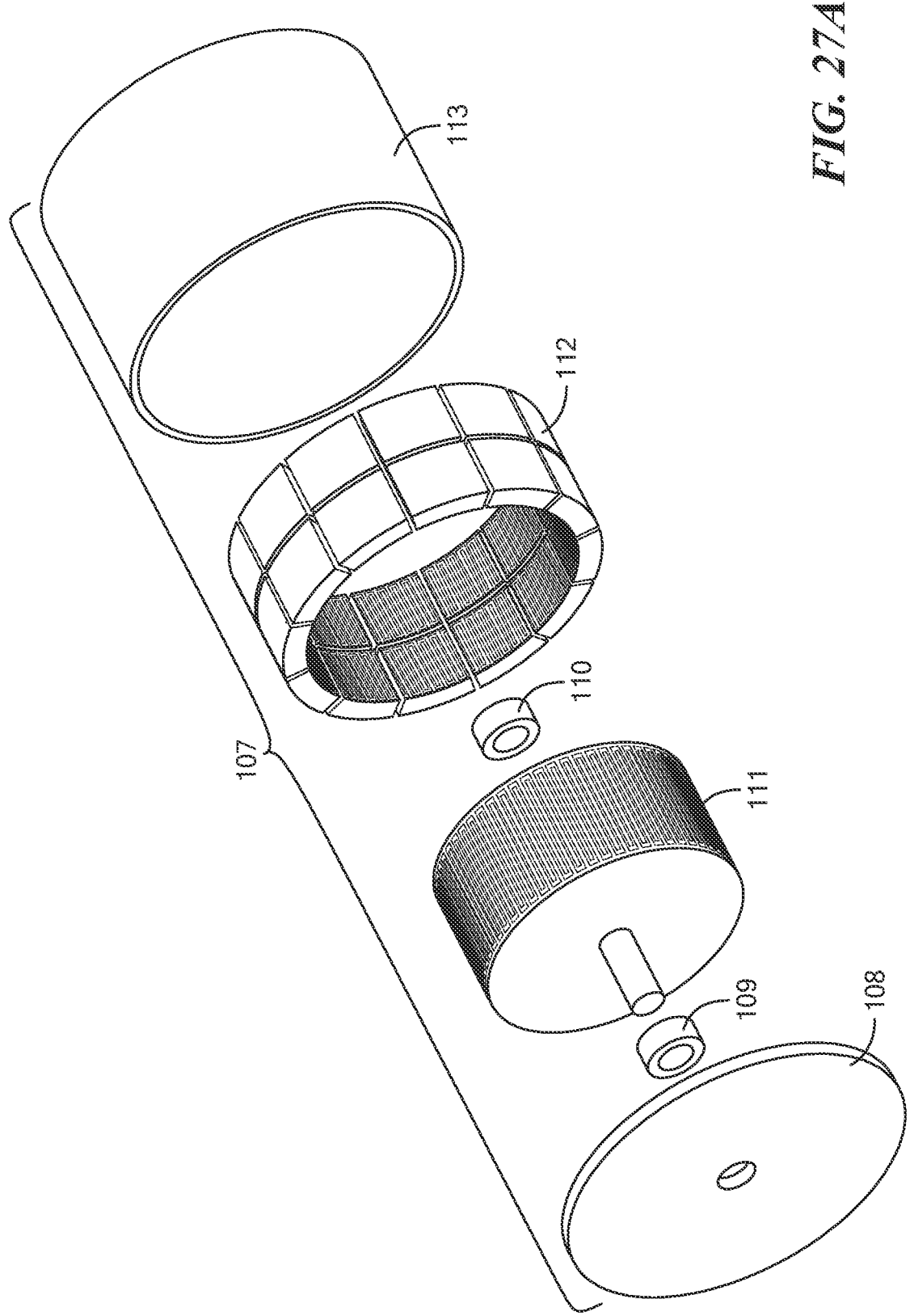
FIG. 27A shows an exploded view of an electrostatic machine comprising a stator with a plurality of electrically independent electrode arrays, according to an embodiment of the present invention.
Figure 27B:
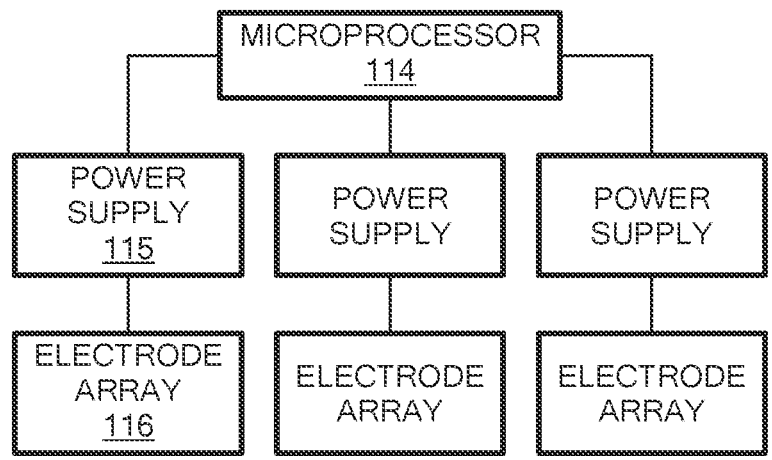
FIG. 27B shows a schematic diagram of a system to control the relative phase of waveforms delivered to a plurality of electrode arrays, according to an embodiment of the present invention.

FIG. 27A is an exploded view of an electrostatic machine comprising a stator 112 that is divided in a plurality of spatial regions, each comprising an electrode array. The electrostatic machine further comprises a case 113 and front cover 108. A rotor 111 is supported within the stator by a front bearing 109 and a rear bearing 110.

Each region is provided with electrical terminals that are connected to a tunable all-pass filter. An all-pass filter is class of electrical filter, known to those with ordinary skill in the art, which adjusts the phase of an alternating current signal but does not alter the magnitude of the signal. A tunable, or variable all-pass filter is a class of all-pass filter that applies a phase shift that varies in magnitude in accordance with a control signal Several types of all-pass filters are known to those with ordinary skill in the art. Many all-pass filter designs use active components that would fail or be inefficient to operate at the high voltages that are advantageous for a high-power electrostatic machine. However, efficient all-pass filters can be constructed from passive, reactive components that can be operated at high voltages. Classes of all-pass filters that can be constructed from passive, reactive components include lattice networks and bridged-T networks. A tunable all-pass filter can be constructed by substituting one or more variable reactance components for fixed reactance components. For example, a tunable all-pass network can be constructed by substituting a variable capacitor for a fixed capacitor in a bridged-T network. A tunable all-pass filter can also be constructed by substituting a variable inductor for a fixed inductor in a lattice filter or bridged-T filter. In an embodiment, tunable all-pass filters are constructed using saturable reactors to control the inductance of an inductor in a lattice network all-pass filter. The saturable reactor is advantageous to use for an electrostatic motor because it can be operated at high voltage and its inductance can be controlled by a voltage control signal.

A power supply provides a drive voltage waveform to each region in parallel. The tunable all-pass filter connected to each region adjusts the phase of the drive voltage waveform as it is applied to each region.

Figure 27C:
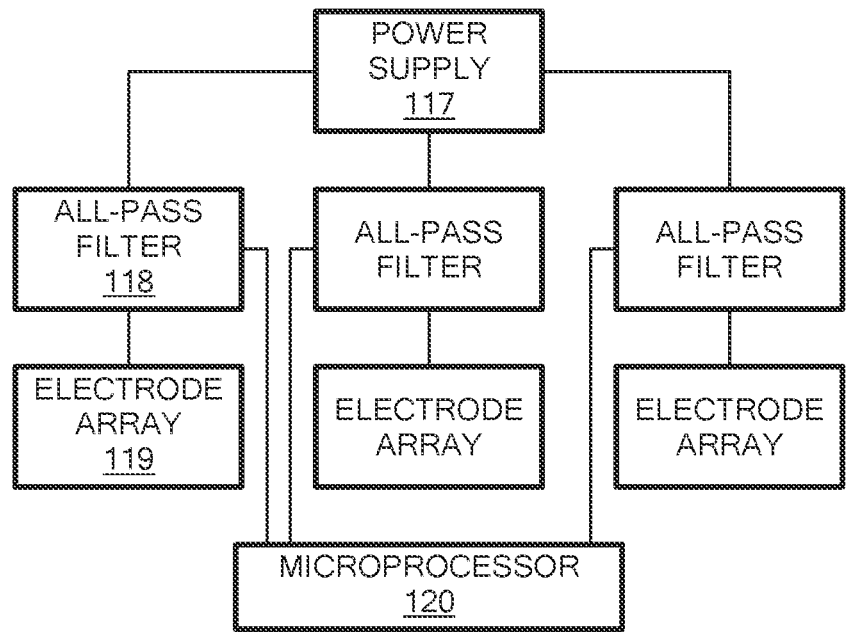
FIG. 27C shows a schematic diagram of an alternate system to control the relative phase of waveforms delivered to a plurality of electrode arrays, according to an embodiment of the present invention.
Figure 27D:
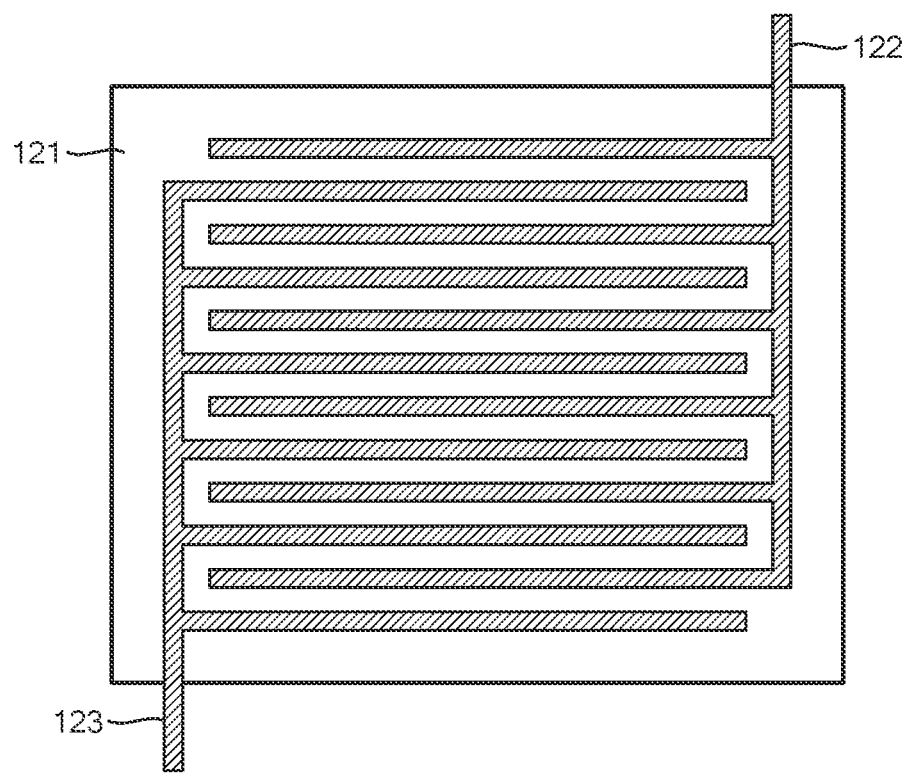
FIG. 27D shows an individual electrode array, according to an embodiment of the present invention.

FIG. 27C shows a schematic diagram for a system to control the relative phase of electrical power delivered from a power supply 117 to a plurality of electrode arrays 119, using a plurality of parallel, tunable all-pass filters 118 that are controlled by a microprocessor 120.

FIG. 27B shows a schematic diagram for an alternative system to control the relative phase of power delivered to a plurality of electrode arrays 116. A microprocessor 114 controls the relative phase of voltage waveforms provided by a plurality of power supplies 115, arranged in parallel. Each power supply 115 is connected to a different electrode array 116.

Figure 27E:
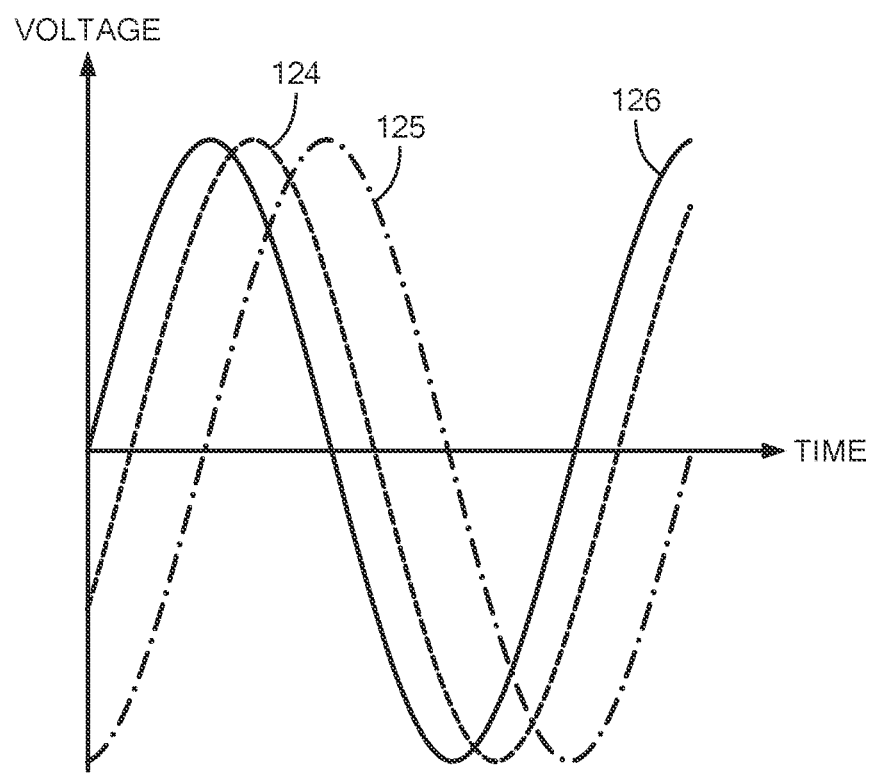
FIG. 27E is a plot of the voltages of three waveforms over time on three different electrode arrays, according to an embodiment of the present invention.

FIG. 27E shows three waveforms with different relative phases, as may be provided by the systems shown in FIG. 27B or FIG. 27C. A first sinusoidal voltage signal 124 is preceded in time by signal 126 and succeeded in time by signal 125.

Rotor Energizing, without Continuous, External High-Voltage Source

Another embodiment of the invention solves the problem of energizing a rotor to a high voltage without a need to continuously supply high voltage from a source external to the rotor. A capacitor which can be charged to a high voltage is attached to the rotor. For example, a 500 picofarad (pF) ceramic capacitor rated to a maximum voltage of 7500 volts may be used. The terminals of the capacitor are electrically connected to a plurality of electrodes that face the surface of the rotor. The terminals of the capacitor are also connected to the output of a DC-to-DC step-up converter, a device known to persons having ordinary skill in the art, which accepts a low voltage current to its inputs and outputs a much higher voltage to charge the capacitor. For example, a 10 volt to 5000 volt boost converter may be used. The inputs of the step-up converter are connected to a rotary electrical joint that enables power from an external supply of low-voltage power to be transmitted to the rotor while it rotates. Examples of rotary electrical joints that are suitable for transmitting power to a rotor include brushed slip rings, liquid metal slip rings, rotary transformers and resonant inductive coupling devices. If a rotary transformer or other alternating current (AC) rotary joint is used to transfer power from an AC source, an AC to DC step-up converter is used to provide high-voltage direct current (DC) power to the capacitor. If DC power is applied through a rotary electrical joint that is compatible with such power, such as a brushed slip ring or liquid metal slip ring, a DC to DC step-up converter is used.

Figure 22A:
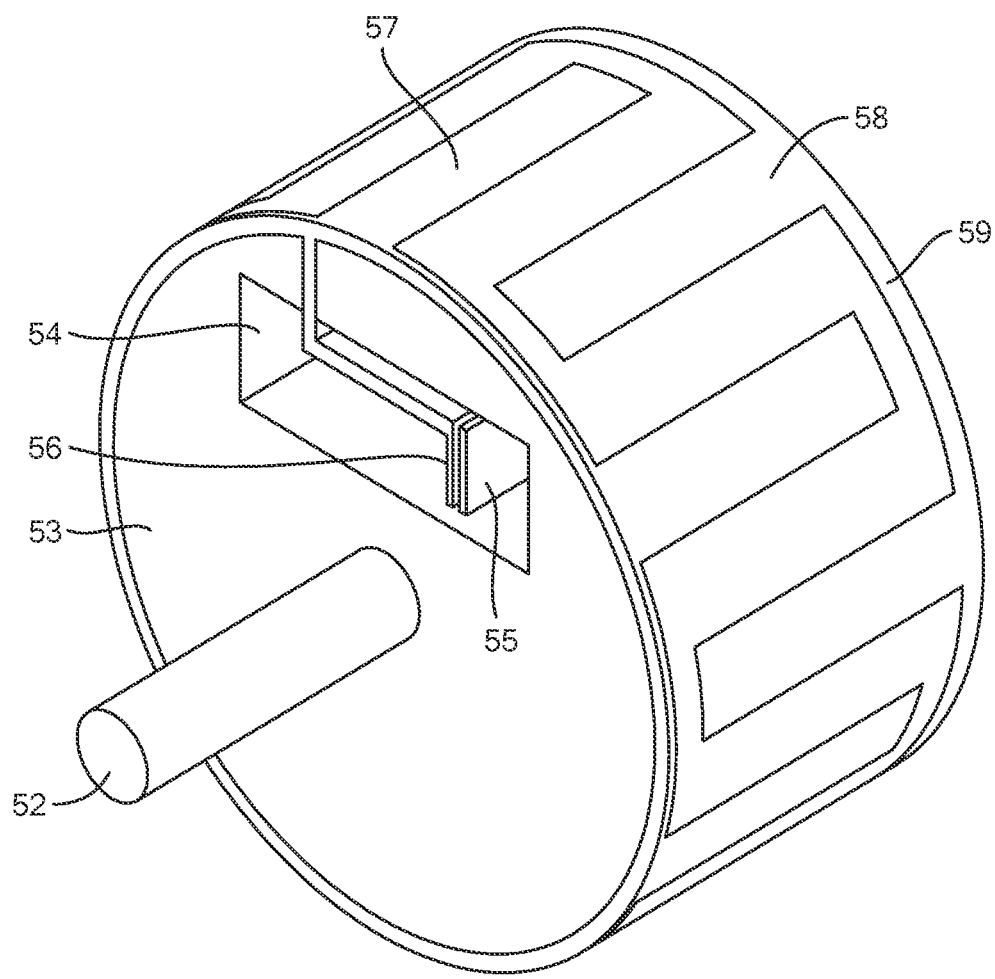
FIG. 22A shows the rotor of an electrostatic machine which comprises a capacitor that provides electrical charge to a plurality of electrodes, according to an embodiment of the present invention.
Figure 22B:
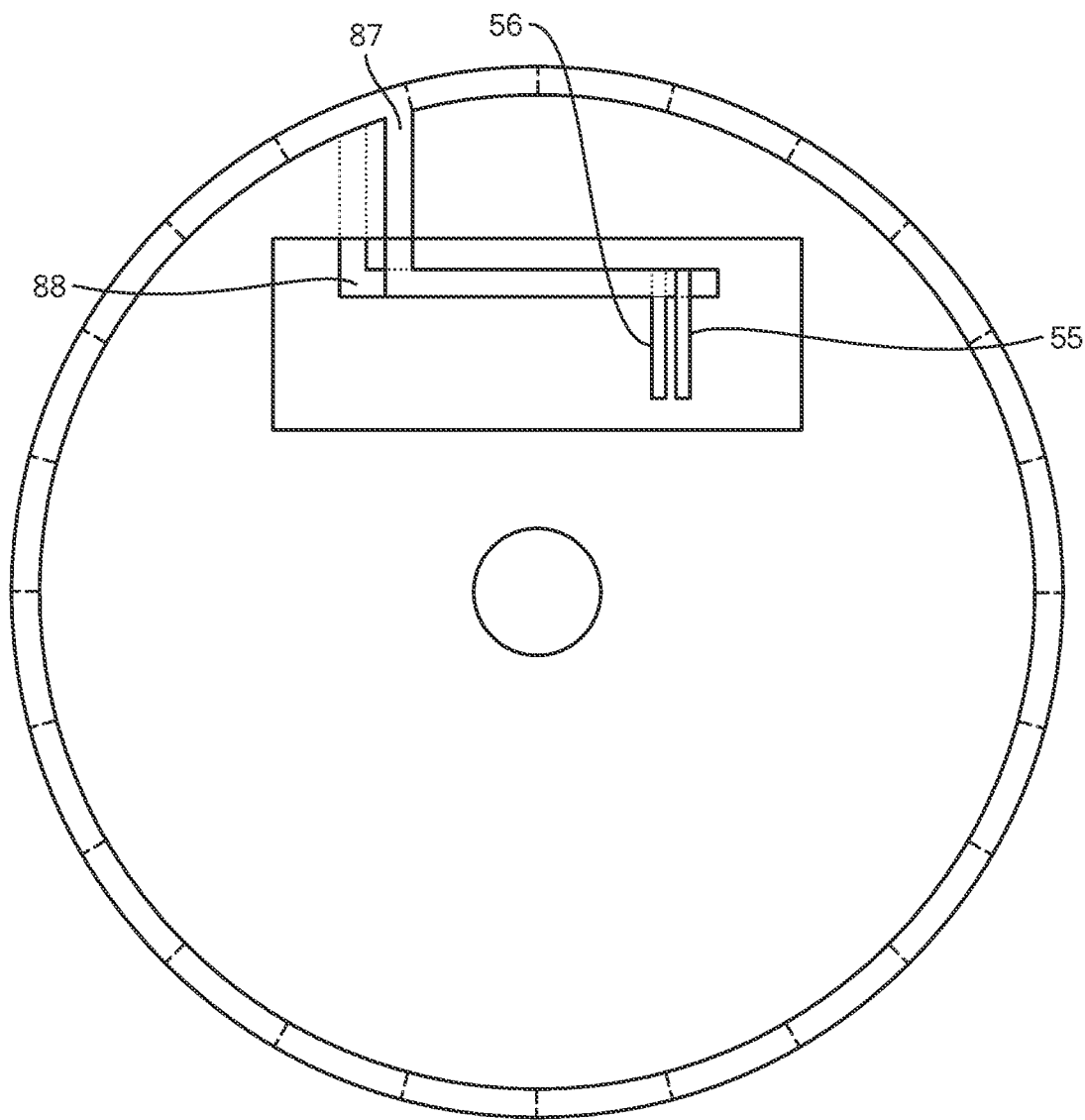
FIG. 22B shows a front view of the rotor shown in FIG. 22A, according to an embodiment of the present invention.
Figure 22C:
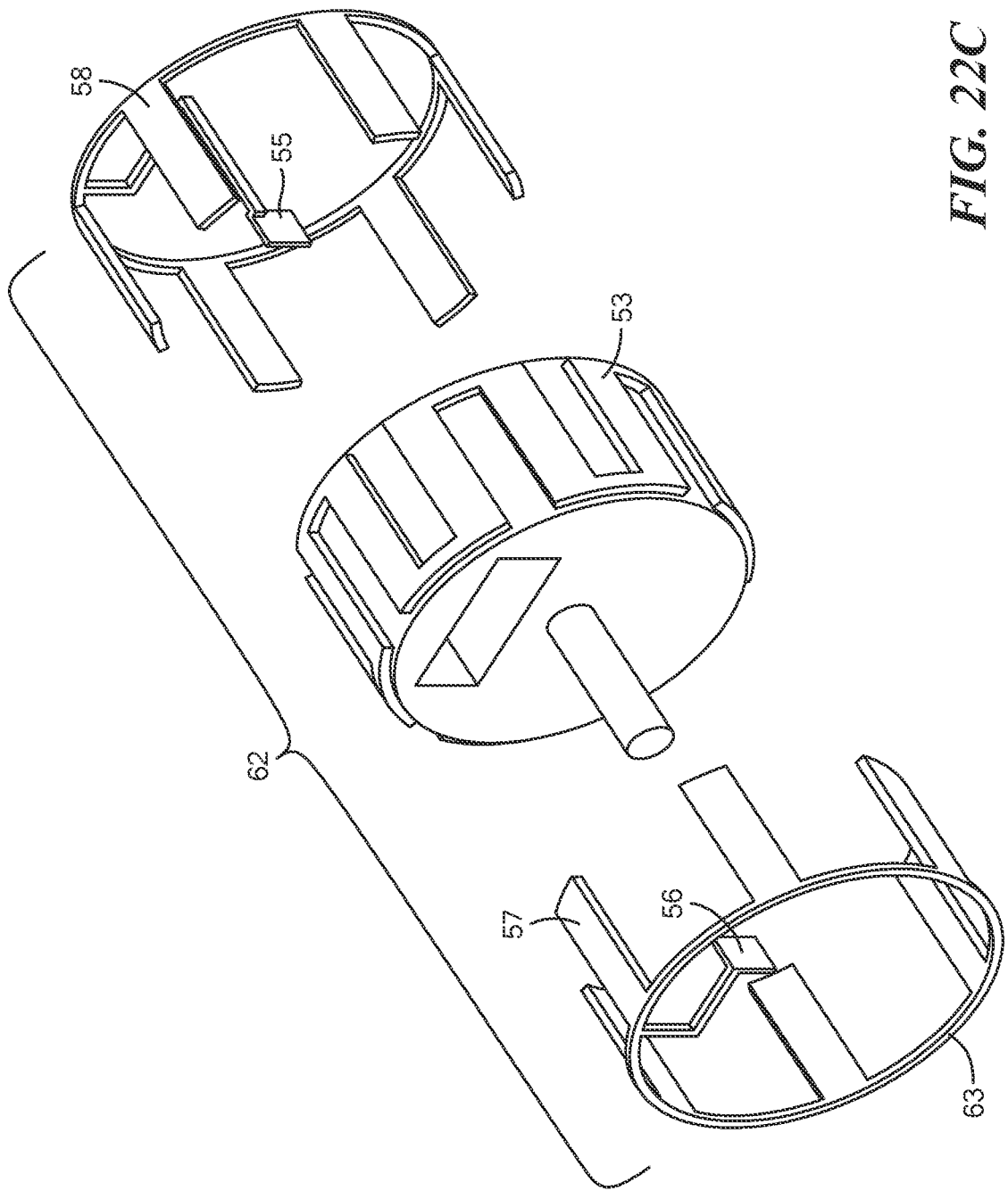
FIG. 22C shows an exploded view of the rotor shown in FIG. 22A and FIG. 22B, according to an embodiment of the present invention.

FIG. 22A shows a rotor 53 comprising a capacitor; the capacitor further comprising a first plate 55 and a second plate 56. The capacitor is shown in a cavity 54 formed within the body of the rotor 53. The first plate 55 of the capacitor is electrically common with a plurality of electrodes 58 on the rotor surface, and the second plate 56 is electrically common with a second plurality of electrodes 57 on the rotor surface. FIG. 22B shows a front view of the rotor shown in FIG. 22A. FIG. 22C shows an exploded view of rotor shown in FIGS. 22A-B.

Figure 24A:
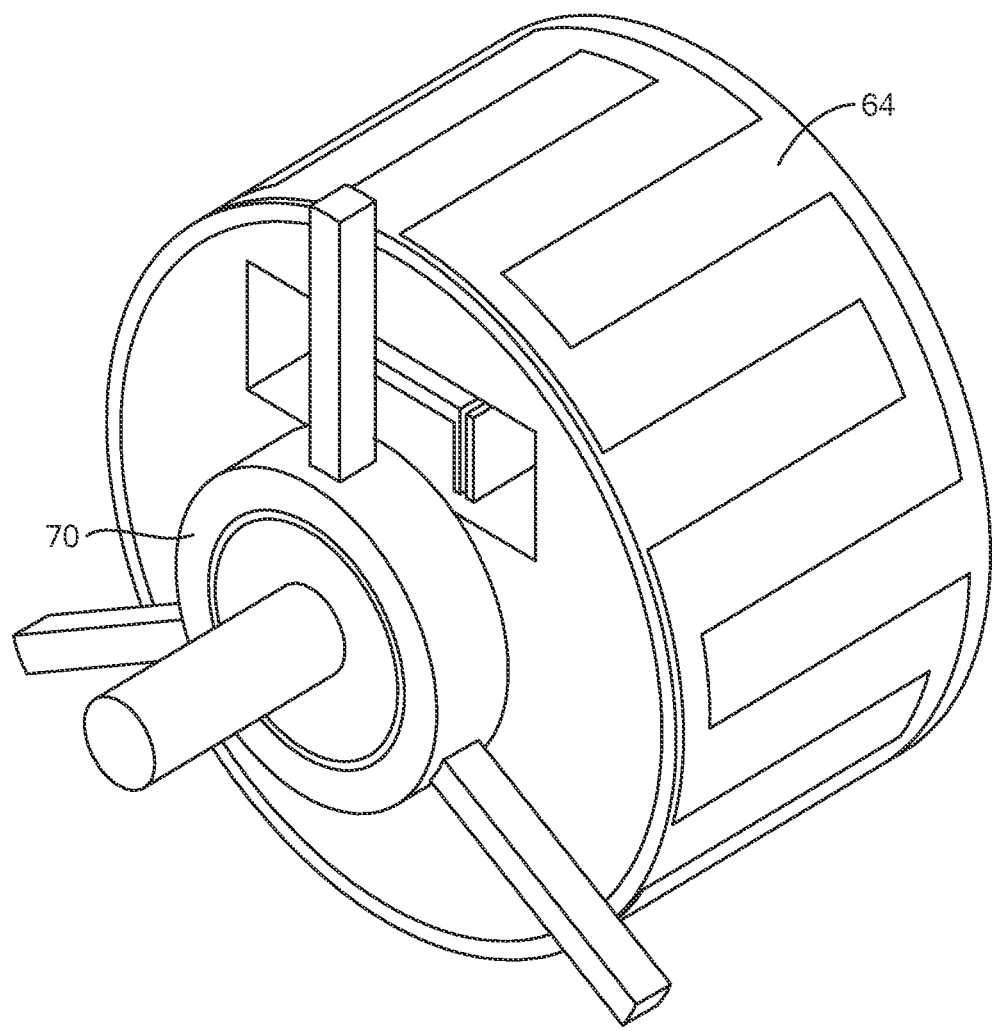
FIG. 24A shows the rotor of FIGS. 22A-22C, combined with a rotary transformer, according to an embodiment of the present invention.
Figure 24B:
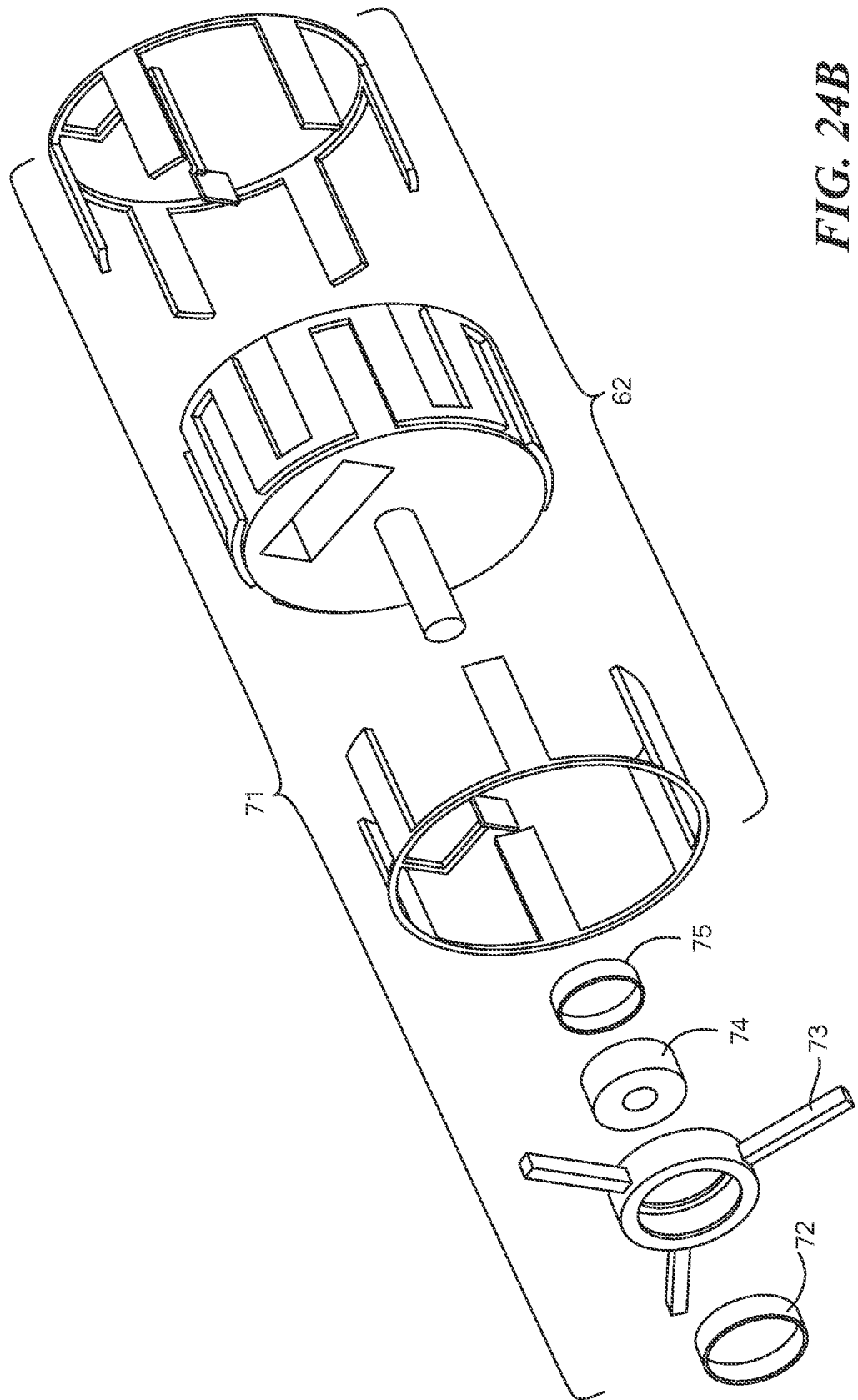
FIG. 24B shows an exploded view of the rotor and rotary transformer shown in FIG. 24A, according to an embodiment of the present invention.
Figure 24C:
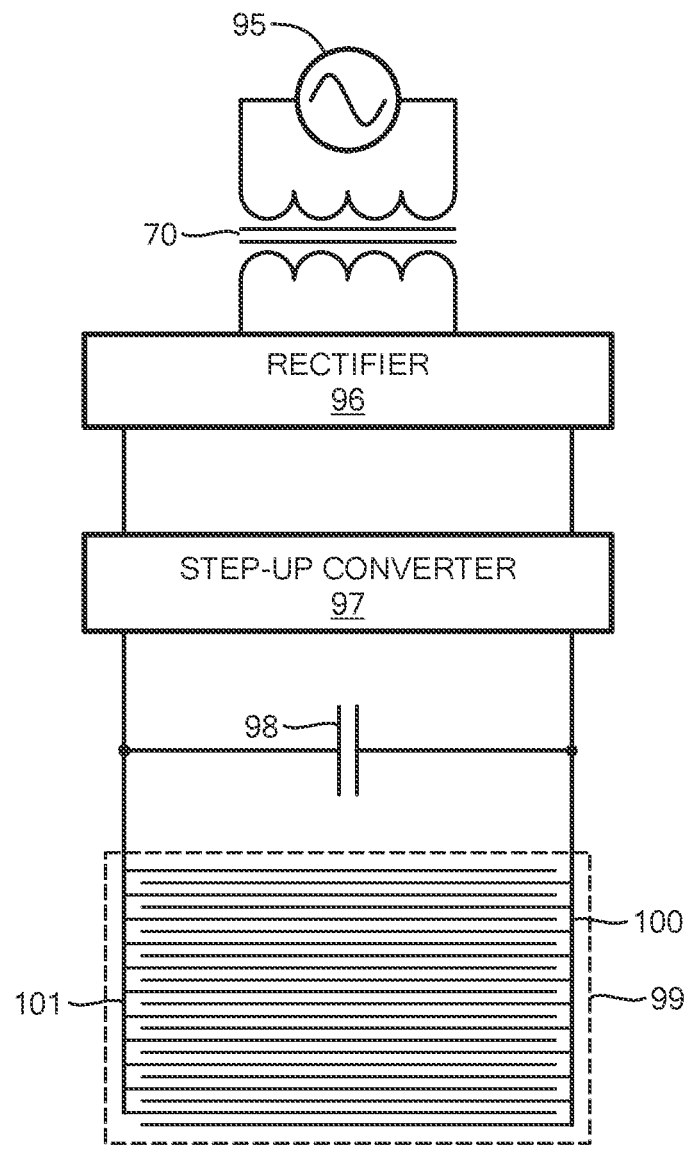
FIG. 24C shows a schematic diagram for a circuit to operate the combined rotor and rotary transformer shown in FIGS. 24A and 24B, according to an embodiment of the present invention.
Figure 25A:
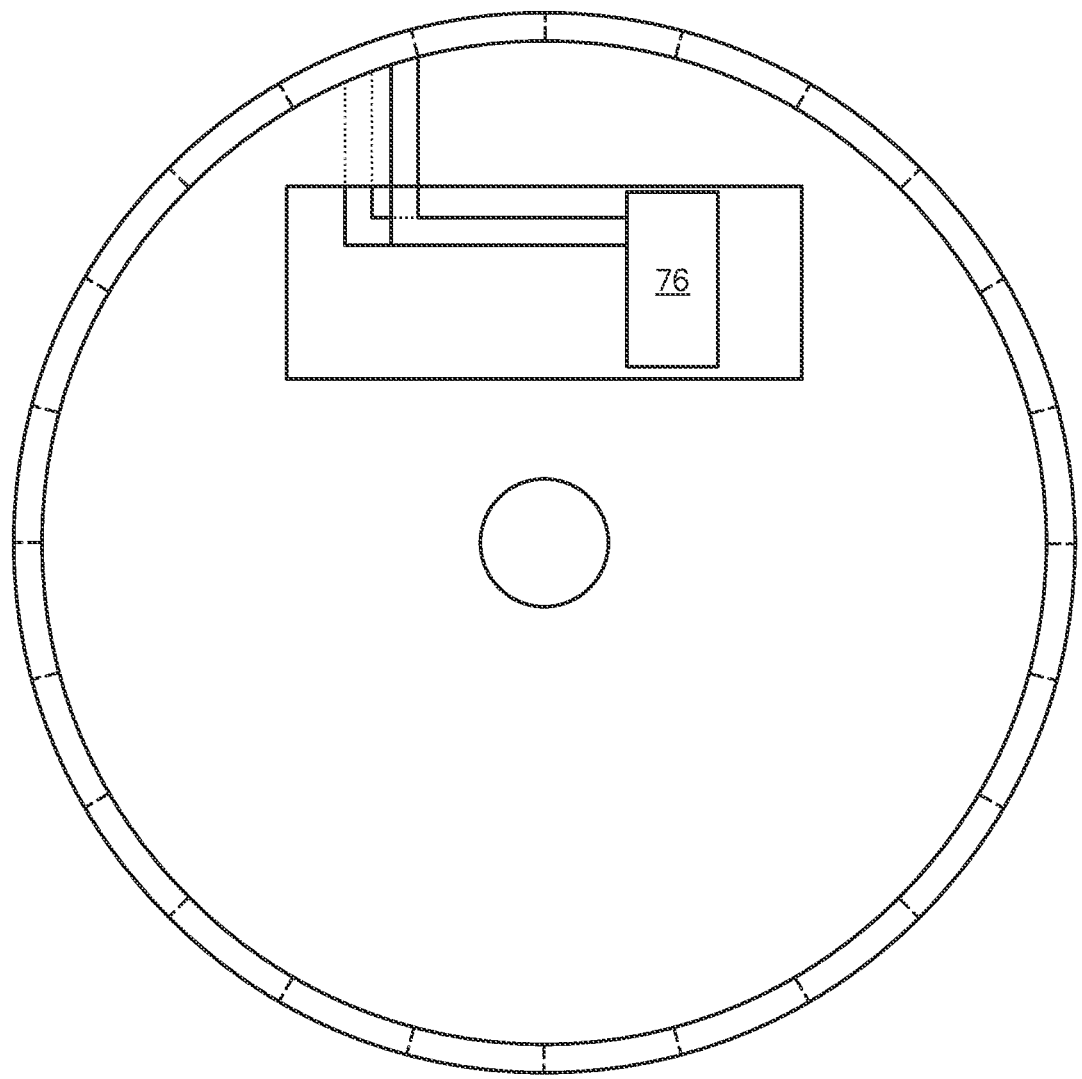
FIG. 25A shows a front view of a rotor of an electrostatic machine comprising an electret within a chamber, according to an embodiment of the present invention.
Figure 25B:
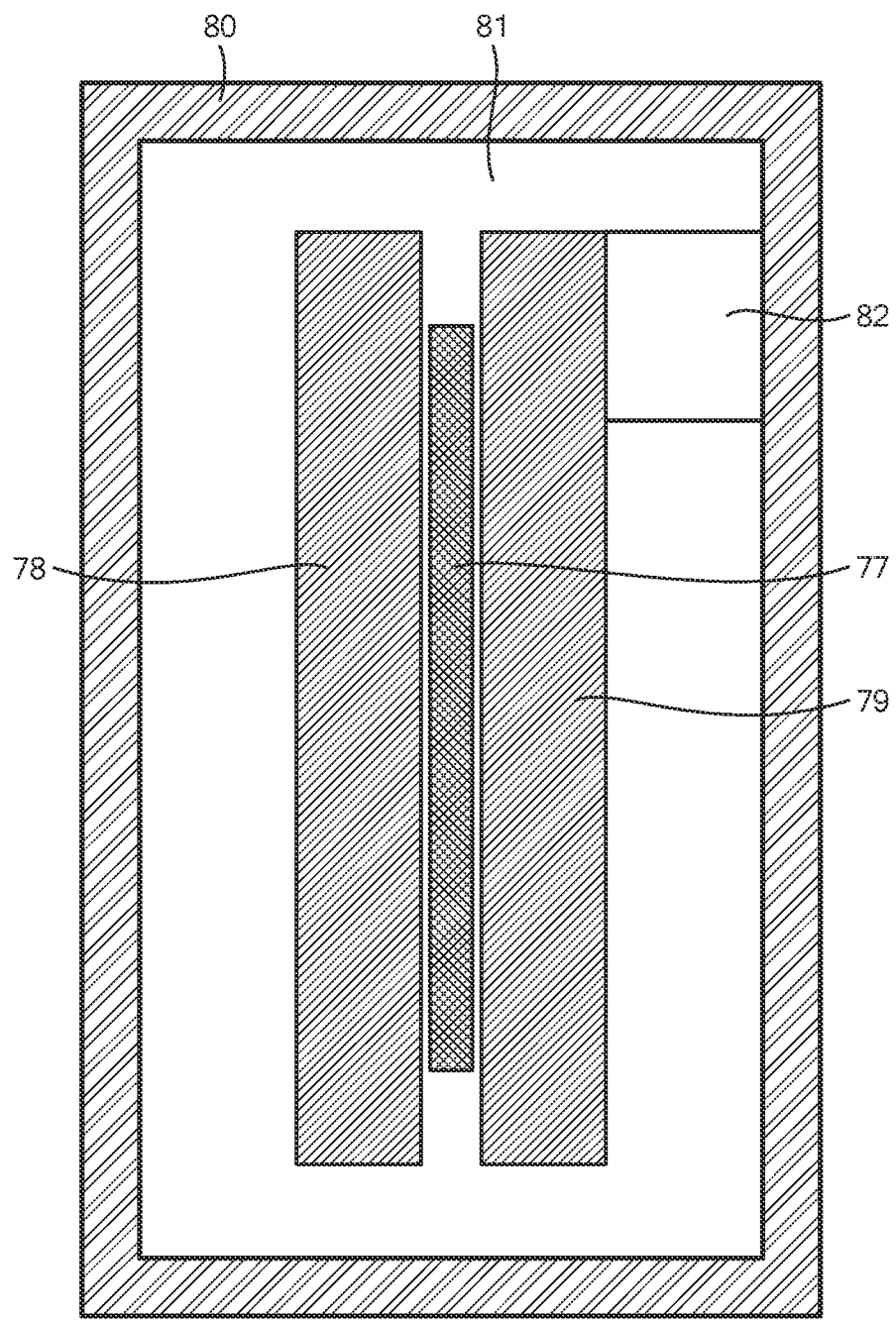
FIG. 25B shows a cross sectional view of a chamber containing an electret, according to an embodiment of the present invention.
Figure 25C:
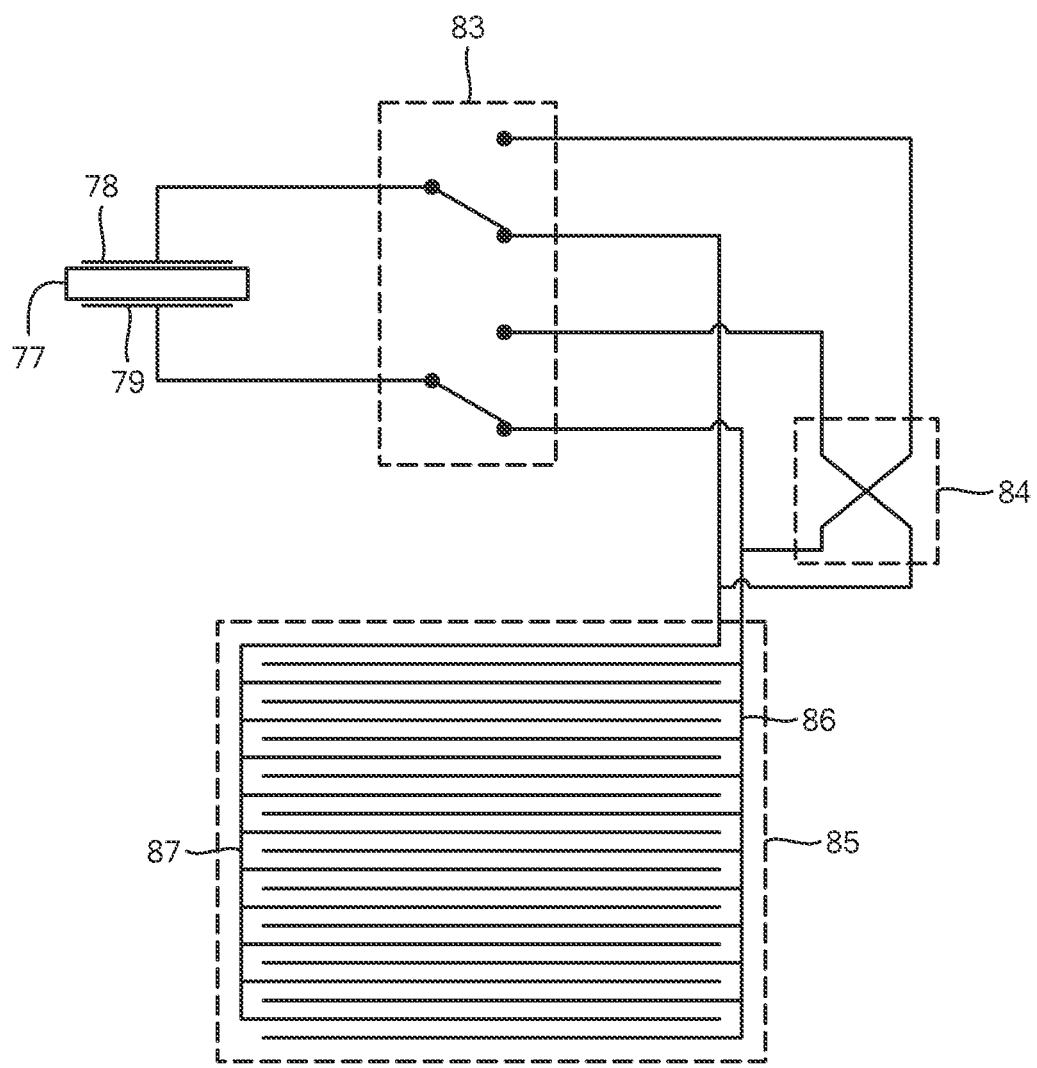
FIG. 25C shows a schematic diagram for a circuit to operate the rotor shown in FIGS. 25A-B, according to an embodiment of the present invention.

FIGS. 24A, 24B, and 24C show a rotor comprising a rotary transformer and a capacitor. FIG. 24A shows a rotary transformer 70 that is combined with a rotor comprising a capacitor 64, as in FIG. 22A. FIG. 24B shows exploded views of the rotor and rotary transformer shown in FIG. 24A. In exploded view 71, the stator winding of the rotary transformer 72 is shown displaced from its housing 73. The stator winding housing 73 is rigidly connected to the case of the electrostatic machine. Also in view 71, the rotor winding 75 is shown displaced from its housing 74. Exploded view 62 shows components that comprise a rotor that comprises a capacitor. FIG. 24C is a schematic diagram of an electrical circuit for charging the embodiment shown in FIGS. 24A and 24B. The electrical circuit is attached to the rotor. A source of alternating current 95 is applied to the stator winding of the rotary transformer 70. The output of the rotary transformer, taken from the rotor winding 75, is rectified to direct current by a rectifier 96. The voltage of the rectified direct current is increased to a high voltage by a step-up converter 97. The high-voltage, direct current output of the step-up converter 97 is used to charge a capacitor on the rotor, and also to apply high voltage to a rotor electrode array 99, comprising a first set of electrically common electrodes 100, and a second set of electrically common electrodes 101. An advantage of the embodiment shown in FIGS. 24A, 25B, and 25C is that the rotor can be charged to high voltage without any physical connection to an external power source, thereby providing a solution to charge the rotor without causing rotational friction which would reduce the efficiency of the electrostatic machine. An advantage of the capacitor shown in FIGS. 24A, 24B, and 24C is that it stores energy to provide continuous charge to the rotor if current from an external power supply 95 is disconnected or interrupted. The capacitor 98 may be replaced by, or installed in parallel with, a high-voltage, rechargeable battery. A low-voltage rechargeable battery or capacitor may be installed in parallel with the outputs of the rectifier to store energy. Another embodiment provides a solution to energize the rotor from a source of high voltage power. The rotor contains a capacitor, which can be charged to a high voltage, attached to the rotor. For example, a 500 picofarad ceramic capacitor rated to a maximum voltage of 7000 volts may be used. The terminals of the capacitor are electrically connected to a plurality of electrodes, which face the surface of the rotor. The terminals of the capacitor are also connected to a pair of centrifugal switches. When the rotor is stopped, or moving at a slow speed, the centrifugal switches close, and allows current to flow from an external source to charge the capacitor. When the rotor reaches a predetermined high speed of rotation, the centrifugal switches open. An advantage of this embodiment is that mechanical wear and friction causes by switch contact is reduced because the switches are mechanically disconnected when the rotor is spinning rapidly. If the high voltage power is provided as alternating current, a high voltage rectifier circuit is placed between the rotary switches and the capacitor. For example, a full bridge rectifier circuit may be constructed from four diodes.

Another embodiment of the invention uses one or more electrets as a source of electrical charge for a plurality of conductive electrodes disposed near the surface of the rotor of an electrostatic machine. The problem of electret charge depletion is solved in this embodiment by enclosing the electrets in a hermetically sealed, electrically insulated chamber that is attached to the rotor, as shown in FIGS. 25A, 25B, and 25C. FIG. 25A shows the chamber 76. The chamber is provided with electrical leads that pass through the seal of the chamber, and terminate within the chamber at conductive surfaces that closely face, or are in contact with, the charged surfaces of the electrets, such that the conductive surfaces and leads become electrically charged by electrostatic induction due to their proximity to the electrets.

The electret material, the chamber material and the environment within the chamber are chosen according to the voltage required between rotor electrodes. For example, if a voltage of less than approximately 500 volts is required between rotor electrodes, an electret can be made of polytetrafluoroethylene (PTFE) polymer sheet. The PTFE electret is made by implanting negative ions on the polymer by corona spray deposition in ambient air, to obtain a surface charge density of approximately $200 \times 10^{-9}$ Coulombs per square centimeter. The charged electret is then placed in an air-filled chamber, such as a box made of alumina, and the lid of the box is sealed to the body of the box with epoxy.

To provide electrode voltages greater than approximately 500 volts, electrets can be prepared with a high surface charge by charging them in an environment with a greater breakdown voltage than ambient air, and then encapsulating them in the chamber containing the same environment. For example, the environment may include a dielectric liquid, such as silicone oil, a dielectric gas, such as sulfur hexafluoride, a high vacuum, such as air at about 0.1 Pascal absolute pressure, or high pressure gas, such as nitrogen at about $2 \times 10^6$ Pascal.

An electret sealed in a high vacuum chamber is used to provide very high voltages to rotor electrodes, for example, 10,000 volts. The electret is charged while in a high vacuum environment, placed within a chamber, and then the chamber is sealed. For example, an electret made of a two-layer material that includes silicon nitride and silicon dioxide is charged using an electron gun in a high vacuum chamber. While maintaining high vacuum, the charged electret is placed in a box, such as a silicon box, and the box lid is sealed to the box by melting a layer of glass frit using a laser beam.

FIG. 25B shows a cross sectional view of the chamber 76. One electrical lead 82 is shown connecting to a first 79 conductive surface. A second conductive surface 78 is connected to a second electrical lead that is not shown, because the section cutting plane removes the lead from the view. An electret 77 is located between surfaces 78 and 79. The chamber comprises a shell 80. A volume 81 within the chamber is a partial vacuum in an embodiment, or alternatively may be filled with a dielectric fluid.

This embodiment further includes an electrical circuit that can connect, disconnect or reverse the polarity of the electrical connection between the electret and electrodes on the rotor. The purpose of the circuit is to solve the problem of charged particle accumulation on a charged electrode surface, which may cancel the charge induced by the electret. The circuit includes an H-bridge circuit made from four switching devices, such as transistors or electromechanical relays. Each transistor or electromechanical relay is actuated by a control voltage that is provided by a control circuit. The control circuit includes a microprocessor that is programmed to independently open and close the switching devices. The control circuit further includes an oscillator, such as a quartz crystal oscillator, and is powered from a power supply that is external to the rotor through a rotary electrical joint between the stator and rotor, such as a rotary transformer.

The microprocessor is programmed to periodically reverse the polarity of the charge applied to the electrodes. The microprocessor measures time by counting the oscillations of the oscillator, and comparing the elapsed time to a predetermined (possibly programmable or user selectable) time interval between reversal events, for example, 10 minutes. The predetermined time interval is chosen according to the rate at which particles accumulate on the rotor, which in turn depends on the design of the electrostatic machine as a whole and on the environment in which it is operated.

FIG. 25C shows a schematic diagram of an electrical circuit for a rotor comprising an electret 77. The electret is connected to an electrode array 85 through a double pole, double throw (DPDT) switch 83. The DPDT switch 83 can be controlled by a control signal provided by a microprocessor, as described above, or other electrical timing circuit. A controllable DPDT switch can be made from electromechanical relays or transistor switching devices, such as the H-bridge circuit described above. A DPDT switch can be switched between two states by the control signal. In one switching state, the DPDT switch connects a first set of electrodes 86 to a first conductive surface 78 in proximity to the electret, and a second set of electrodes 87 to a second conductive surface in proximity to the electret 79. In a second switching state, the DPDT connects the first set of rotor electrodes 86 to the second conductive surface of the electret 79, and connects the second set of rotor electrodes 87 to the first conductive surface 78 in proximity to the electret. The wiring path 84 provides the reversal of polarity required for the electrical connections described above.

In another embodiment, the rotor of an electrostatic machine is energized by the amplified and rectified output of an electrostatic generator. The rotor of the electrostatic generator is connected to the rotor of the electrostatic machine and rotates about the same axis as the rotor of the electrostatic machine. The rotor of the electrostatic generator comprises a plurality of electrodes that face a surface of the rotor. The rotor electrodes include two groups of electrodes. Each group of rotor electrodes is electrically common with itself, and electrically isolated from the other group. The rotor electrodes are disposed circumferentially such that electrodes from the first group alternate with electrodes from the second group. The stator of the electrostatic generator includes a second plurality of electrodes that face a surface of the stator. Each group of stator electrodes is electrically common with itself, and is electrically isolated from the other group. The stator electrodes are disposed circumferentially such that electrodes from the first group alternate with electrodes from the second group. The stator electrodes face the rotor electrodes. A voltage is applied between the first group and the second group of stator electrodes. As the rotor rotates, charges of opposite polarity are electrostatically induced in the first and second group of rotor electrodes, respectively. The input terminals of an alternating current to direct current step-up converter (AC-to-DC step-up converter) are connected to the first and second group of rotor electrodes, respectively, and the charges of opposite polarity cause a current to flow through the inputs of the converter. The output terminals of the AC-to-DC step-up converter are connected to the rotor electrodes of the electrostatic machine. A capacitor may be attached in parallel with the outputs of the AC-to-DC step-up converter, such that after the capacitor becomes charged to the output voltage of the converter, the rotor electrodes of the electrostatic machine remain charged when the rotor is stationary.

In another embodiment, the rotor of an electrostatic machine is energized by an electromagnetic generator. The rotor of the generator rotates about the same axis as the rotor of the electrostatic machine. The rotor of the generator includes an armature winding, in which alternating current (AC) is induced, of a low voltage in comparison with the voltages that would be advantageous to apply to the electrodes of an electrostatic machine. For example, a small generator may have a root mean square output voltage of about 10 volts, but a voltage greater than approximately 500 volts is desired. Therefore, the low-voltage, AC output from the armature is increased to the desired voltage by an alternating current-to-direct current step-up converter (an AC-to-DC converter). The output of the AC-to-DC converter is connected to the terminals of a capacitor that is attached to the rotor. Alternatively, the output current of the armature is converted to direct current with a commutator, and the voltage of the commutator output is converted to a high voltage using a direct current-to-direct current (DC-to-DC) step-up converter. The terminals of the capacitor are also connected to a plurality of electrodes facing the surface of the rotor. The stator of the generator includes a plurality of magnetic field generating elements that face the armature windings. The field generating elements can be permanent magnets, field windings or a combination of permanent magnets and field windings.

Figure 23A:
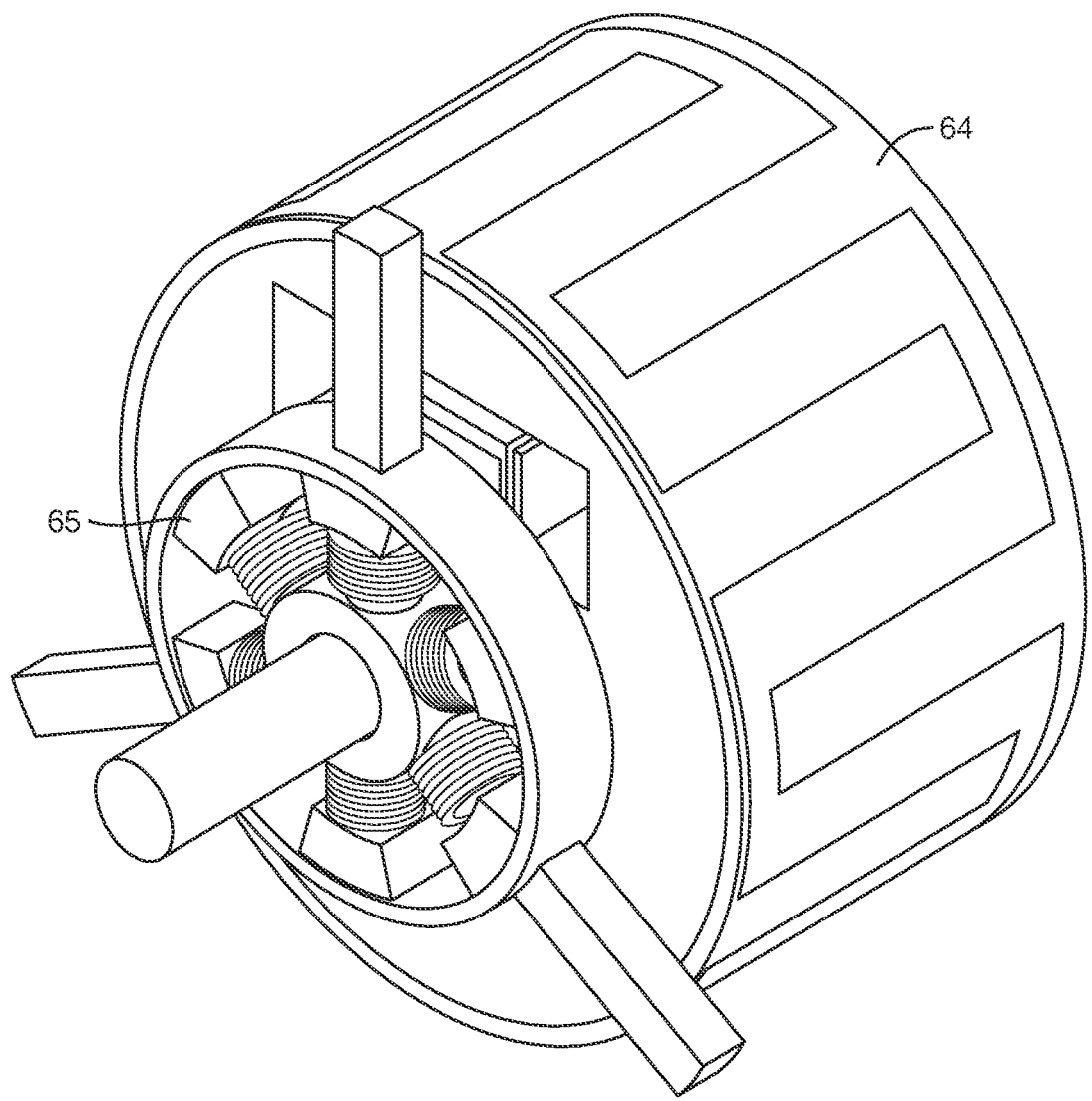
FIG. 23A shows the rotor of FIGS. 22A-22C, combined with an electrical generator, according to an embodiment of the present invention.
Figure 23B:
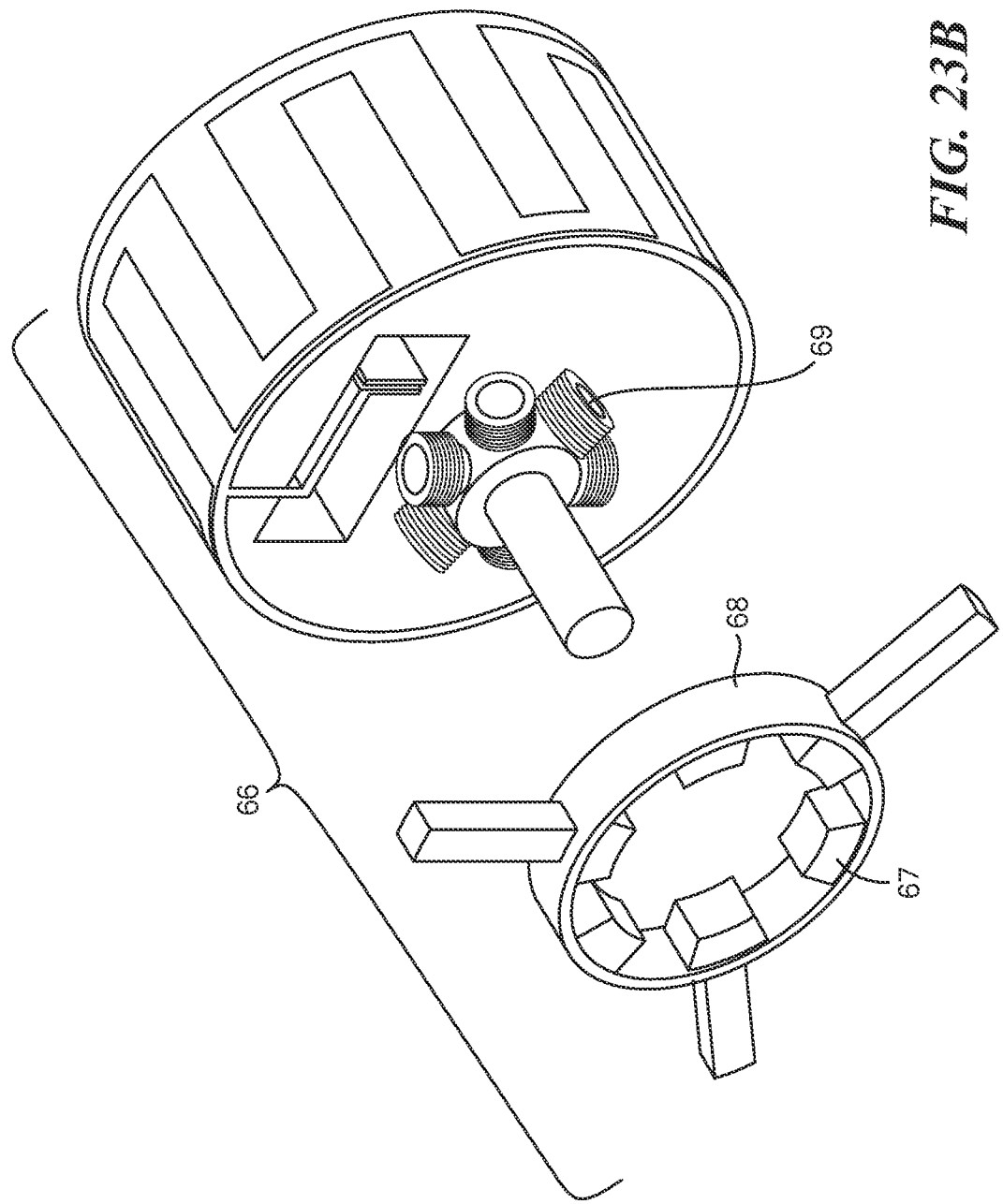
FIG. 23B shows an exploded view of the rotor and generator shown in FIG. 23A, according to an embodiment of the present invention.

FIG. 23A shows an electrical generator 65 that is combined with a rotor comprising a capacitor 64. FIG. 23B shows an exploded view 66 of the generator and rotor shown in FIG. 23A. In FIG. 23B, a stator of the electrical generator comprises a plurality of permanent magnets 67. The rotor rotates relative to the stator. The rotor 69 of the electrical generator is attached to a rotor an electrostatic machine. The generator rotor 69 comprises a plurality of coils that develop an electrical current when the rotor of the electrostatic machine causes the coils to rotate relative to the permanent magnets 67.

Figure 23C:
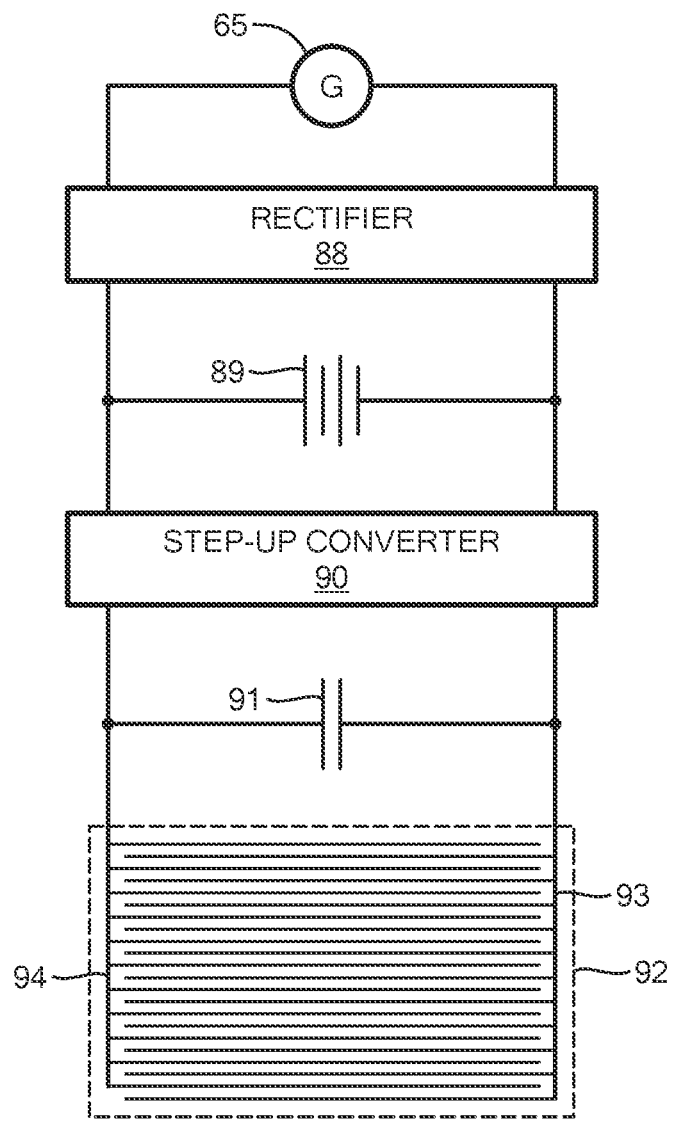
FIG. 23C shows a schematic diagram for a circuit to operate the combined rotor and generator shown in FIGS. 23A-23B, according to an embodiment of the present invention.

FIG. 23C is a schematic diagram for an electrical circuit to operate the combined rotor and electrical generator shown in FIG. 23A. The components of the circuit are attached to a rotor of an electrostatic machine. Alternating current output from the generator 65 is rectified to low voltage, direct current by a rectifier 88, and charges a battery 89. The low voltage direct current from the batter and rectifier are converted to a high voltage direct current by a step-up converter 90. A capacitor attached to the rotor 91 is charged to a high voltage from the step-up converter output 90. The capacitor terminals, and output terminals of the step-up converter are connected to a first 93 and second 94 electrical path comprising an electrode array on the rotor 92. The capacitor 91 may be replaced by, or installed in parallel with, a high-voltage, rechargeable battery. A low-voltage capacitor may be installed in parallel with the battery 89 to store electrical energy.

Another embodiment relates to a rotor of an electrostatic motor that becomes energized as it rotates within a dielectric fluid. The triboelectric effect (also known as triboelectric charging) causes certain materials to become electrically charged after they are separated from a material with a different affinity. Certain combinations of fluids and solid materials also exhibit triboelectric charging, in which the flow of fluid over a solid causes both materials to become charged. Triboelectric charging avoids the charge depletion challenges of electrets because charge is continuously regenerated.

Figure 32:
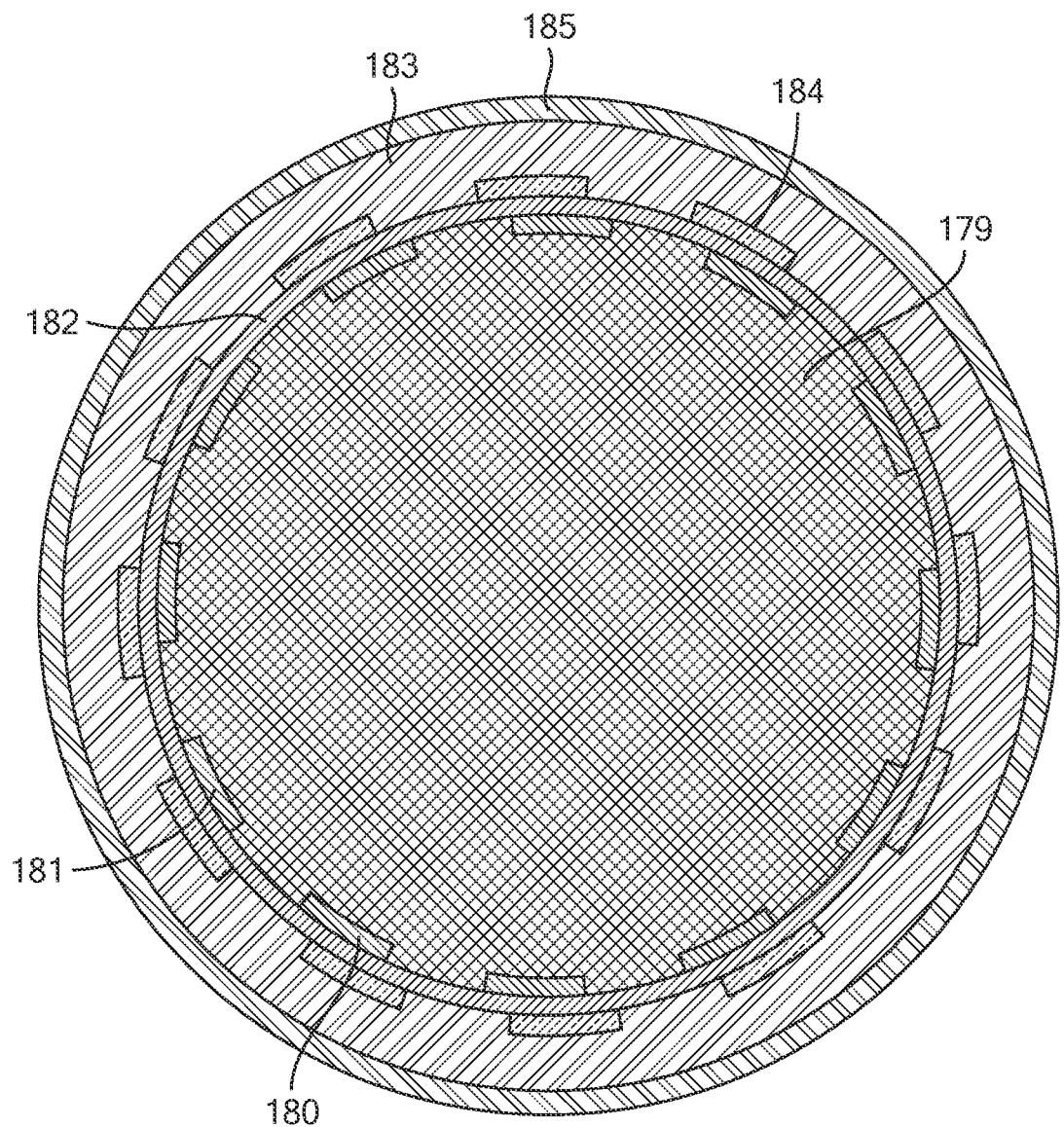
FIG. 32 shows a front section view of electrostatic machine that uses triboelectric charging to apply charge to surface of rotor, according to an embodiment of the present invention.

The rotor surface includes two materials that become triboelectrically charged to opposite potentials when moved through the dielectric fluid. For example, polytetrafluoroethylene (PTFE) and nylon on the rotor surface, with a water dielectric fluid may be used. The Ph of the fluid may be adjusted to control the relative charge accumulation on the different materials that comprise the rotor. The stator includes electrodes that applied electrical fields to the charged materials on the stator, causing a torque to be applied to the rotor. FIG. 32 shows a front section view of an electrostatic machine comprising a rotor with two materials that become charged to opposite polarities by triboelectric charging. The electrostatic machine of FIG. 32 comprises a case 185, stator non-conductive substrate 183, stator electrodes 184, dielectric fluid 182. The rotor comprises two materials, 180 and 181, that become triboelectrically charged due to the flow of dielectric fluid 182 over materials 180 and 181 as the rotor rotates.

The configuration described above can be reversed by placing the triboelectric materials on the stator and driving electrodes on the rotor. However, utilizing the triboelectric materials on the moving rotor is advantageous because it avoids the need to pass high-voltage, alternating current through a rotary electrical joint to the rotating rotor.

Rotor-Stator Gap Compensation

Another embodiment of the invention solves the problems of static displacements and of dynamic displacements of the rotor and stator of an electrostatic machine. A manipulator that has four kinematic degrees of freedom (DOF) is provided to adjust the position and orientation of the stator relative to the rotor, such that the stator axis and rotor axis can be made collinear by actuation of the actuators. A manipulator that can provide four DOF can be constructed from four or more actuators. A variety of manipulator configurations that provide the required DOF are known to practitioners of the art, and could be adapted to manipulate the position and orientation of a stator. A variety of manipulator configurations that have five DOF and six DOF are also known to practitioners of the art, and could also be adapted to manipulate the position and orientation of a stator. However, it is not beneficial to control the angle of rotation of the stator relative to the rotor axis because the rotor rotates about its own axis during operation, causing this angle to vary during operation regardless of its initial value. If the rotor or stator undergoes a translational displacement along the rotation axis of either body, the two bodies become axially displaced from one another. A structure can constrain the rotor and stator such that that two bodies do not undergo more than a predetermined amount of axial displacement relative to each other. Therefore, in some embodiments, a stator manipulator that provides more than four DOF is not used, as the advantages of providing the additional DOF are few in comparison with cost, system complexity, volume and weight required to provide them.

For some applications, the stator is manipulated in relation to the rotor, rather than to manipulate the rotor in relation to the stator, because the rotor is typically connected to external machinery, and thereby mechanically constrained. In some applications, moving an externally constrained rotor may cause high stresses within the rotor, which can damage or impede operation of the machine. However, in other applications of an electrostatic machine, the rotor is not externally constrained, such as a rotor that whose shaft is directly attached to a propeller, such as in a drone quadcopter. For such applications, the manipulator can be configured to manipulate the position and orientation of the rotor, instead of the stator. To manipulate the rotor, the manipulator can be connected between the case of the machine and the rotor supports (bearings), or between the rotor shaft and the outer shell of the rotor.

Figure 17A:
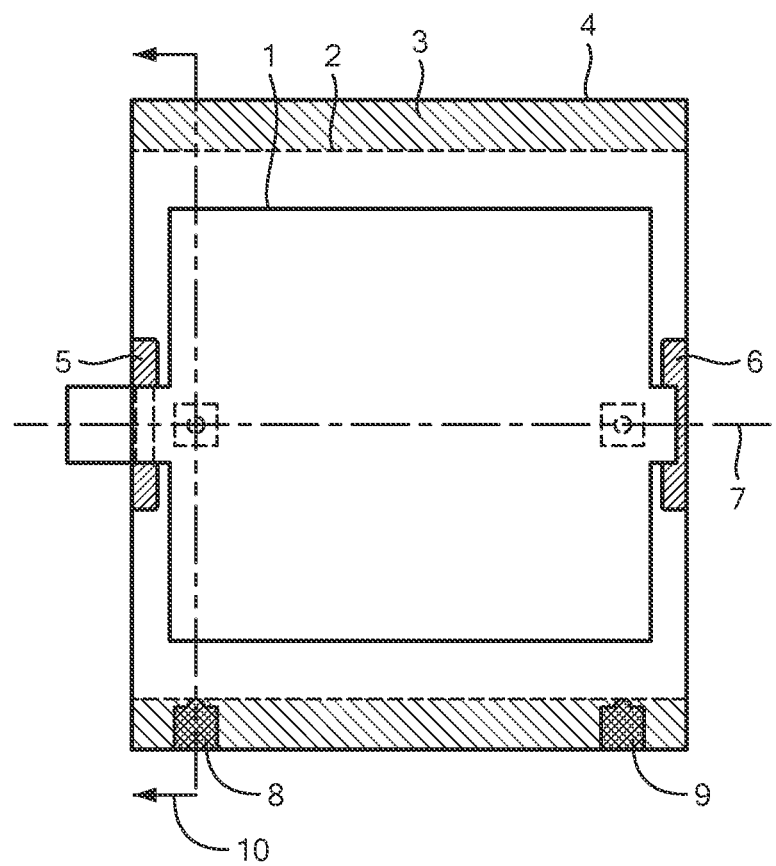
FIG. 17A is a side section view of an electrostatic machine comprising a stator, the configuration of which can be adjusted with four degrees of freedom, according to an embodiment of the present invention.
Figure 17B:
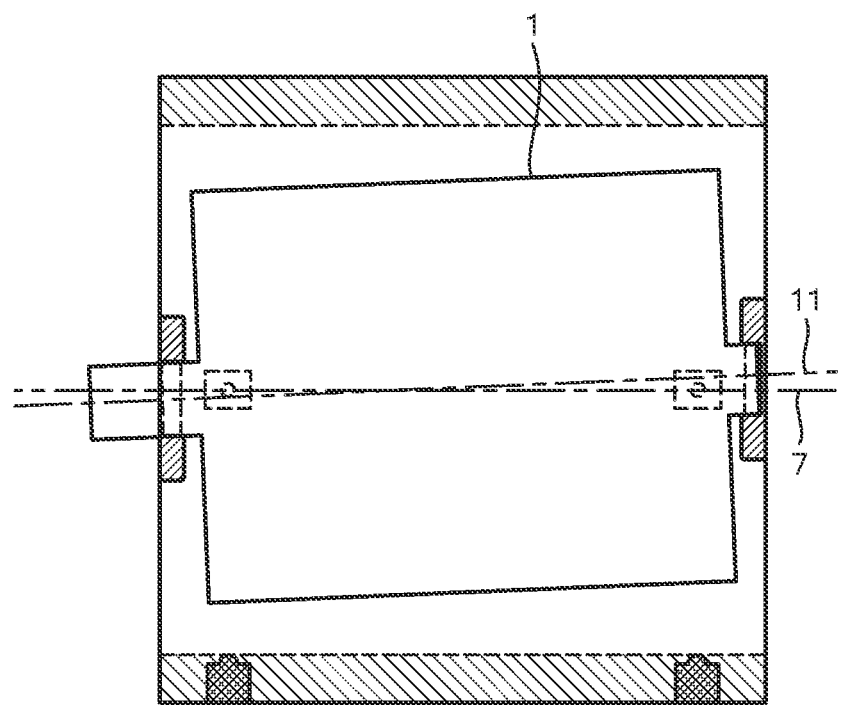
FIG. 17B is a side section view of the electrostatic machine shown in FIG. 17A, with the rotor angularly displaced, according to an embodiment of the present invention.
Figure 17C:
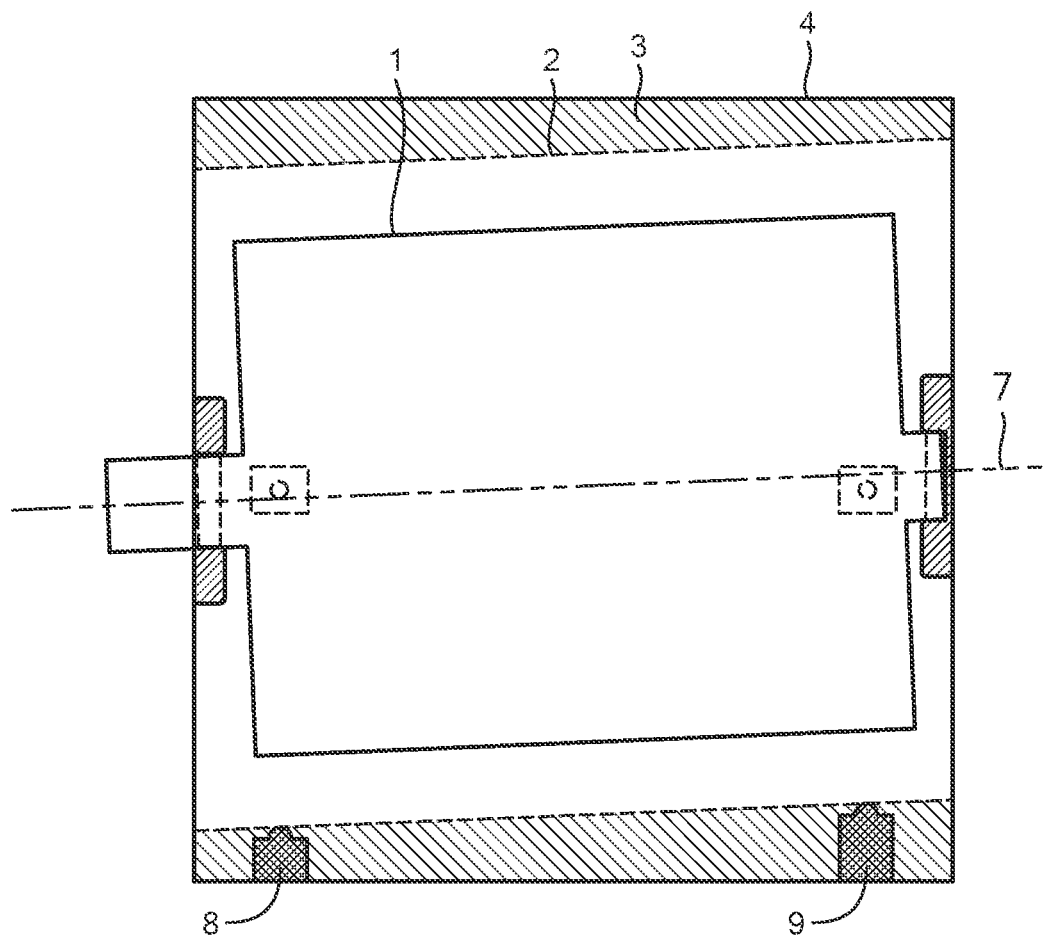
FIG. 17C is a side section view of the electrostatic machine shown in FIG. 17A, in which the stator is actuated such that its centerline is aligned to the centerline of the angularly displaced rotor, according to an embodiment of the present invention.
Figure 17D:
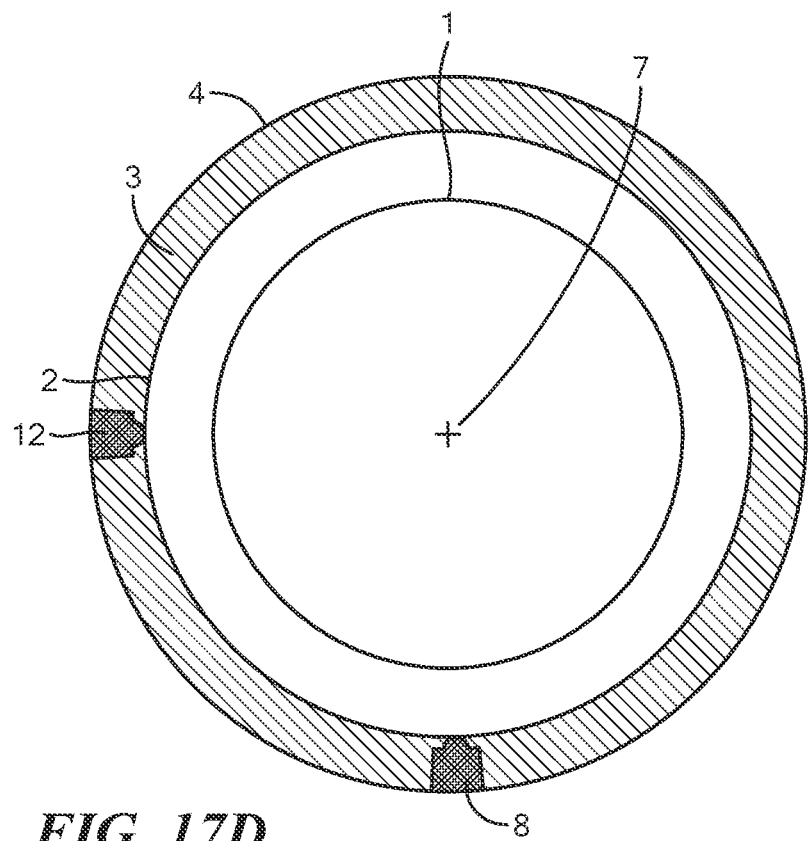
FIG. 17D is a front section view of the electrostatic machine of FIG. 17A, in which the section cutting plane is indicated by the cutting line shown in FIG. 17A, reference item 10, according to an embodiment of the present invention.
Figure 17E:
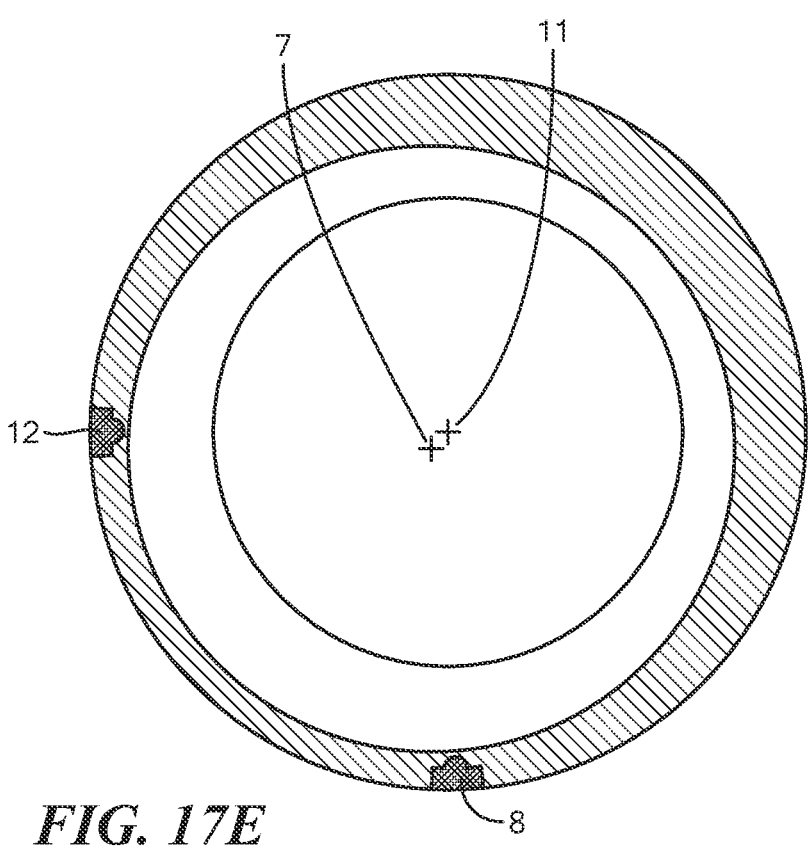
FIG. 17E is a front section view of the electrostatic machine of FIG. 17A, in which the section cutting plane is indicated by the cutting line shown in FIG. 17A, reference item 10, according to an embodiment of the present invention.

One example of a four DOF manipulator arrangement to manipulate the stator of an electrostatic machine is shown in FIGS. 17A, 17B, 17C, 17D, and 17E. FIG. 17A shows a side section view of an electrostatic machine comprising a rotor 1, stator shell 2, elastic material 3, and case 4. The rotor is supported by a front bearing 5, and rear bearing 6. The stator shell is contacted by four actuators that can displace the stator shell relative to the case and rotor. Two of the four actuators, 8 and 9, are numbered in FIG. 17A. FIG. 17B shows a side section view of the electrostatic machine in which the rotor 1 is angled such that its axis, or centerline, 11 is angularly displaced from the centerline of the stator 7. A rotor may become displaced as in FIG. 17B due to manufacturing errors, mechanical stresses, or other causes. In FIG. 17C, actuators 8 and 9 are actuated to rotate the stator 1 such that its centerline becomes aligned to the centerline of the rotor as seen in FIG. 17B. The aligned positions of both centerlines are indicated by line 7. FIG. 17D shows a front section view of the electrostatic motor, in which the section cutting plane 10 is as shown in FIG. 17A. In FIG. 17D, the stator and rotor centerlines are aligned as indicated by line 7 (end view of the line 7 is shown as a cross). FIG. 17D shows that there are two actuators, 8 and 12, situated at the front end of the stator. FIG. 17E shows an alternate position of the electrostatic machine, with actuators 8 and 12 shown actuated to be shorter than in FIG. 17D, causing one end of the stator to be displaced.

Figure 20A:
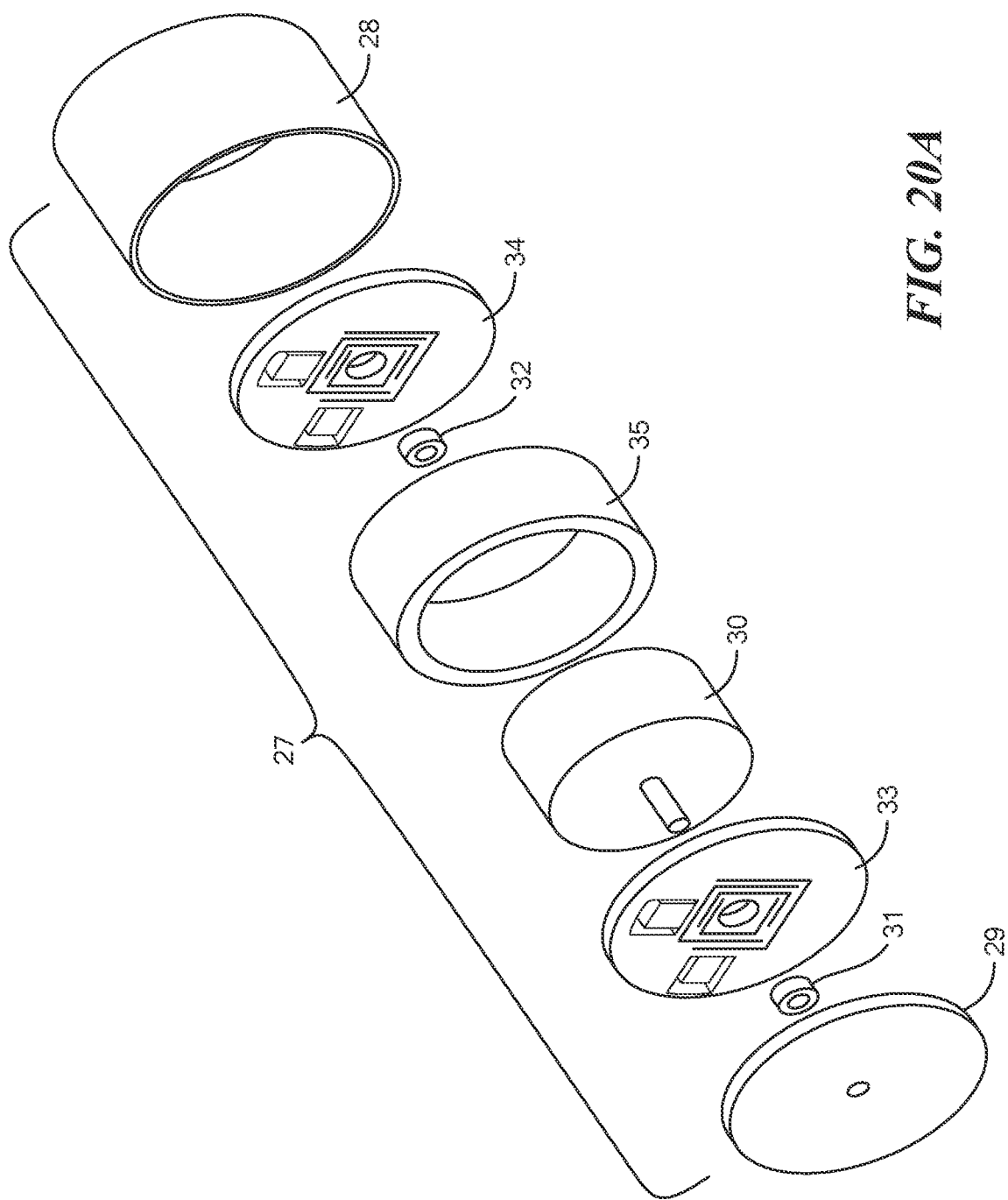
FIG. 20A shows an exploded view of an electrostatic machine in which the angle of the rotor can be displaced by actuating it at two positions along its length, according to an embodiment of the present invention.
Figure 20B:
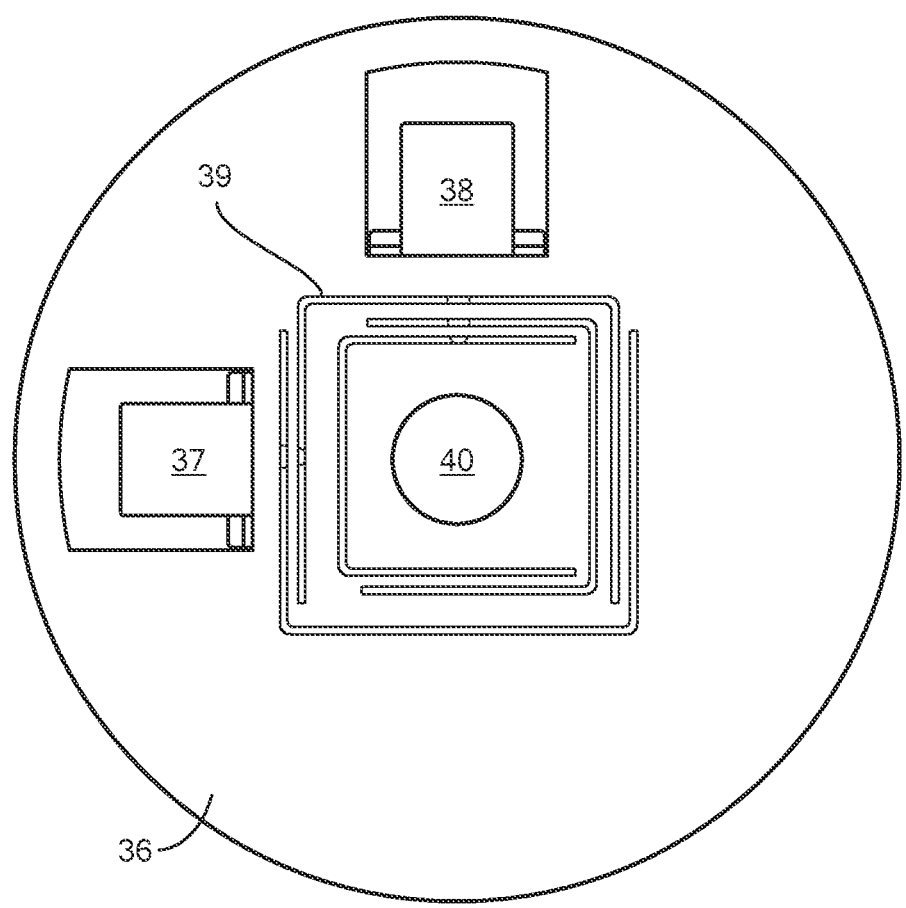
FIG. 20B shows the mechanism used to displace the rotor of the electrostatic machine shown in FIG. 20A, according to an embodiment of the present invention.
Figure 20C:
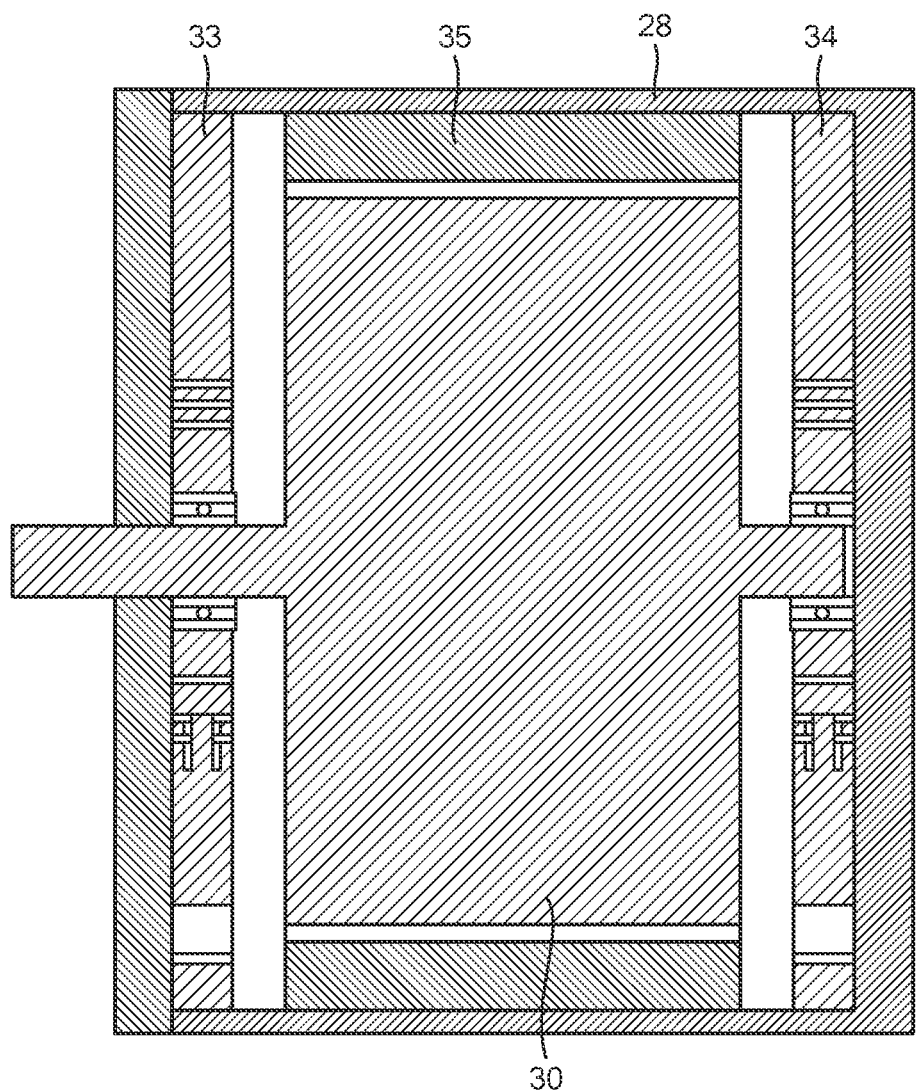
FIG. 20C shows a side section view of the electrostatic machine shown in FIG. 20A, according to an embodiment of the present invention.
Figure 20D:
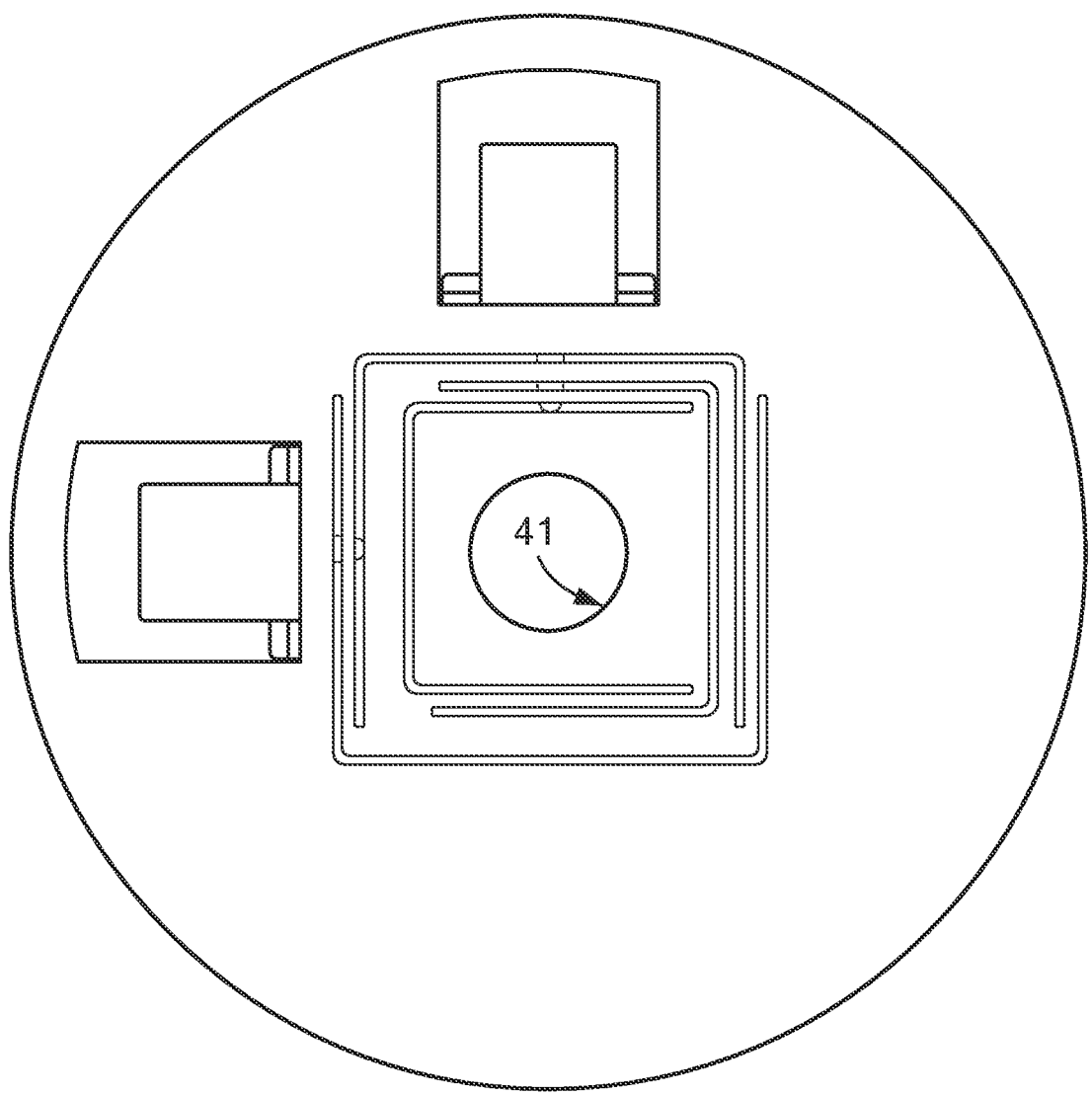
FIG. 20D is an alternate position view of the mechanism shown in FIG. 20B, in which the mechanism is shown in a displaced configuration, according to an embodiment of the present invention.
Figure 20E:
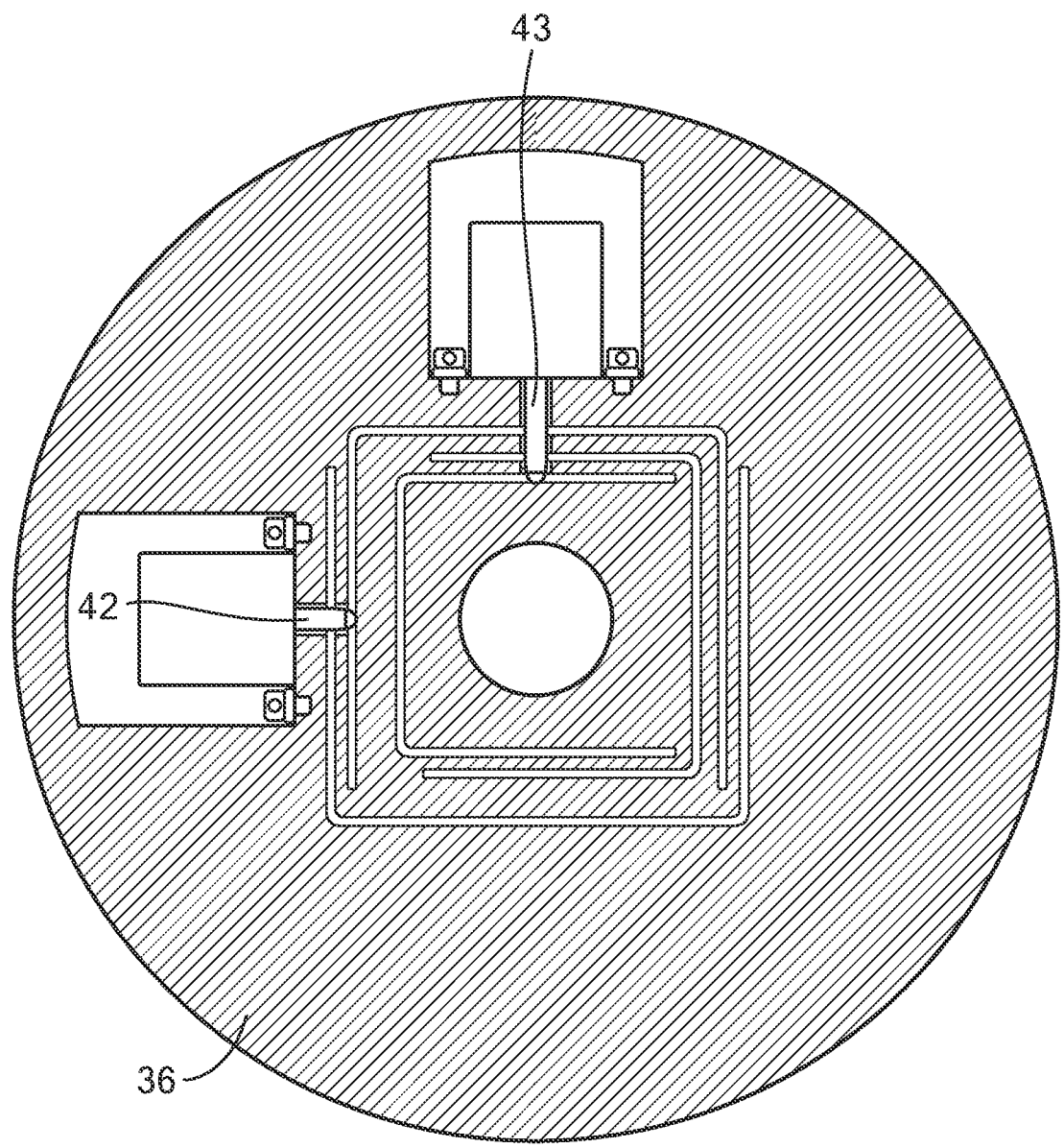
FIG. 20E shows a section view of the mechanism shown in FIG. 20D, in which the section cutting plane is equidistant from the two flat, circular faces of the mechanism, according to an embodiment of the present invention.

An example of a four DOF manipulator arrangement to manipulate a rotor of an electrostatic machine relative to a stator by displacing the rotor bearings is shown in FIGS. 20A, 20B, 20C and 20D. Each end of the stator is connected to a flexure, as shown in FIG. 20A features 33 and 34, that is rigidly connected to the case of the machine. Each flexure comprises a block of elastic material from which material has been removed to constrain a portion of the flexure to motion in two orthogonal directions. Examples of suitable elastic materials include spring steel or aluminum. The stator is connected to the portion of the flexure that can move in two orthogonal directions. FIG. 20B shows a flexure in its free state, FIGS. 20D and 20E show the flexure as displaced by extension of both actuators. FIG. 20D shows an alternate position of the structure of FIG. 20B, in which the flexure mechanism is distorted by forces applied by the actuators. In FIG. 20D, the arrow 41 shows one possible displacement vector of a hole 40 (shown in FIG. 20B) in which a bearing is installed; there are an infinite number of possible displacement vectors. FIG. 20E shows a section view of the structure shown in 20D, in which the plungers of each actuator, 42 and 43, are not sectioned. FIG. 20E shows the surfaces upon which the actuator plungers apply forces to displace the flexure. Two actuators are connected to each flexure, as shown in FIG. 20B (37 and 38). One way to manufacture the flexure is to use wire electrical discharge machining to remove material from a billet of metal. Several types of actuators are known to practitioners of the art that could be used to displace the flexure. Examples of suitable actuators include electrostatic actuators, piezoelectric actuators, motor-driven leadscrew actuators, magnetostrictive actuators, thermal actuators, pneumatic actuators, hydraulic actuators, electroactive polymer actuators, shape-memory alloy actuators and voice coil actuators. In an embodiment, each actuator is a linear actuator comprising a small electric motor that rotates a leadscrew causing a plunger to advance or retract. Electrostatic actuators may be fabricated and operated in a manner similar to electrostatic MEMS devices.

Figure 18A:
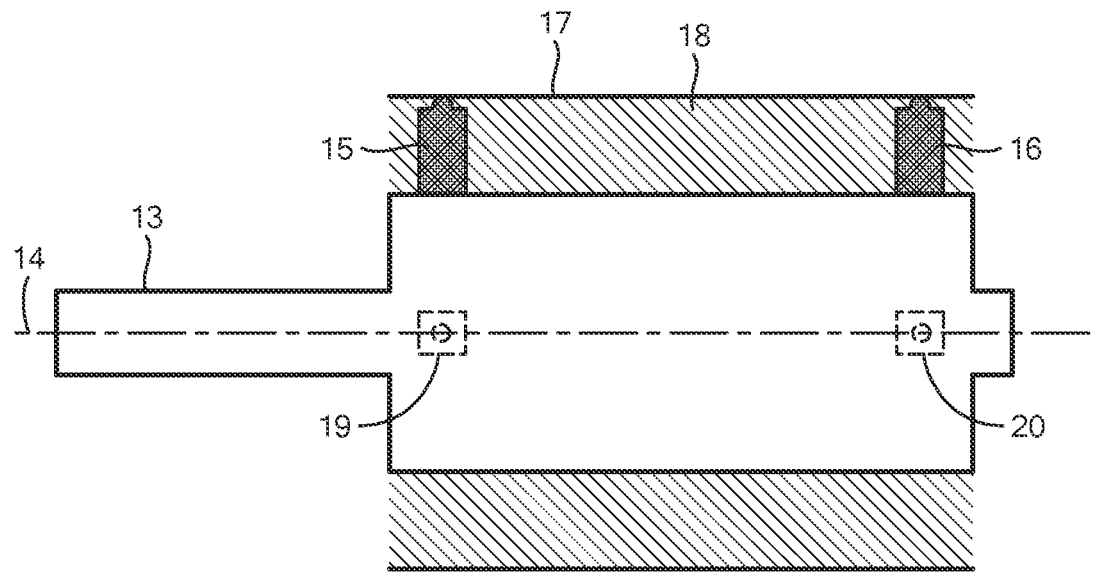
FIG. 18A is side section view of rotor of electrostatic machine, in which the rotor is attached to the shaft with actuators, and can be angularly displaced from the body of the shaft, according to an embodiment of the present invention.
Figure 18B:
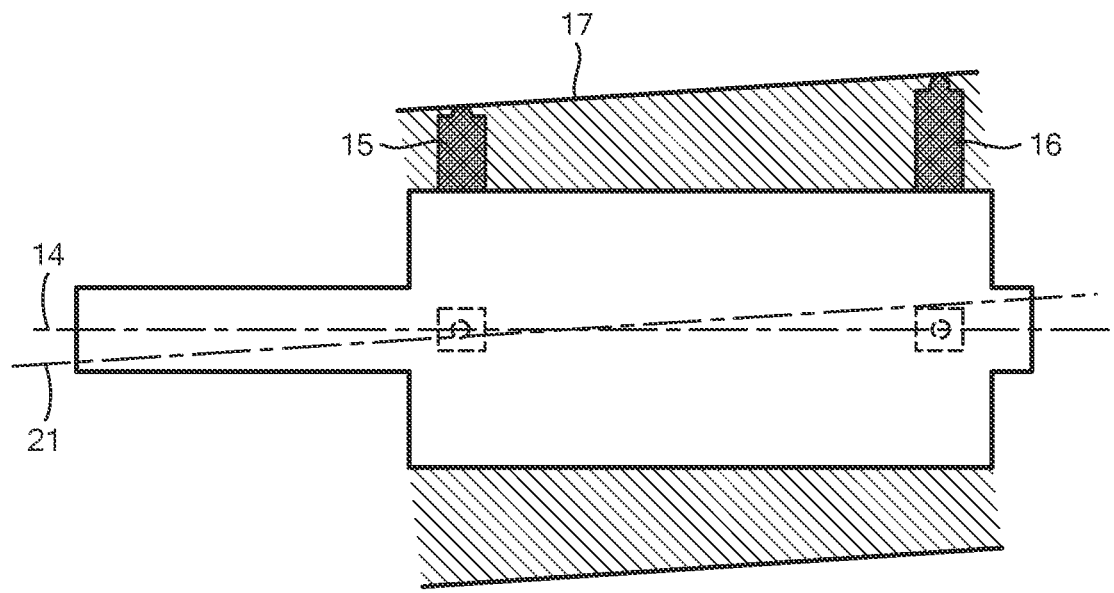
FIG. 18B is a side section view of the electrostatic machine shown in FIG. 18A in an alternate position, showing the rotor shell is angularly displaced from the shaft body displaced by actuators, according to an embodiment of the present invention.

An alternative four DOF manipulator arrangement for displacing the rotor of an electrostatic machine is shown in FIGS. 18A and 18B. In FIG. 18A, a rotor comprises a shaft 13, two front actuators 15 and 19, and two rear actuators 16 and 20. A rotor shell 17 is connected through an annulus of elastic material 18 to the shaft, and can be displaced by actuating any of actuators 15, 16, 19, or 20. The centerline of the shaft 13 is indicated in FIG. 18A by 14. FIG. 18B shows the electrostatic machine of FIG. 18A in an alternate position. In FIG. 18B actuator 15 is actuated to a shortened position and actuator 16 is actuated to a lengthened position. The displacements of actuators 15 and 16 cause the rotor shell 17 to rotate such that the centerline of the rotor shell 21 is displaced from the centerline of the shaft. The rotor shell displacement shown in FIG. 18B is one of an infinite number of possible displacements that are advantageous for positioning the rotor in relation to a stator.

Figure 19:
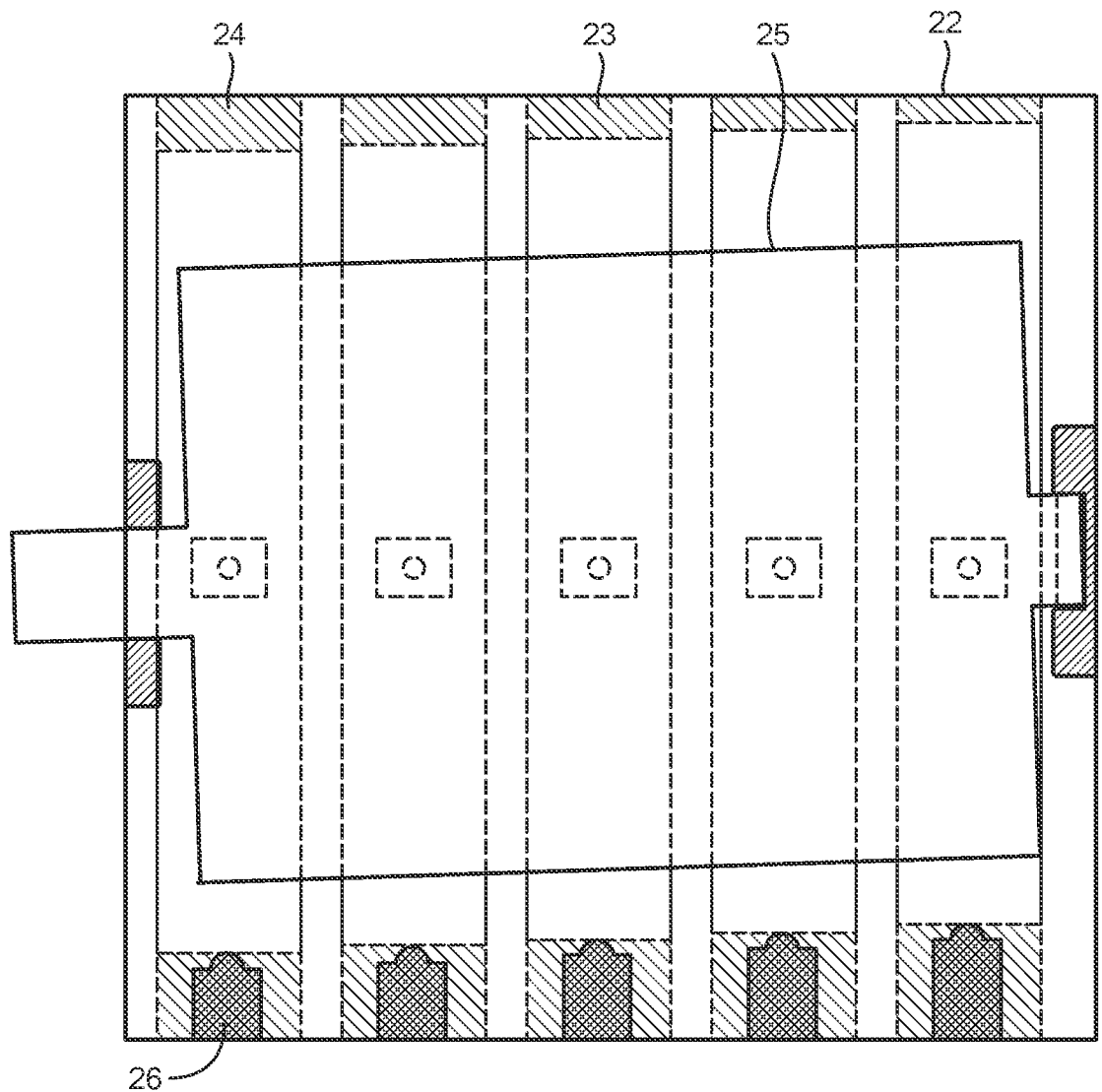
FIG. 19 is a side section view of an electrostatic machine, in which the stator is subdivided into a plurality of actuated sections, according to an embodiment of the present invention.

FIG. 19 shows an alternative manipulator configuration for positioning the stator of an electrostatic machine. The stator is subdivided into a plurality of cylindrical shells, such as 23, each of which is connected to a case 22 by an annulus of elastic material 24. Each cylindrical shell, such as 23, is contacted by two actuators, such as 26. The rotor 25 is shown oriented at an angle to the case 22. Each cylindrical shell can be adjusted by the two actuators connected to it such that the position of each shell is positioned to be close to the nearest section of the rotor 25.

Electrostatic machines may comprise a plurality of stator or rotor cylinders. For machines such with pluralities of cylinders, the DOF of the manipulator may be increased to control the configuration of individual cylinders.

To control the position and orientation of the stator using the manipulator, it is necessary to measure the position and orientation of the stator relative to the rotor using four or more distance sensors. Several types of distance sensors are known to practitioners of the art, such as acoustic, optical interferometric, eddy current and capacitive distance sensors. In some embodiments, capacitive distance sensors are used because of their high accuracy and their small sizes. An example method to measure the position and orientation of the stator relative to the rotor is to use electrodes on the stator as capacitive distance sensor, as described herein. Using measurements of the rotor to stator gap distances at a plurality of locations on the stator, a mathematical model that gives the gap distances as a function of the position and orientation of the rotor can be inverted to estimate the position and orientation of the rotor. Using the estimated position and orientation of the rotor relative to the stator, and a kinematical model of the manipulator, the actuator displacements needed to adjust the manipulator to move the stator to its desired position and orientation can be computed and applied to each actuator.

The embodiments of FIGS. 17A, 17B, 17C, 17D, 17E, 18A, 18B, and 19 each comprise an annulus of elastic material. An example of an elastic material is an elastomer, such as polyurethane. In other embodiments, an annulus of elastic material may be replaced with springs, machined flexures, or other machine elements known to those with ordinary skill in the art for storing and releasing mechanical strain energy. Furthermore, it is advantageous to combine springs, flexures, or other spring-like elastic elements with elastomeric materials that exhibit visco-elastic behavior to form a hybrid elastic element made of a plurality of materials. Combination of elastic and visco-elastic materials results in a damped spring element that is advantageous for both providing a return force for actuators and for damping vibrations.

Another embodiment of the invention enables the rotor to stator gap distance to be continuously adjusted. A stator of an electrostatic machine is comprised of a plurality of adjustable panels, each panel shaped as portion of a cylinder. As shown in FIGS. 21A, 21B, 21C, and 21D, each panel 48 can be moved relative to the case 50 in an approximately radial direction by a continuously adjustable actuator, such that the distance of each panel from the rotor can be independently adjusted. Several kinds of suitably compact actuators are known to practitioners of the art, such as electrostatic actuators, piezoelectric actuators, motor-driven leadscrew actuators, magnetostrictive actuators, thermal actuators, pneumatic actuators, hydraulic actuators, electroactive polymer actuators, shape-memory alloy actuators and voice coil actuators. Depending on the actuator, a spring can be added in parallel with the actuator to provide a force on the actuator, such as to return it to an initial position and to apply preload to the actuator. The spring may be a flexure, such as can be manufactured by removing material from a metal block using wire electrical discharge machining. It is advantageous to use a flexure that constrains the motion of the panel to the radial direction. Many designs for flexures that constrain motion approximately in a chosen direction are known to those with ordinary skill in the art.

Figure 21A:
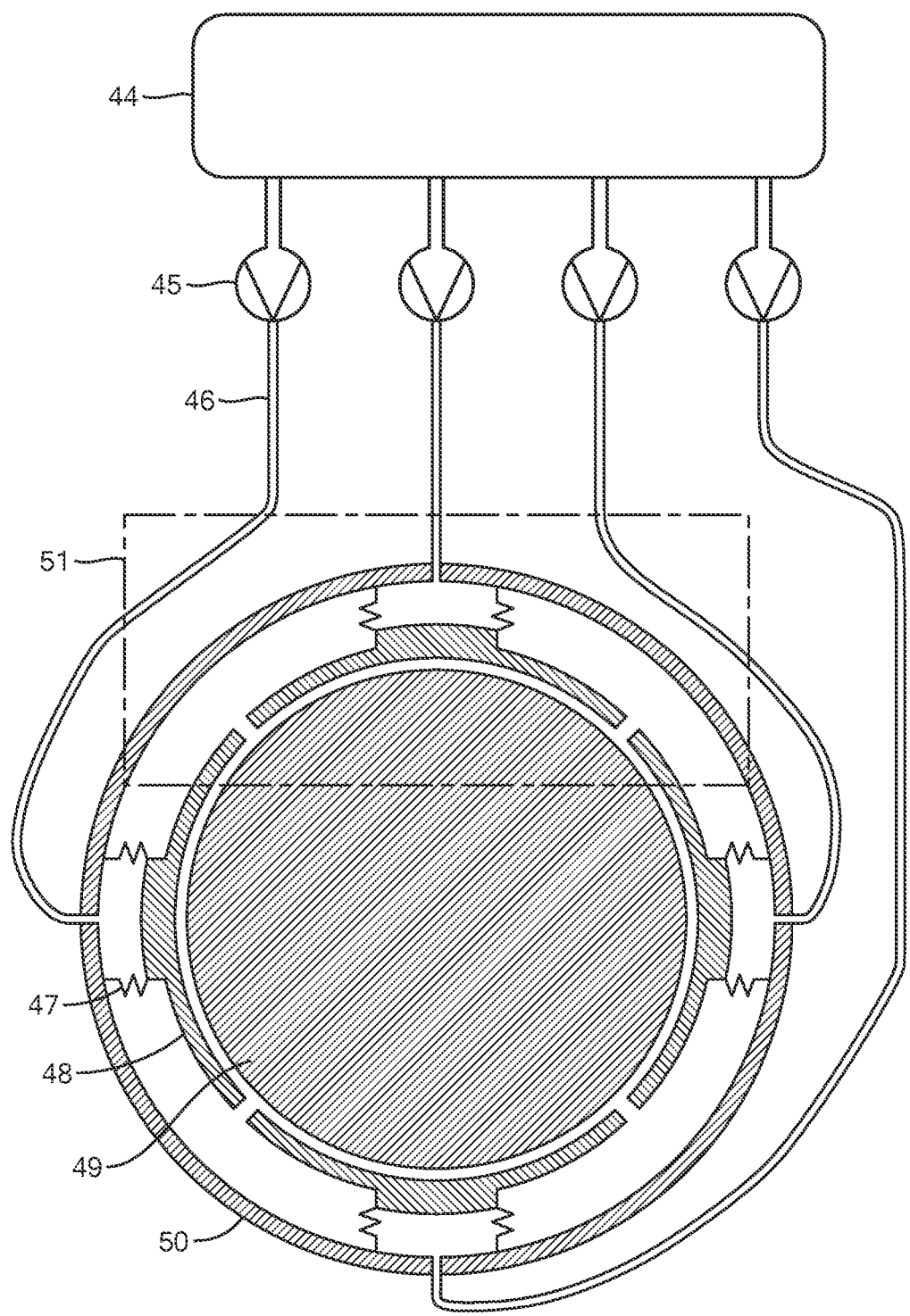
FIG. 21A shows a front section view of an electrostatic machine comprising a stator with a plurality of panels that can be adjusted in distance from the rotor, according to an embodiment of the present invention.
Figure 21B:
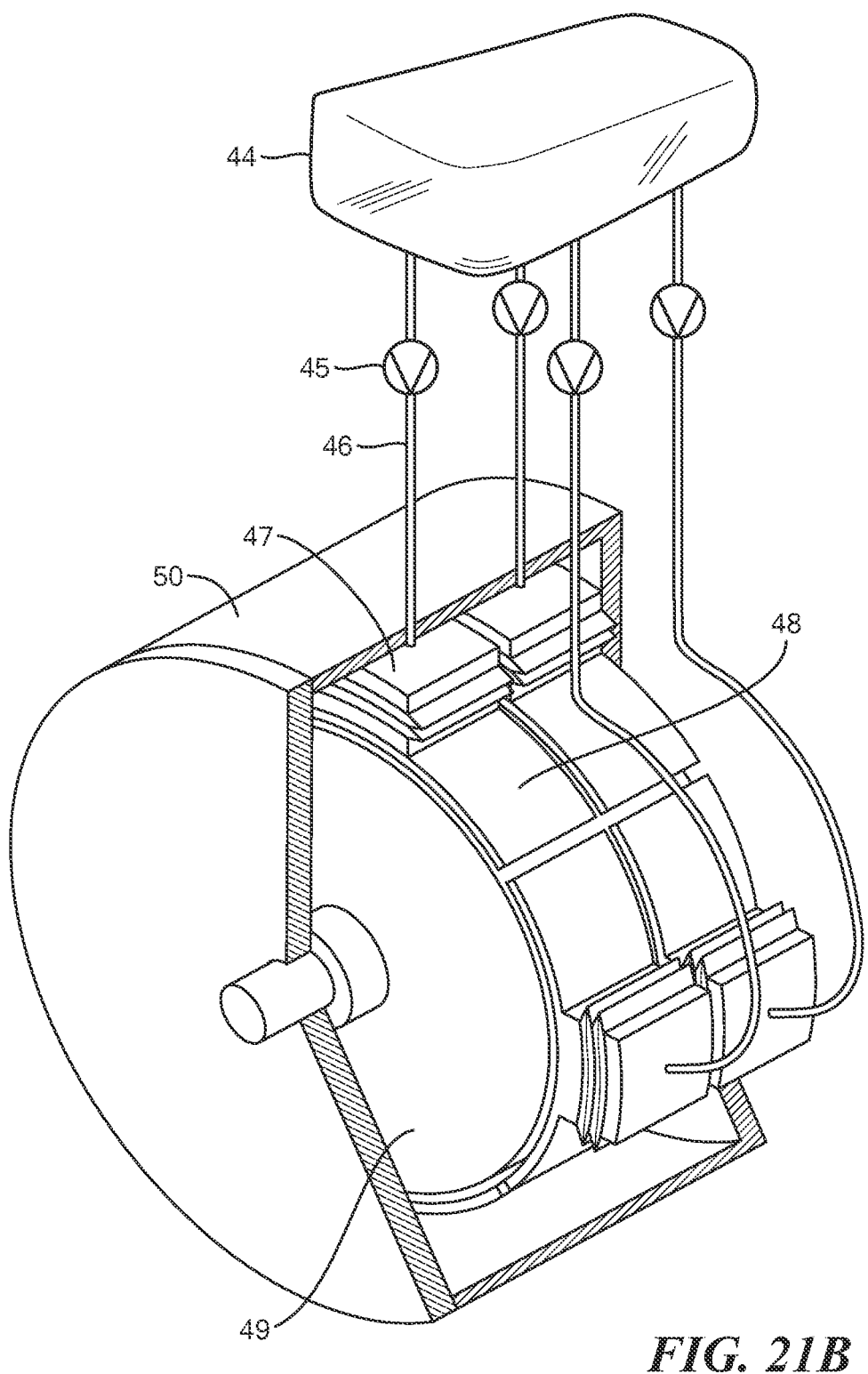
FIG. 21B shows an oblique, partial section view of an electrostatic machine comprising a stator with a plurality of panels that can be adjusted in distance from the rotor, according to an embodiment of the present invention.
Figure 21C:
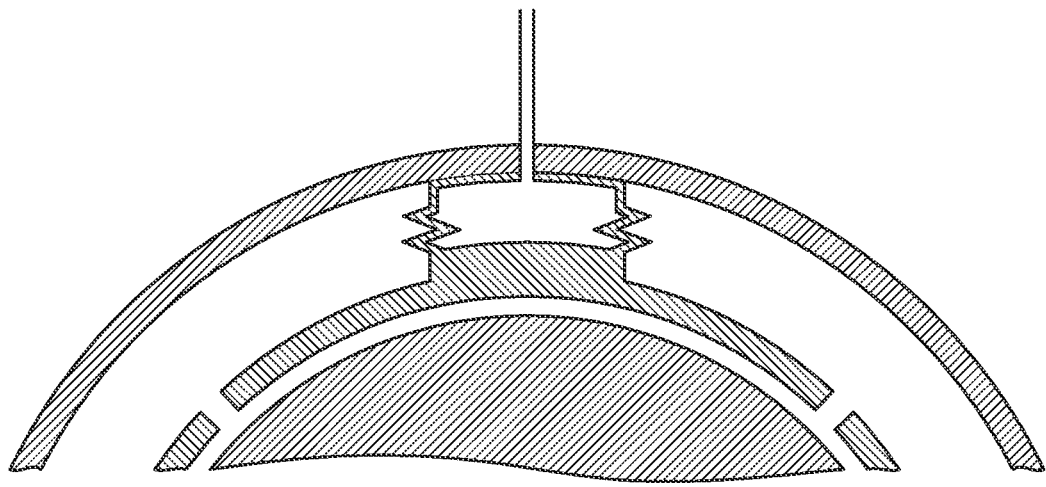
FIG. 21C is an enlarged view of a region in FIG. 21A, showing an movable panel in its free position, according to an embodiment of the present invention.
Figure 21D:
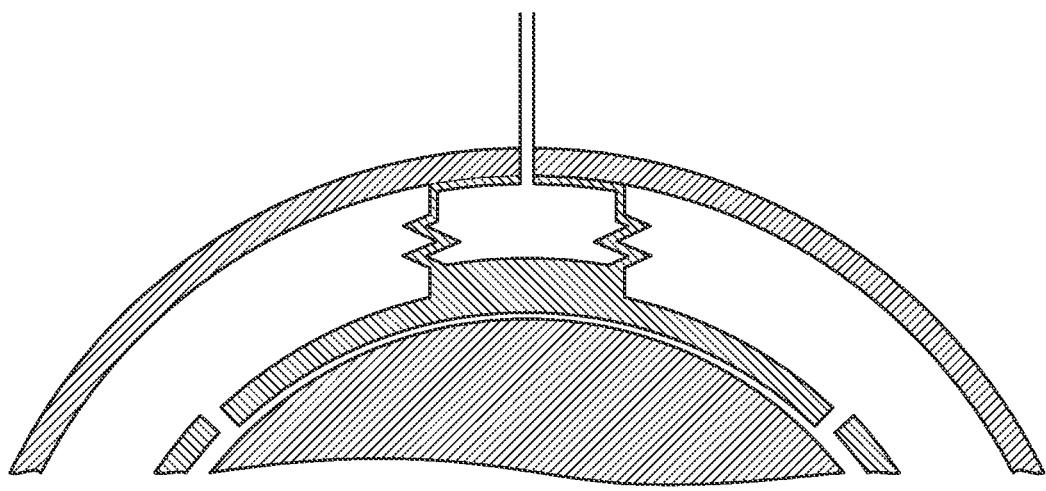
FIG. 21D is an enlarged view of a region in FIG. 21A, showing an movable panel in its displaced position, according to an embodiment of the present invention.

FIG. 21A shows a front section view of an electrostatic machine with four adjustable panels, such as 48, which surround a rotor 49. Each panel is actuated by a bellows mechanism 47, which can be displaced by inflating or deflating the bellows with a fluid, which may be a liquid, such as mineral oil, or a gas, such as air. The fluid is supplied by a reservoir 44 through pumps 45, and conveyed to the actuators by fluid lines 46. FIG. 21B shows a partial section view of the machine shown in FIG. 21A. FIGS. 21C and 21D show an enlarged view of area 51 of FIG. 21A. In FIG. 21C, the bellows is shown unactuated. In FIG. 21D, the bellows is inflated, causing the panel to be extended close to the rotor, thereby enabling a large torque to be developed due to the proximity of counterfacing surfaces on the stator panel and the rotor.

To operate an actuator, the distance between the stator panel and the counterfacing section of the rotor is measured. Various distance sensors are known to practitioners of the art and could be used to measure this distance. A method of distance sensing is to measure the capacitance of the electrodes on the panel, from which the distance to the counterfacing rotor surface can be inferred, as described herein.

An advantage of this embodiment is that the stator to rotor gap can be adjusted to be very small, which is advantageous for producing high power. A further advantage is that rotor and stator displacements, including both static and dynamic displacements, can be compensated by actuating the panels. A further advantage is that rotor and stator distortions, including both static and dynamic distortions, can be compensated by actuating the panels.

In an embodiment, moveable panels on the stator or rotor are translated toward or away from the rotation axis of an electrostatic machine to compensate rotor-to-stator gap abnormalities. Electrodes of the electrostatic machine are disposed on the panels. Therefore, translating the panels increases or decreases the gap between rotor and stator electrodes. These panels can be translated individually, not necessarily all the same distance or all in the same direction, for example to compensate an out-of-round condition or a particularly proud or depressed region of the stator or rotor, or all the panels can be translated the same distance and in the same direction. The panels can be translated by a suitable translator, such as a linear motor.

Figure 35:
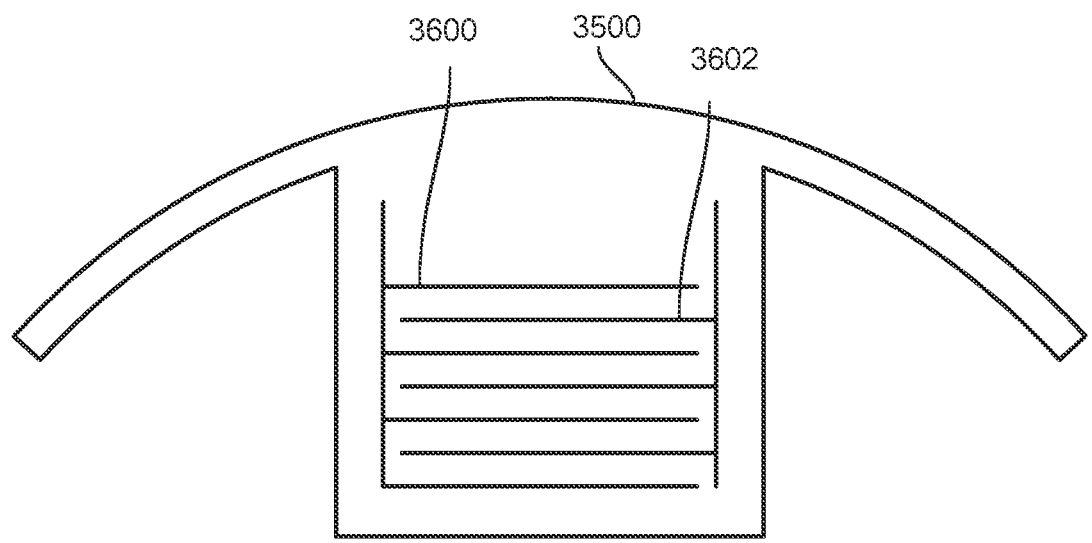
FIGS. 35-38 illustrate moveable panels on the stator or rotor, which are electrostatically actuated by pairs of counterfacing surfaces embedded with interdigitated electrodes, according to an embodiment of the present invention.
Figure 36:
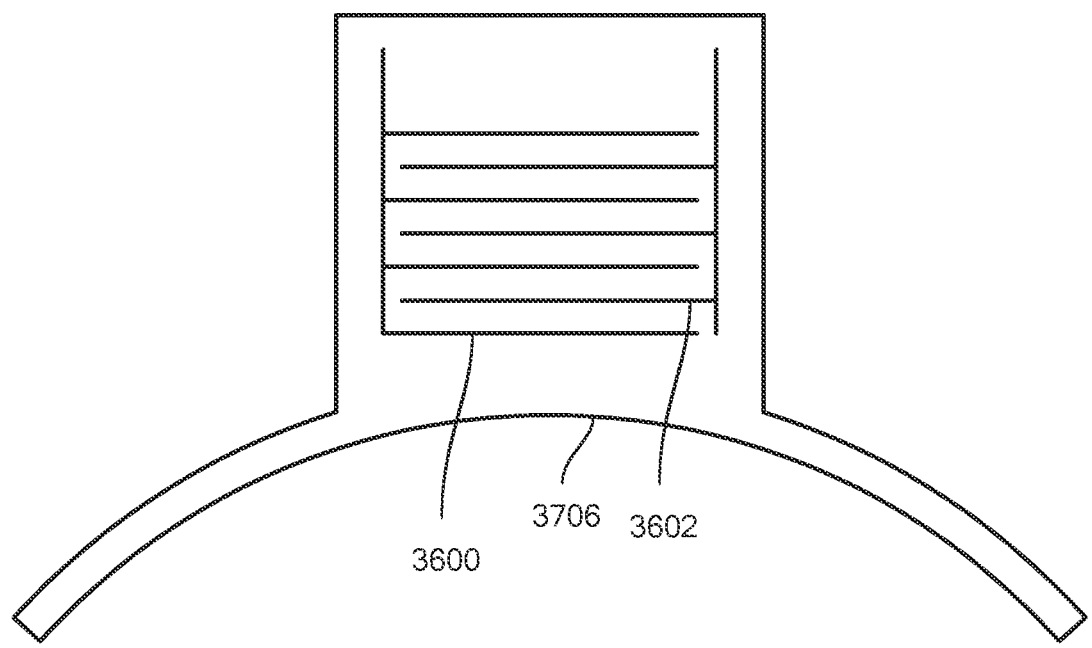
Figure 37:
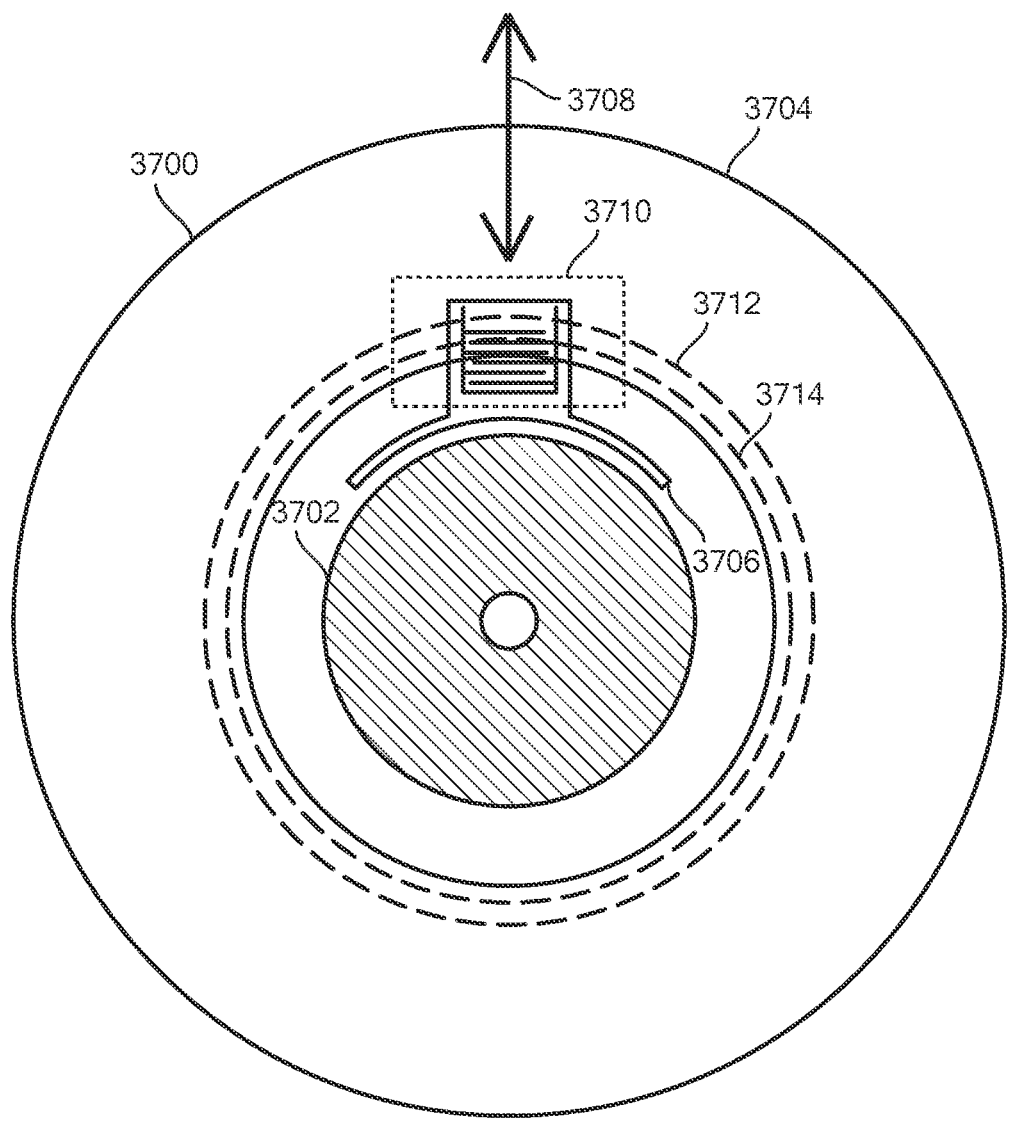
Figure 38:
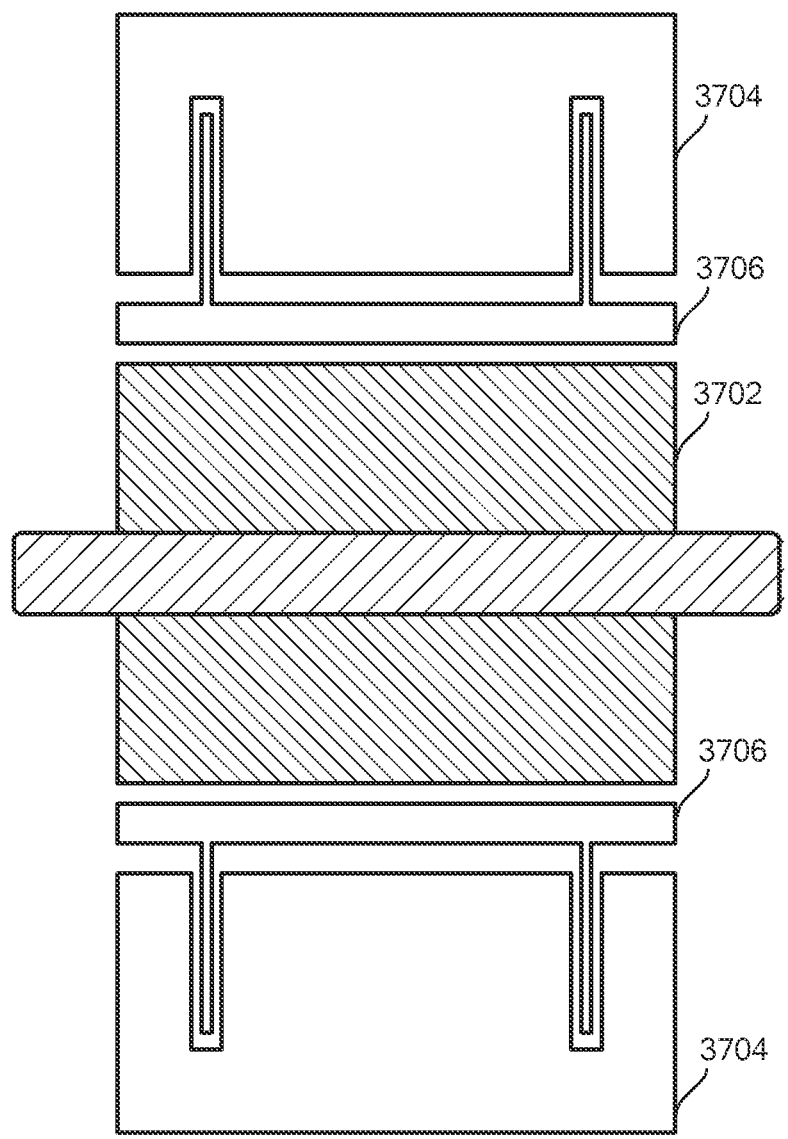

FIG. 37 is a partially transparent end view of an electrostatic machine 3700 with a rotor 3702 and a stator 3704. An exemplary moveable panel 3706 counterfaces the rotor 3702. In the embodiment of FIG. 37, the moveable panel 3706 moves, relative to the stator 3704. FIG. 36 is a close-up view of the moveable panel 3706. FIG. 35 is a close-up view of an alternative moveable panel 3500, which moves relative to the rotor 3702 axis. FIG. 38 is a sectional view of the electrostatic machine of FIG. 37. Returning to the embodiment shown in FIG. 37, the moveable panel 3706 can move in a radial direction, relative to the axis of rotation of the rotor 3702, as indicated by arrow 3708. The moveable panel 3706 is translated by a linear motor 3710. The linear motor 3710 can be of any type. An electrostatic linear motor 3710 is described.

The electrostatic linear motor 3710 includes one or more pairs of concentric wires, exemplified by wires 3712 and 3714 and a pair of interdigitated electrodes. In other embodiments, the wires need not be circular but may follow some other pattern, such as a polygonal or wavy path. Furthermore, the wires 3712 and 3714 need not necessarily be continuous. For example, a dot pattern of connected electrodes may be used instead. The pair of interdigitated electrodes, exemplified by electrodes 3600 and 3602, is disposed on the moveable panel 3706, as best seen in FIG. 36. Spacing of the pairs of concentric wires 3712 and 3714, and the interdigitated electrodes 3600 and 3602, is selected such that by alternating polarity of the pairs of concentric wires and/or the interdigitated electrodes 3600 and 3602, electrostatic forces generated between the concentric wires 3712 and 3714 and the interdigitated electrodes 3600 and 3602 translate the moveable panel 3706 a desired distance, with a desired granularity.

As noted, in the embodiment of FIG. 37, the moveable panel 3706 moves, relative to the stator 3704. Optionally or alternatively, the moveable panel 3500 may be attached to the rotor 3702 to translate radially 3708, relative to the rotor 3702. As shown in FIG. 35, the moveable panel 3500 has interdigitated electrodes 3600 and 3602, like those in the moveable panel 3600.

The wires 3712 and 3714 and the interdigitated electrodes 3600 and 3602 lie in counterfacing surfaces that are orthogonal to the rotational axis of the electrostatic machine. The advantage of arranging moveable panels 3706, 3500 to be actuated by surfaces that are orthogonal to the rotational axis is that only a very small amount of surface area on the stator 3704 or rotor 3702 needs to be used to actuate the moveable panels 3706, 3500, since the actuation surfaces are located beneath the outer-facing surfaces of the stator 3704 or rotor 3702. Since the power that can be applied or generated by an electrostatic machine depends on the amount of counterfacing surface area on the stator 3704 and rotor 3702, it is advantageous to minimize the amount of surface area that is apportioned to actuate moveable panels 3706, 3500.

Each pair of counterfacing surfaces comprises a fixed surface, exemplified by a surface on which the wires 3712 and 3714 are disposed, and a moving surface, exemplified by a surface of the moveable panel 3706 or 3500 on which the interdigitated electrodes 3600 and 3602 are disposed. The moving surface of each pair is attached to a moveable panel 3706, 3500. Displacement of the moving surface 3600, 3502 is mechanically constrained to translations in a plane parallel to the embedded fixed surface. Methods for mechanically constraining the movement of a rigid object to motion within a plane include mechanical joints, flexures, and other mechanisms known to those with ordinary skill in the art. Flexures are the preferred method for constraining the motion of a moveable panel, since they can be designed to occupy a small volume and to accurately constraint motion to a desired profile.

To actuate the counterfacing surfaces, voltages are applied to the interdigitated electrodes 3600, 3602, 3712 and 3714 embedded on each pair of counterfacing surfaces so as to cause displacement of the moveable surfaces 3706 or 3500. For example, applying a constant voltage to the wires 3712 and 3714 on the fixed surfaces while adjusting the magnitude and polarity of voltages applied to the interdigitated electrodes 3600 and 3602 on the moving surfaces, can cause a moveable panel 3600 on a stator 3704 to move toward or away from the rotor 3702 of an electrostatic machine, or can cause a moveable panel 3500 on a rotor 3702 to move toward or away from the stator 3704 of the machine.

Since electrodes of the electrostatic machine can be disposed on the moveable panel 3706 and/or 3500, adjusting position(s) of the moveable panel(s) 3706 and/or 3500 can compensate rotor-to-stator gap abnormalities.

As noted, in some embodiments, the stator or rotor includes a plurality of moveable panels. In some such embodiments, each moveable panel is attached to the stator or rotor with a flexure that enables the panel to move in a radial direction. Each moveable panel further includes a surface that counterfaces the surface of the rotor or stator, i.e., if the moveable panel is attached to the stator, it includes a surface that counterfaces the rotor. If the moveable panel is attached to the rotor, it includes a surface that counterfaces the stator. The moveable panel includes a plurality of electrodes that serve two purposes. In the first purpose, the electrodes are energized to apply an electrostatic torque to the surface that counterfaces them, thereby causing the motor to rotate. In the second purpose, the electrodes apply an electrostatic force in the radial direction that modulates the distance between the surface of the moveable panel and the counterfacing surface, thereby adjusting the magnitude of the rotor-stator gap. By modulating the drive voltage, the gap distance can be increased or reduced. For example, a constant potential can be superimposed on an alternating current drive waveform to adjust the rotor-stator gap. In another example, the drive waveform magnitude can be selectively increased or decreased when counterfacing electrodes are maximally aligned to provide a net radial force in a desired direction. The advantage of this embodiment is that the full surface areas of the rotor and stator can be utilized to produce both torque and gap distance adjustment, avoiding the need for a gap regulation mechanisms that reduce the available torque or generating capacity of the electrostatic machine.

In an embodiment with a moveable panel, a flexure applies a restoring force to the moveable panel, and an electrostatic force applies an opposite force to the moveable panel. Measuring the gap between the rotor and stator electrodes, in some cases in real time as the rotor rotates, enables regulation of the gap, for example to compensate during each revolution for a high spot on the rotor.

Figure 30A:
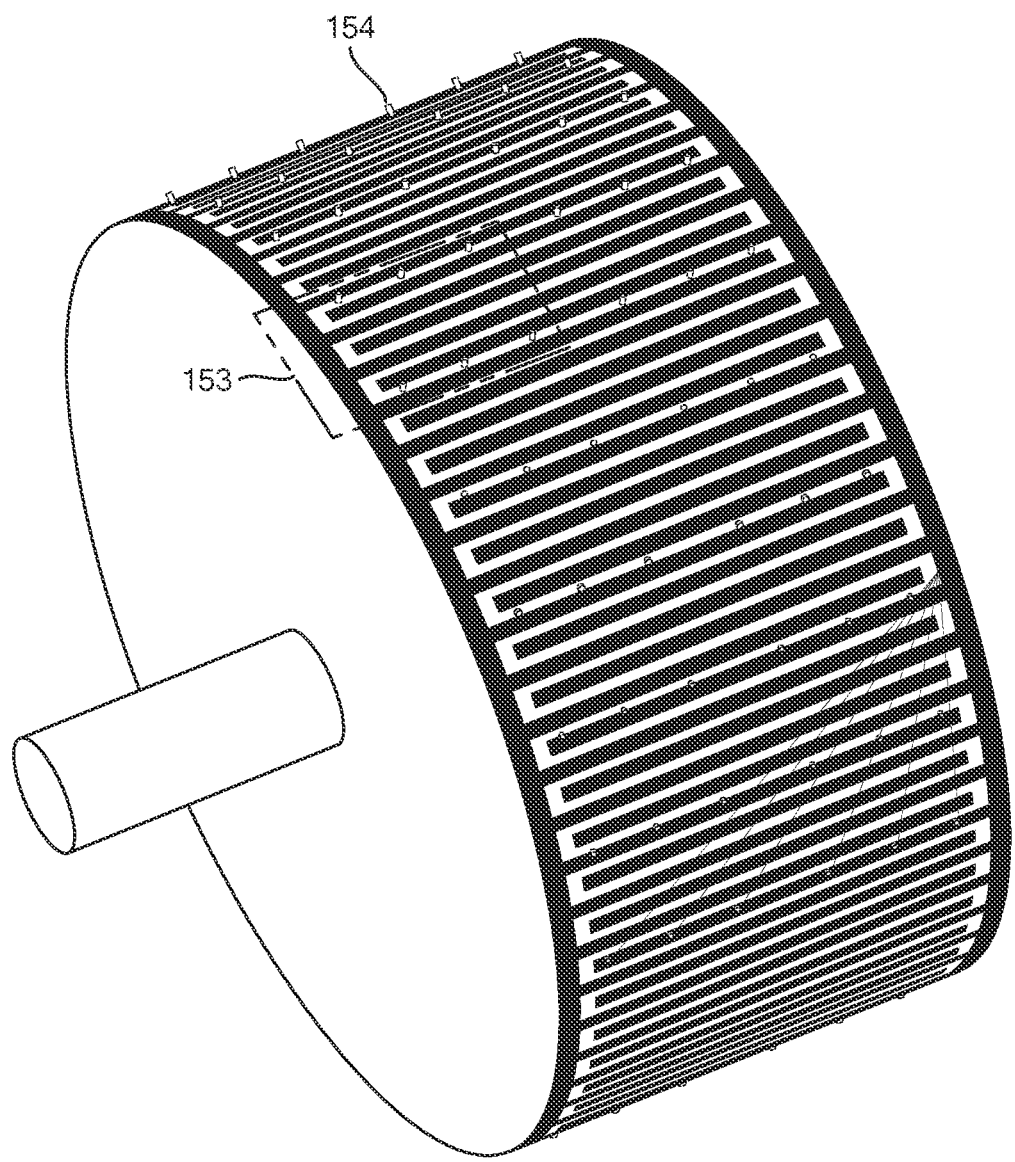
FIG. 30A shows a rotor of an electrostatic machine which comprises a spacing mechanism to adjust the distance of a counterfacing stator, according to an embodiment of the present invention.
Figure 30B:
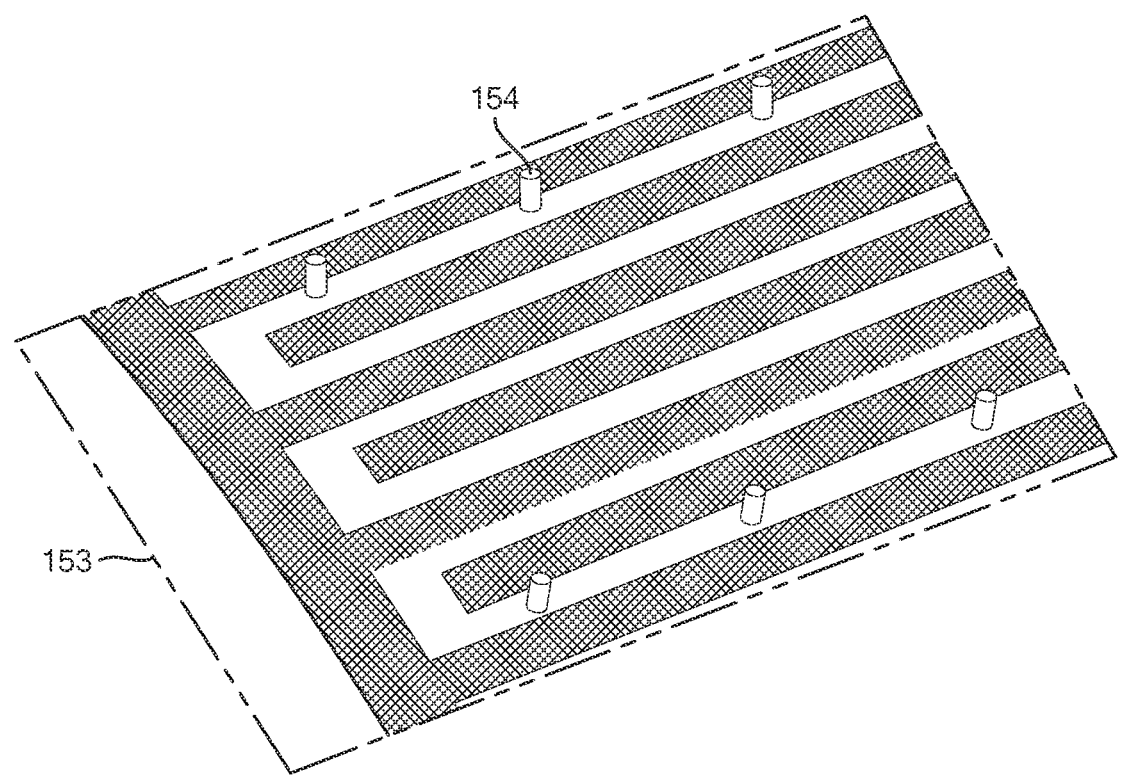
FIG. 30B shows an enlarged view of an area in FIG. 30A, according to an embodiment of the present invention.
Figure 30C:
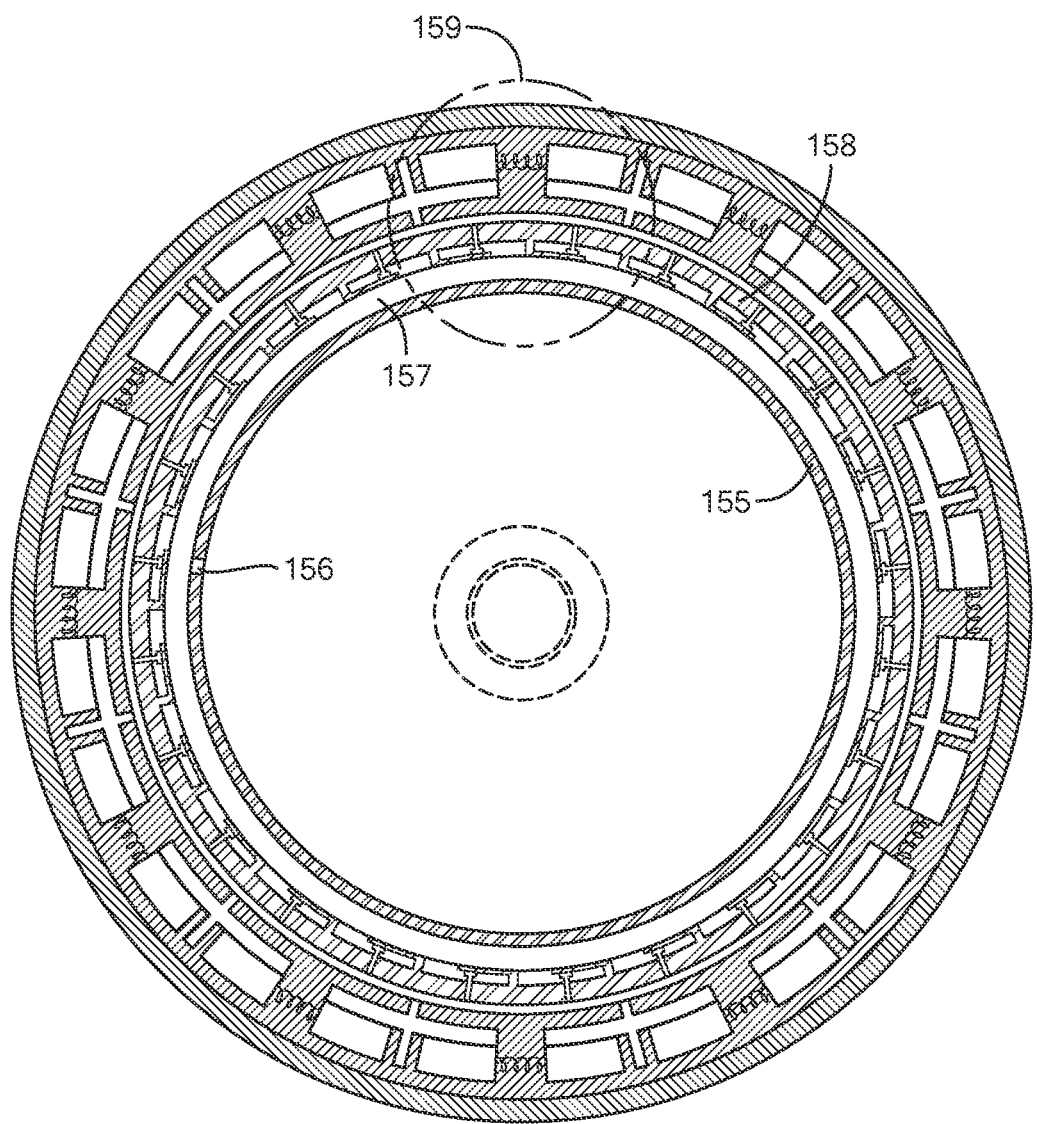
FIG. 30C shows a front section view of an electrostatic machine that comprises the rotor shown in FIG. 30A and a stator comprised of a plurality of movable, lockable panels, according to an embodiment of the present invention.
Figure 30D:
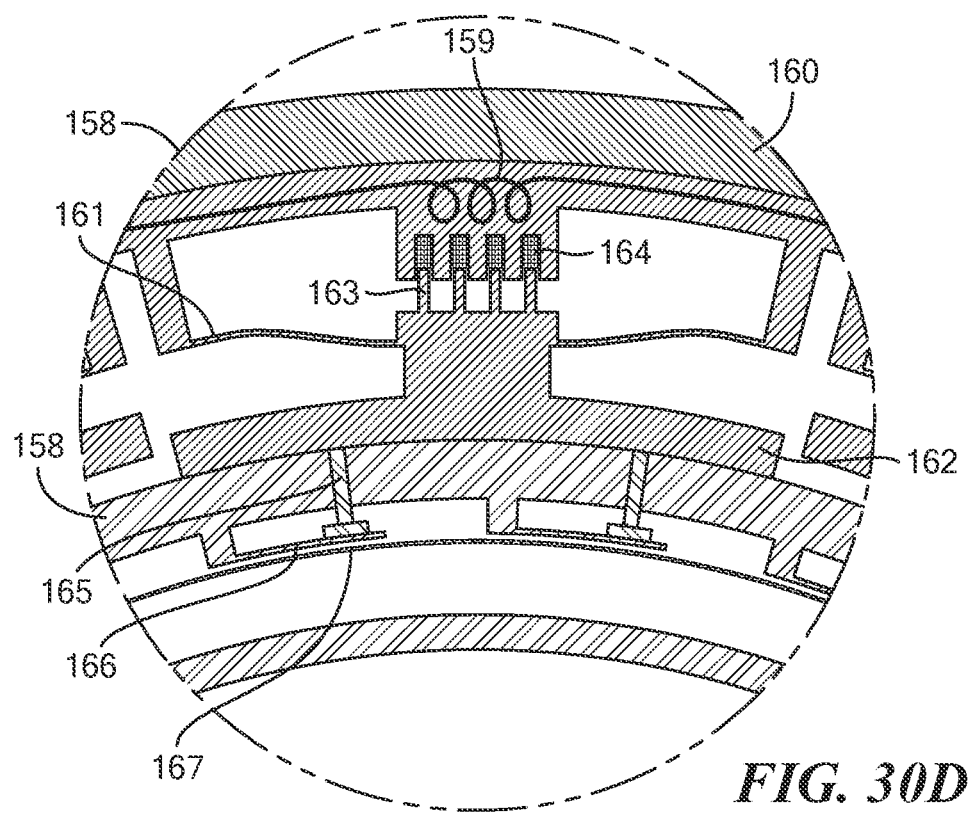
FIG. 30D shows an enlarged view of an area of the electrostatic machine shown in FIG. 30C, in its free state, according to an embodiment of the present invention.
Figure 30E:
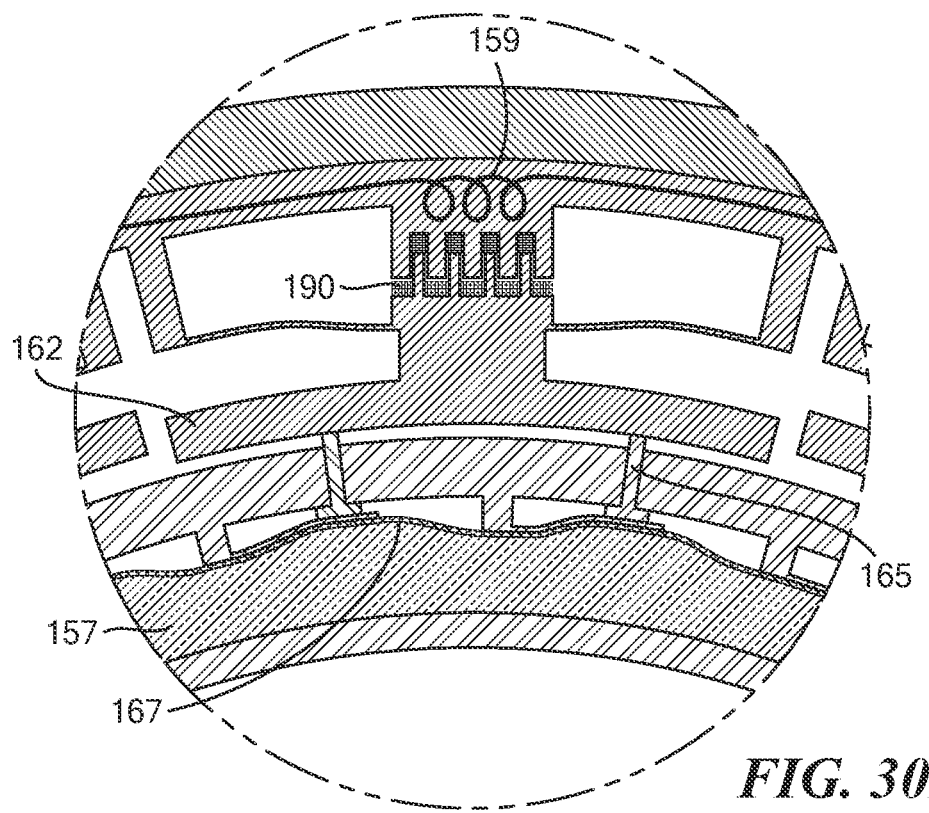
FIG. 30E shows an alternate position view of an area of the electrostatic machine shown in FIGS. 30A-D, in which a mechanism on the rotor is actuated to displace counterfacing mechanisms on the stator, according to an embodiment of the present invention.
Figure 30F:
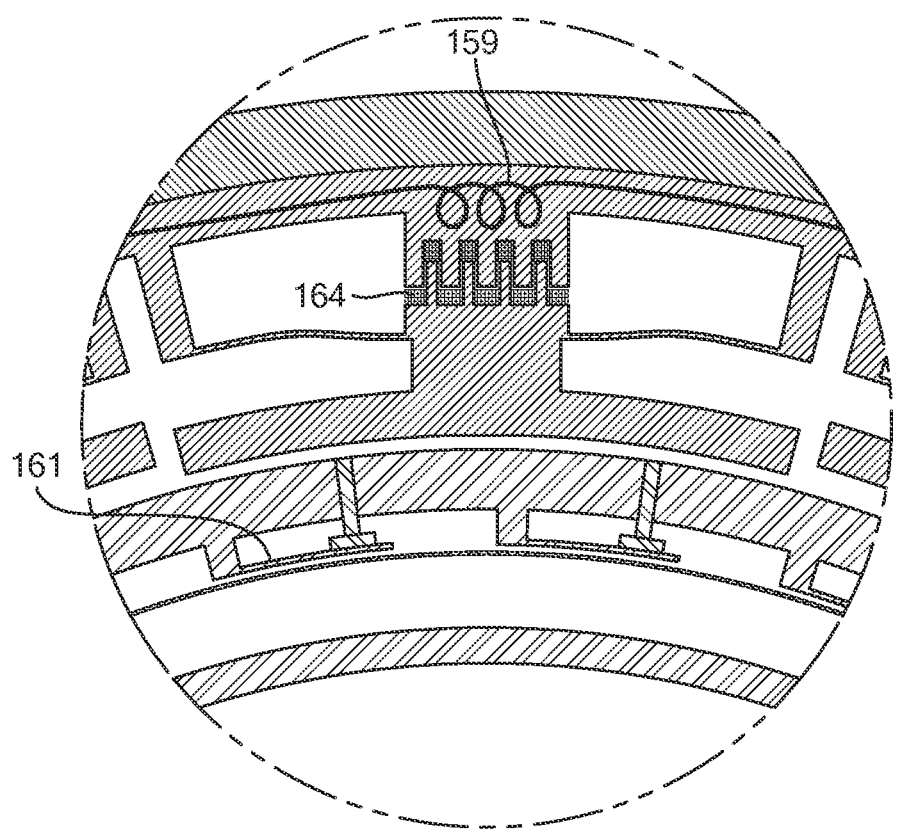
FIG. 30F shows a second alternate position view of an area of the electrostatic machine shown in FIGS. 30A-E, in which a mechanism on the rotor is disengaged and the stator panels are locked, according to an embodiment of the present invention.

Another embodiment of the invention enables the rotor-to-stator gap distance of an electrostatic machine to be adjusted to an approximately constant distance, and then maintained at that distance by a lockable joint. FIGS. 30A, 30B, 30C, 30D, 30E, and 30F, show an electrostatic machine comprising a rotor with a plurality of movable pins, and a stator with a plurality of movable panels. The movable panels provide surfaces upon which electrodes can be attached to apply electric fields to charged regions on the rotor. The rotor includes a plurality of holes, through which a plurality of pins 154 protrude. FIG. 30A shows the rotor with a plurality of pins in protruding positions; FIG. 30B shows an enlarged view of detail area 153 from FIG. 30A. Each pin 154 has a shoulder that prevents the pin from exiting the rotor, and fixes the maximum distance by which the pin head can protrude beyond the outermost diameter of the rotor. One or more actuators within the rotor cause the pin heads to push the panels away from the rotor surface, as shown in FIGS. 30A and 30B, forming a gap between the rotor surface and the surface of each stator panel. The size of this gap is determined by the protruding distance of each pin head above the rotor surface. FIG. 30C shows a front section view of the electrostatic machine, in which the rotor comprises a cylindrical shell 155 penetrated by a hole 156. The hole 156 admits flow of fluid into the cavity 157, which is bordered by the flexible membrane 167 shown in FIG. 30D. Pressurized fluid can be provided to hole 156 from a pump installed on the rotor, for example a small air compressor that is attached to the rotor, and which receives electrical power through a rotary transformer. The detail area 159 of FIG. 30C is shown enlarged in FIG. 30D. In FIG. 30D, a pin 165 is attached to a spring 166, shown in its free state. The pin is constrained to move radially through the outer shell of the rotor 158. On the stator side, a spring 161 is shown in its free state, which causes a panel 162 to abut the outer rotor shell 158. A stator panel locking mechanism comprises features 159, 163, and 164. A plurality of protruding fingers 163 extend into cavities filled with a material 164 that can change between solid and liquid phases upon application of energy. Examples of suitable materials include eutectic solders, electrorheological fluids and magnetorheological fluids. In some embodiments, the material used for feature 164 is a eutectic alloy which can change from a solid to liquid upon application of heat, e.g., a eutectic solder. Within the stator, power is provided to an electrical heating element 159 to cause a flow of heat into 164, thereby melting the material and enabling the fingers 163 to move. While the pins 165 are fully protruding from the rotor outer shell 158, the position of each panel relative to the base cylinder is locked in place by removing power supplied to the heating element 159, thereby causing the material 164 to cool and solidify, thereby immobilizing the fingers 163. If a material other than a eutectic alloy is used for 164, energy is applied in suitable fashion to immobilize or release the fingers 163. For example, if a magnetorheological fluid is used for 164, the fingers 163 are locked by applying a magnetic field to 164, as may be done by energizing a coil by providing electric current rather than by de-energizing a heating element by extinguishing the flow of electrical current.

This embodiment provides a solution for static displacements and distortions of a stator and rotor, as well as for dynamic displacements and distortions that occur slowly, because the panels can be unlocked, positioned, and re-locked rapidly. An advantage of this embodiment is that a single actuator can actuate a plurality of panels, which reduces control complexity. A further advantage is that the gap distance is controlled by the physical dimensions of the pins, therefore sensors are not required to provide feedback for control of the actuators.

Another embodiment of the invention controls the rotor to stator gap distance using a thin film of pressurized fluid. A stator of an electrostatic machine is comprised of a base cylinder and plurality of panels. Each panel is connected to the base cylinder with a spring that forces the panel toward the rotor. A channel is provided through the panel, to a port that faces the rotor surface. A pressurized fluid is provided through the channel. As the fluid exits the port, the fluid pressure between the panel and the rotor causes the spring to be compressed, such that a gap is formed between the panel and the stator. By controlling the pressure of the fluid, the gap distance can be controlled.

The pressurized fluid can be provided by a single pump that is connected to a manifold which is in communication with each channel. The manifold includes valves that can be adjusted to regulate the flow of fluid through each channel.

The pressurized fluid can also be provided by plurality of small pumps, such that a single pump actuates each panel. The pumps can include piezoelectric elements, which cause each panel to vibrate at a high frequency, forming a squeeze-film air bearing that causes each panel to separate from the rotor by a very small distance.

Figure 34A:
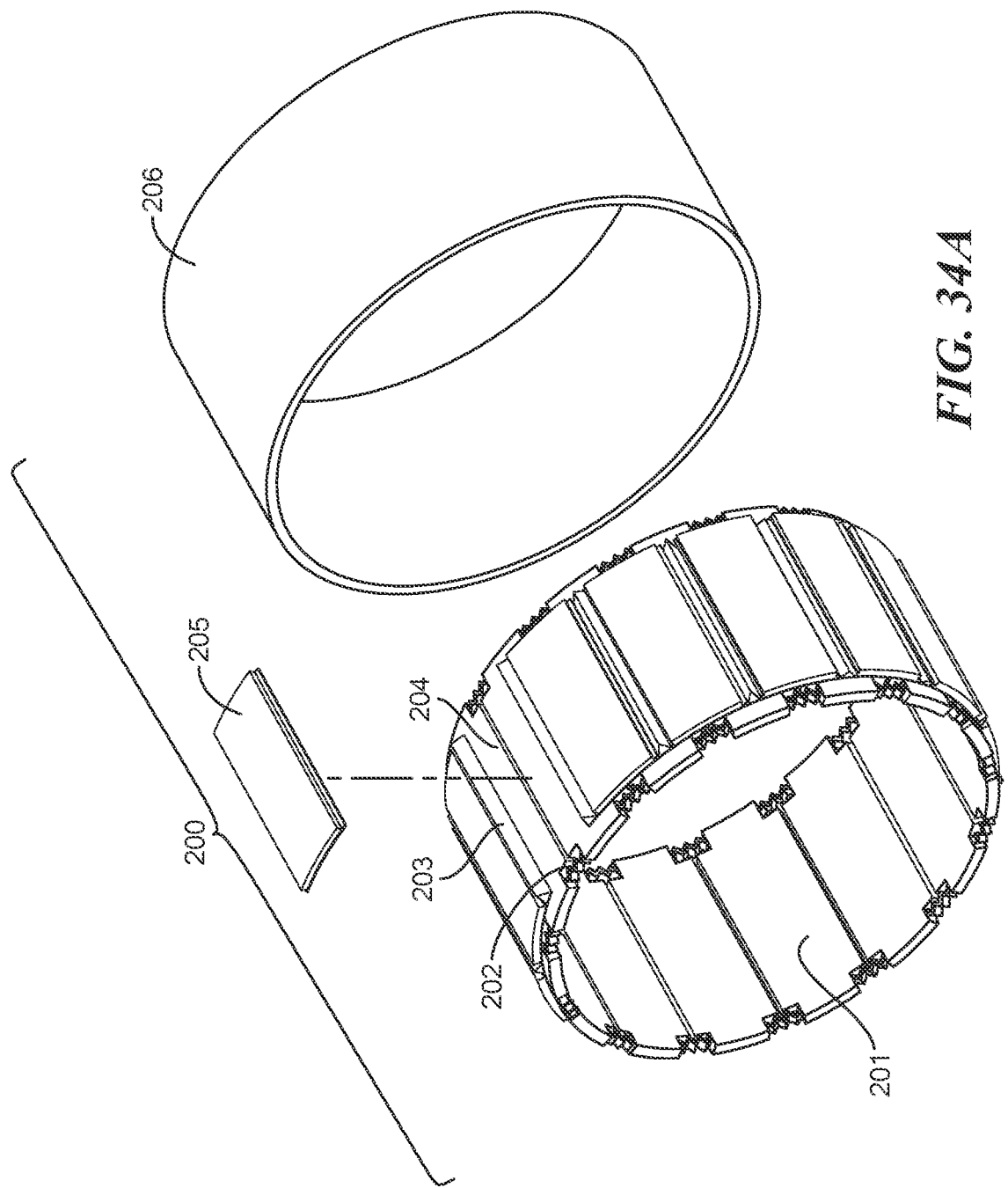
FIG. 34A shows an exploded view of a structure which comprises the stator of an electrostatic machine, and which can be actuated to change its shape, according to an embodiment of the present invention.
Figure 34B:
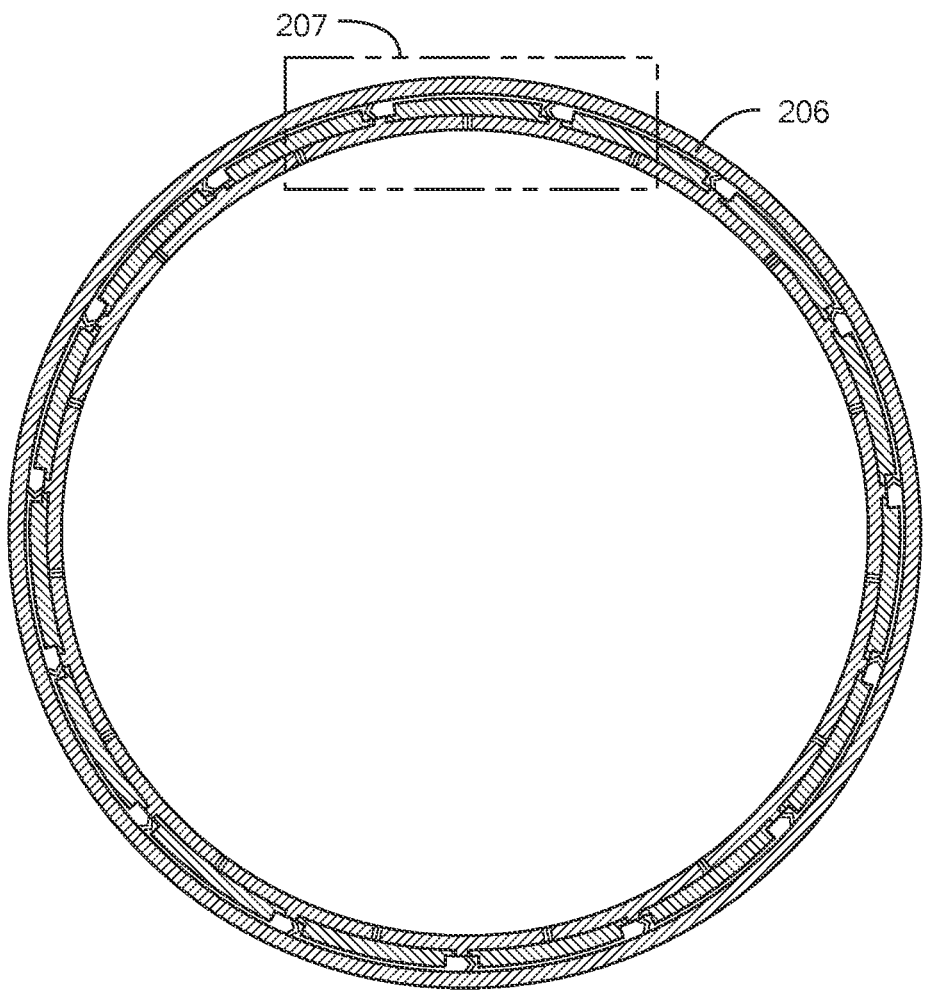
FIG. 34B shows a front section view of the stator structure shown in FIG. 34A, according to an embodiment of the present invention.
Figure 34C:
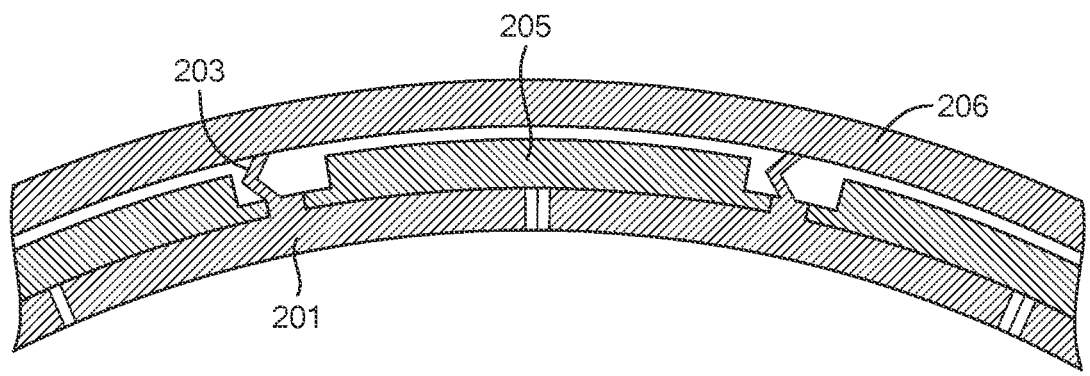
FIG. 34C shows an enlarged view of an area in FIG. 34B, according to an embodiment of the present invention.

Another embodiment of the invention provides a cylinder with an adjustable cross-sectional shape. The cylinder comprises one or more slots that can be enlarged or contracted to adjust the diameter and cross-sectional shape of the cylinder. Such a cylinder can form the stator or the rotor of an electrostatic machine. FIGS. 34A and 34B show a stator mechanism for an electrostatic machine, the shape of which is adjustable. FIG. 34A shows an exploded view 200 of the stator, which is comprised of a rigid outer shell 206, and an expandable inner structure 201. The expandable inner structure 201 comprises a plurality of sections that are attached to each other by springs 202, which can elongate and contract in the circumferential direction. The sections are separated by small gaps 204, which can be enlarged or contracted by a plurality of actuators. One actuator, 205, is shown removed from the stator structure. Each actuator can enlarge or contract in the circumferential direction. An advantage of the embodiment is that the structure enables a relatively large actuator 205 to control expansion or contraction of a relatively narrow gap. An advantage of this embodiment is that enables use of a relatively large actuator to control a small gap. Several types of actuators provide precise motions over distances that are small in comparison to the dimensions of the actuator, for example, a piezo stack actuator, a thermal expansion actuator, or a motorized lead-screw actuator. The expandable inner structure 201 is connected to the rigid out shell 206 by a plurality of springs 203. FIG. 34B shows a front section view of the stator mechanism, in which an area 207 is numbered. In FIG. 34C, area 207 is shown in an enlarged view. An alternate version of the embodiment includes a cylinder that is made by connecting a plurality of cylinders end to end, wherein each individual cylinder that is part of the whole further includes one or more slots that can be adjusted in width by an attached actuator. For example, in the alternate version of the embodiment, a plurality of structures shown in FIG. 34A could be arranged end-to-end to function as the stator of an electrostatic machine. Such an arrangement would enable control of the stator-to-rotor distance at a plurality of locations along the rotor of the electrostatic machine.

High Voltage Configurations

Another embodiment of the invention solves the problem of operating an electrostatic motor at a very high voltage. A supply of high pressure fluid is supplied to a port in the case of the machine that communicates with the environment within the case. For example, atmospheric air is pressurized to 1000 pounds per square inch gauge pressure using an air compressor and is supplied to the port. According to Paschen's law, the breakdown voltage between electrodes located within a gas increases with as the gas pressure increases. The stator and rotor are located within the case, therefore the voltages applied to the stator and rotor electrodes can be increased in accordance with the increase in pressure above ambient air pressure. A problem with pressuring the case is that a shaft typically penetrates the case, and the pressurized gas can rapidly escape through a gap between the shaft and the case. Thus, a seal is installed between the shaft and the case to inhibit the escape of compressed air from the case. Various, seal designs with low frictional resistance torque are known to persons having ordinary skill in the art, such as dry gas seals and labyrinth seals.

Figure 31B:
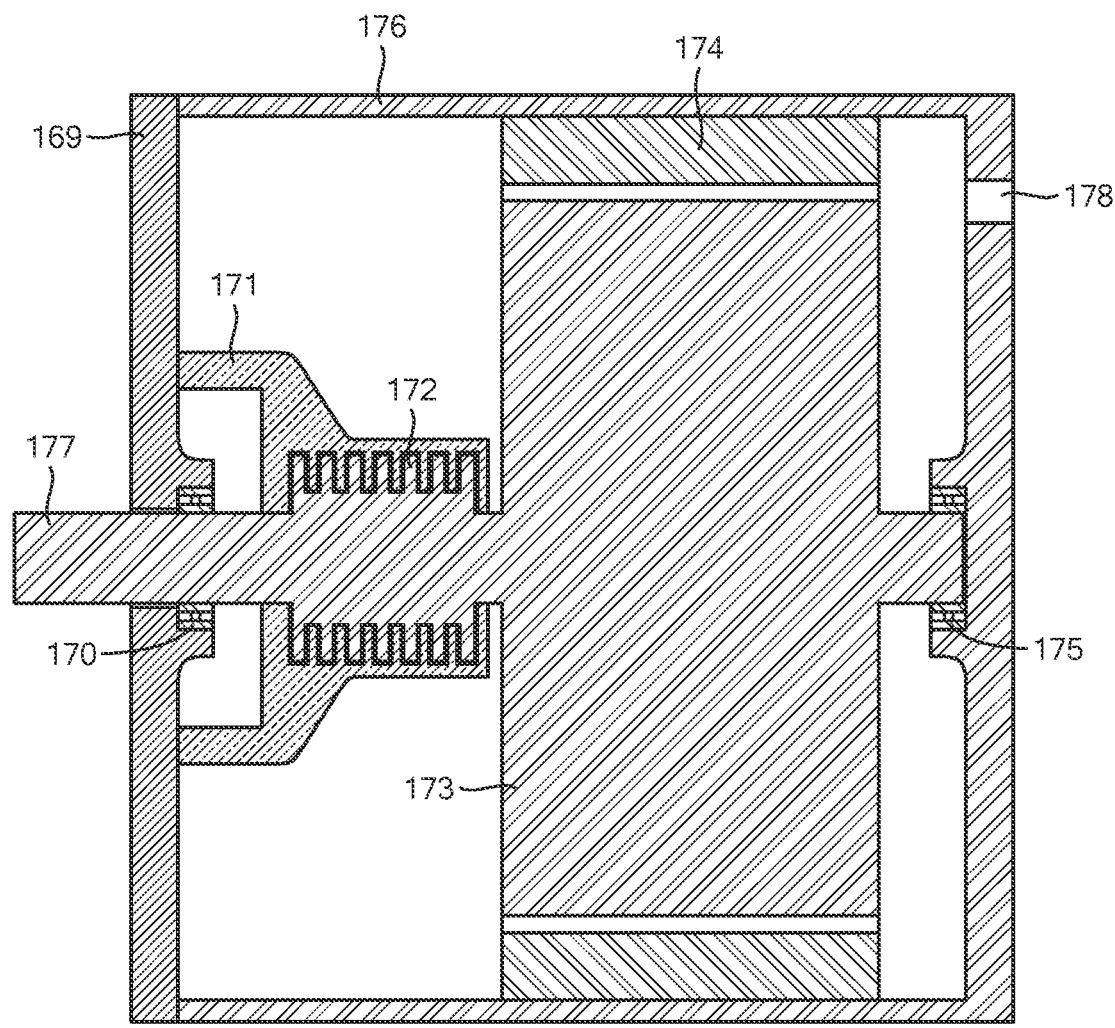
FIG. 31B shows a side section view of the electrostatic machine of FIG. 30A, according to an embodiment of the present invention.

FIGS. 31A and 31B show an electrostatic machine for operation with a supply of high pressure fluid. FIG. 31A is an exploded view 168 showing components that comprise the machine. A case 176 encloses a stator 174 and rotor 173. The rotor is supported by a front bearing 170 and rear bearing 175. A labyrinth seal inhibits the escape of fluid through the front panel 169 of the case, where the rotor shaft penetrates the front panel. The labyrinth seal comprises a rotor portion of the seal 172, which is attached to the rotor, and a stator portion of the seal 171, that is attached to the front panel 169 of the case. FIG. 31B is a side section view of the electrostatic machine shown in FIG. 31A. The shaft of the rotor 171 extends past the front panel 169 of the case. The labyrinth seal comprised of the rotor portion 172 and stator portion 171 provides a very long path for fluid to flow from within the pressurized volume of the case to the outside of the case. A port 178 on the case can be attached to a suitable supply of pressurized fluid, such as an air pump or dielectric fluid pump to admit pressurized fluid into the case.

Dielectric Fluid Viscosity Control

Another embodiment of the invention reduces the viscosity of dielectric fluids by applying heat, thereby solving the problem of inefficiency in electrostatic machines that is caused by viscous drag forces on a rotor as it rotates with a surface exposed to a dielectric fluid. The fluid is heated by a resistance wire. A resistance wire is a conductive wire that emits heat when an electrical current is passed through it, due to Joule heating.

One or more resistance wires is attached to the stator at a close distance to the surface of the cylinder of an electrostatic machine, such as the stator, rotor, and case of the machine. The resistance wires are attached beneath any electrodes, which is to say further from an outer surface of the stator than the electrodes. The resistance wires are arranged in a pattern such that most of the cylinder surface is in close proximity to a portion of the heating wire. For example, a resistance wire can be patterned to follow a serpentine path that is near most points on the cylinder surface. One or more temperature sensing devices, such as thermocouples or thermistors, are attached to the stator. The ends of the resistance wires are connected to a power supply that heats the wires by causing an electrical current to be conducted through them. The level of electrical current is adjusted by a heater controller circuit that implements a temperature control law, such as a proportional-integral control law, by using the temperature measured by the temperature sensing devices as a feedback signal, and by adjusting the current through the heater to drive the stator to a temperature set point.

One method for applying a heating wire to a cylinder is to wrap a heating pad around the outer surface of the stator. A heating pad is a device known to persons with ordinary skill in the art. A heating pad comprises a flexible, electrically insulating substrate upon which a resistance wire is patterned as a thin film. For example, a heating pad can be made from a polyimide sheet of the same length of the stator, and of a width approximately equal to the outer circumference of the stator. The electroless plating technique can be used to pattern copper in a serpentine path on one surface of the polyimide sheet. Next, an adhesive is applied to the outer surface of the cylinder, and the polyimide sheet is adhered to the stator by wrapping it around the stator.

An alternative method to attach a resistance wire to a cylinder is to pattern the resistance wire onto the surface of the cylinder, such as by electroplating, electroless plating, wire deposition, sputtering, and etching. After the resistance wire is patterned, the surface containing the wire is coated with a layer of dielectric material, such as by physical vapor deposition, chemical vapor deposition, or plasma spray coating. For a rotor or stator, the dielectric layer that coats the resistance wire serves as a substrate onto which electrodes can be patterned.

This embodiment is particularly advantageous for dielectric fluids which have a low viscosity index, since the viscosity of these fluids decreases significantly when heated.

An alternative to applying resistance wire to a cylinder such as a stator or a rotor, is to use a cylinder comprised of a conductor, and to pass an electrical current through the cylinder to heat it.

Another embodiment of the invention applies heat to the cylinders of an electrostatic machine, such as the stator and rotor, causing them to expand. By controlling the locations to which heat is applied, and the quantity of heat applied, gaps between the stator and rotor are controlled to maintain a small gap, and to prevent the stator and rotor from physically interfering with one another.

Heat may be applied to a cylinder by passing electrical currents through resistance wires that are attached to a cylinder, or by passing electrical currents through the materials of which the cylinders are comprised. Methods for applying a resistance wire to a cylinder are described herein.

Most materials expand or contract when heated. For example, most metals expand when heated. Aluminum, for example, expands by approximately $$22 \times 10^{-6} \frac{m}{m° C}.$$

Therefore, if a rotor cylinder that is initially 300 millimeters in outer diameter is heater by 10 degrees Celsius, its diameter will increase by approximately 66 micrometers. If the rotor is initially placed within a stator having an inner diameter that is 150 micrometers larger than the outer diameter of the rotor, then the gap between the rotor and stator will decrease by approximately 56 percent. Therefore, heating can provide a significant change in the stator-rotor gap distance by the action of thermal expansion, and is advantageous for adjusting the gap distance to compensate for displacements and distortions that effect machine operation.

If a cylinder made of a material with high thermal conductivity, such as aluminum, is heated, the temperature of the entire cylinder tends to rapidly reach a uniform temperature. In some applications, it is useful to heat only part of a cylinder. For example, it may be advantageous to heat and expand one end of a stator to provide clearance to a counterfacing rotor that is distorted. Therefore, a cylinder can be made of a low thermal conductivity material that is divided into regions, upon which separate heating elements are attached, can be used to enable selective heating of parts of a cylinder. Alternatively, a cylinder can be made of a plurality of regions of relatively high thermal conductivity, but which are separated by regions of low thermal conductivity, i.e., thermal breaks.

Figure 28A:
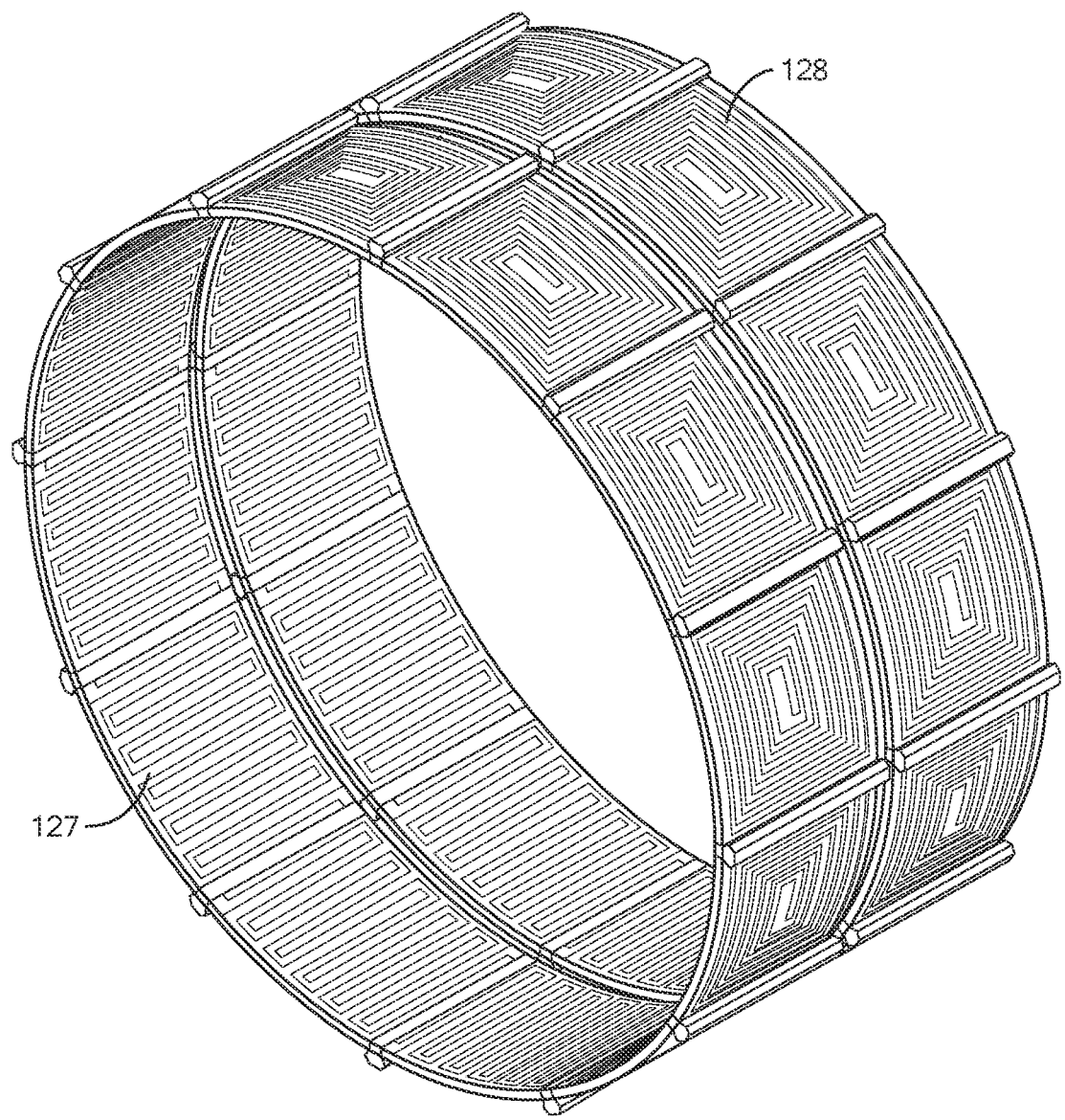
FIG. 28A shows the stator of an electrostatic machine, comprising a plurality of heating pads, according to an embodiment of the present invention.
Figure 28B:
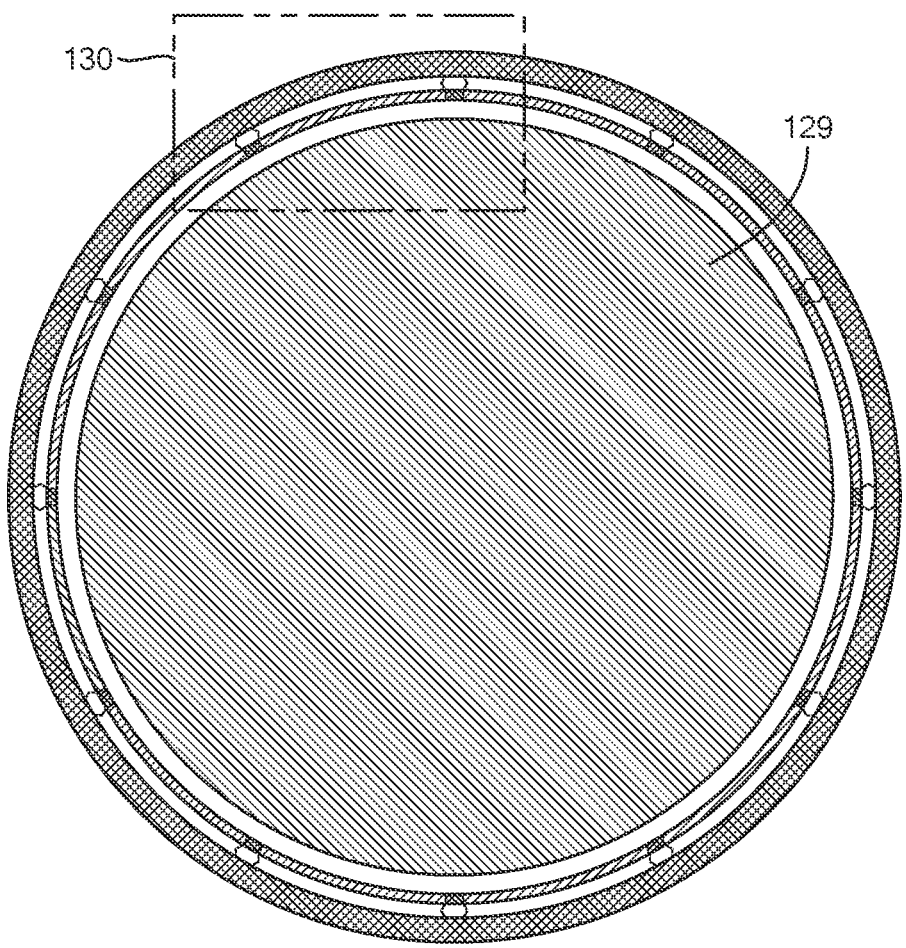
FIG. 28B shows a front section view of the stator of FIG. 28A, according to an embodiment of the present invention.
Figure 28C:
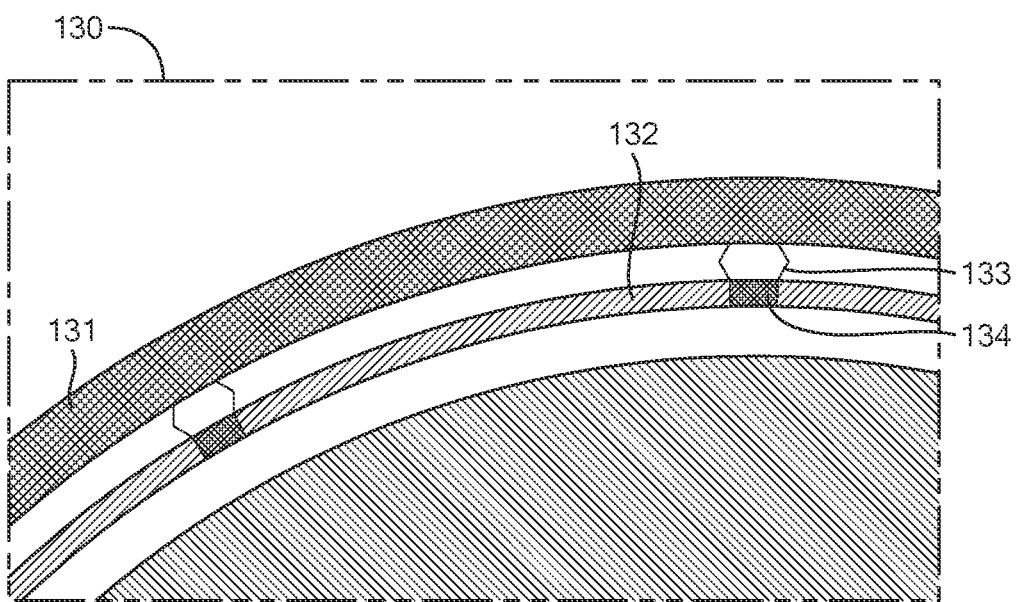
FIG. 28C shows an enlarged area of detail of the stator of FIGS. 28A-B, according to an embodiment of the present invention.

FIG. 28A shows an oblique projection view of a stator for an electrostatic machine comprising a plurality of panels. A plurality of electrodes 127 are attached to the inner surface of each panel, which faces the axis of the stator. An electrical heating element is attached to the outside of each panel 128. FIG. 28B shows a front section view of the stator shown in FIG. 28A, and also a rotor 129. FIG. 28C shows an enlarged view of area 130 shown in FIG. 28B. In FIG. 28C, the panels are linked together by small portions of material 134 that have a low thermal conductivity, and thereby provide a thermal break (i.e., a thermal barrier) between panels. It is advantageous to provide a thermal break between panels because doing so facilitates controlling the temperature of each panel independently of the other panels, by impeding the flow of heat into one panel to flow into adjoining panels. The size of each panel depends on the temperature the panel is heated to, and the coefficients of thermal expansion of the materials the panel is made from. Therefore, if different panels are heated to different temperatures, each panel can be controlled to be a different size, and shape of the internal surface formed by the plurality of panels can be controlled by regulating the temperature of each panel. To enable the panels the freedom to enlarge and contract, the panels are connected to a rigid case by a plurality of flexures (springs) 133.

Dielectric Barrier Discharge

In another embodiment, the electrodes of the stator of an electrostatic motor are coated in a thin layer of dielectric material, such as a 50 micrometer-thick film of alumina or polyimide. If sufficient voltage is applied to the electrodes to cause electrical breakdown, a dielectric barrier discharge is formed between the electrodes, rather than an electrical arc. It is advantageous to form a dielectric barrier discharge because the current that flows through a dielectric barrier discharge is lower than the current that flows through an electrical arc. Very large currents flow through electrical arcs, which can damage, and eventually destroy, electrodes. A dielectric barrier discharge does not cause significant damage to the electrodes. The breakdown voltage between a pair of electrodes is a random quantity that can be modeled by a probability distribution, such as Weibull distribution. To ensure that a pair of uncoated electrodes very rarely suffers damage from an electrical arc, it is necessary to operate the electrodes at a voltage that is several standard deviations lower than the estimated mean of the distribution. Use of dielectrically coated electrodes enables the electrodes to be operated at a higher voltage than uncoated electrodes without damage, because a dielectric barrier discharge does cause significant damage to electrodes coated in an insulating layer. It is advantageous to provide a high voltage to the electrodes of an electrostatic machine, because the power output of an electrostatic machine is approximately proportional to the square of the electrode voltage.

Figure 26A:
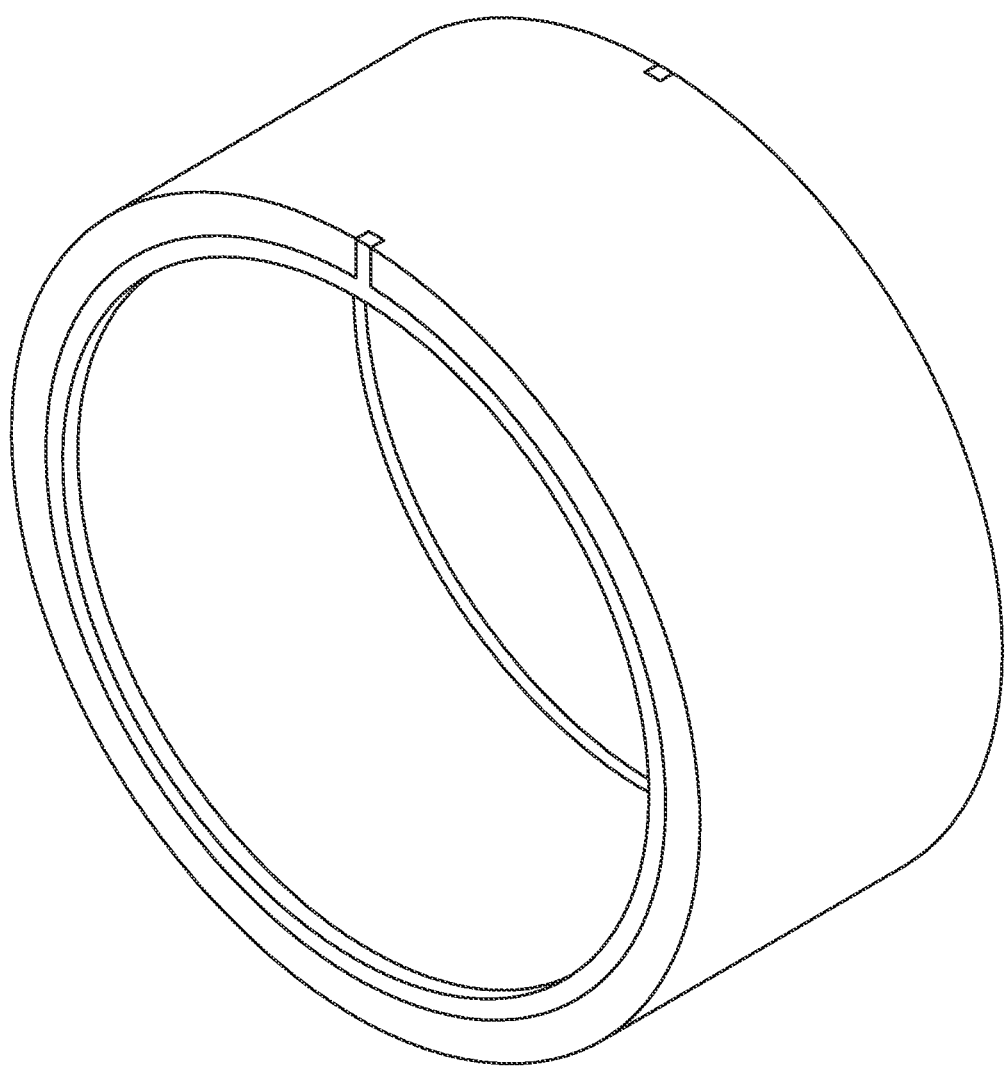
FIG. 26A shows the stator of an electrostatic machine that is designed to operate with dielectric barrier breakdowns between electrodes of opposing polarity, according to an embodiment of the present invention.
Figure 26B:
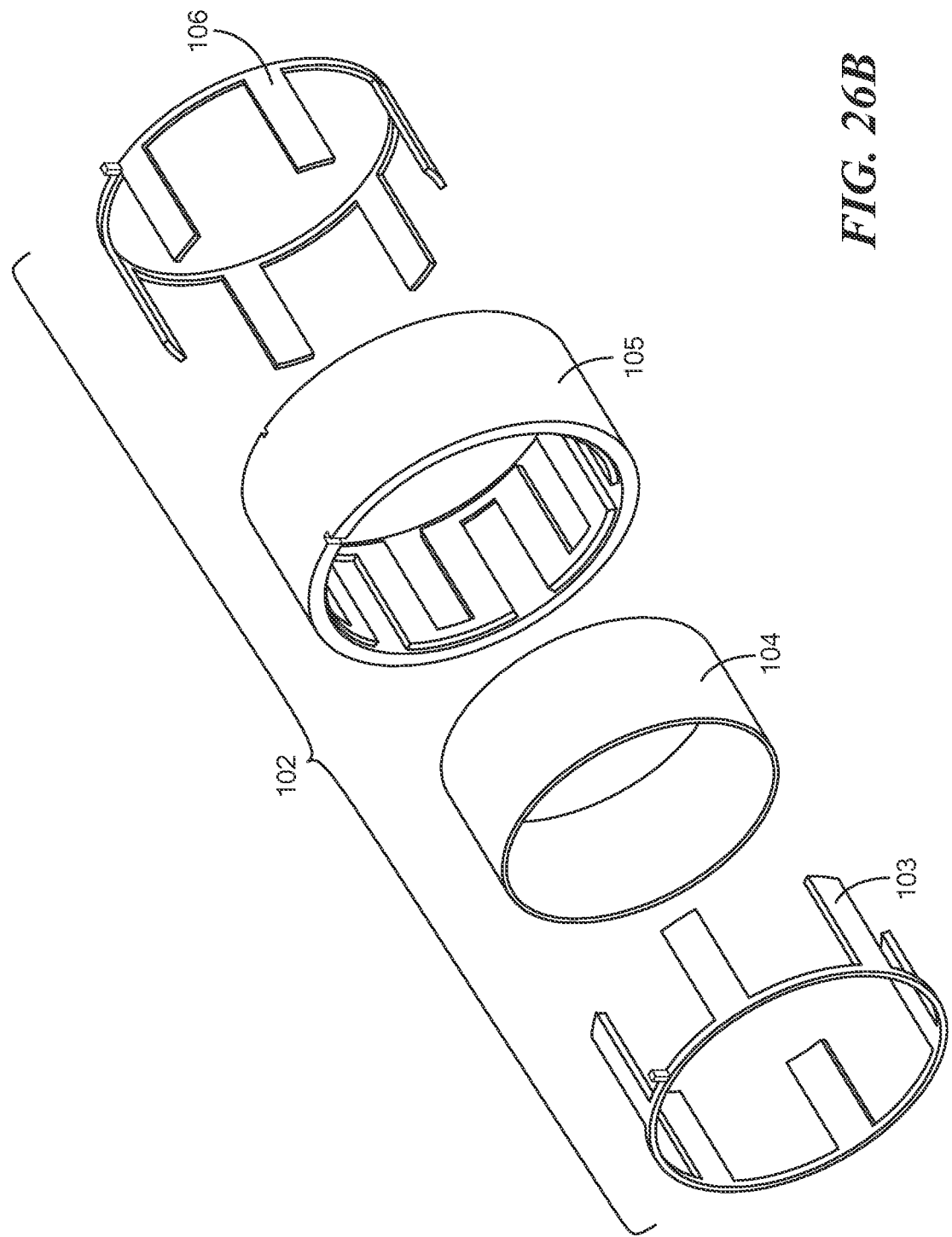
FIG. 26B shows an exploded view of the stator shown in FIG. 26A, according to an embodiment of the present invention.
Figure 26C:
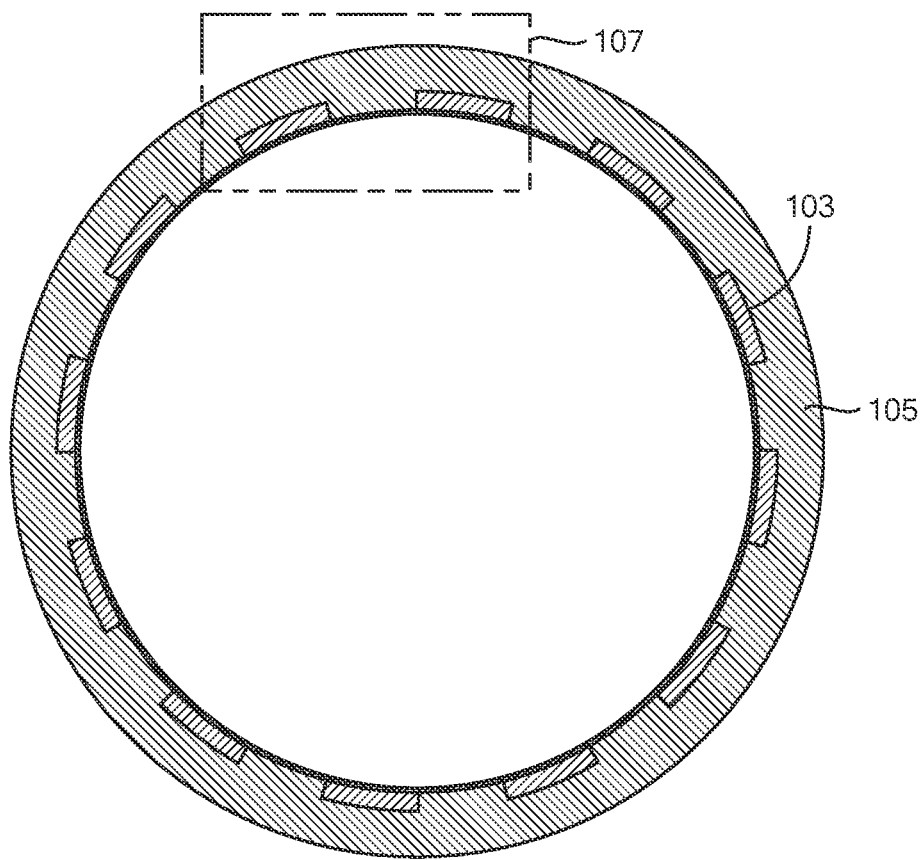
FIG. 26C shows a front section view of the stator shown in FIG. 26A, according to an embodiment of the present invention
Figure 26D:
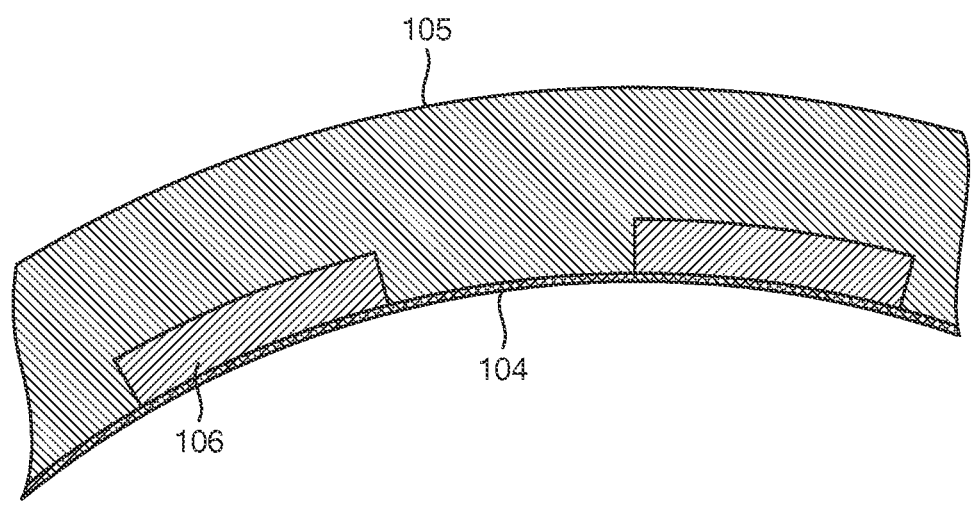
FIG. 26D shows an enlarged area of detail of the stator shown in FIG. 26A, according to an embodiment of the present invention.

FIGS. 26A, 26B, 26C, and 26D show a stator for an electrostatic machine that can sustain a dielectric barrier discharge between electrodes. FIG. 26A shows an oblique projection view of the stator. FIG. 26B shows an exploded view 102 of the stator, which comprises a first set of electrically common electrodes 103, a second set of electrically common electrodes 106, and an electrically insulating substrate material 105 that provides mechanical support for 103 and 106. A thin layer of dielectric insulation 104 covers the surfaces of the electrodes 103 and 106. FIG. 26C shows a front section view of the stator shown in FIGS. 26A and 26B. FIG. 26D shows an enlarged view of the area 107 shown in FIG. 26C. In FIG. 26D, the thin layer of dielectric insulation 104 is seen to cover the inward-facing surfaces of the stator electrodes 106. The insulation 104 prevents an electrical arc from forming when adjacent stator electrodes are energized with a high voltage between them, and instead causes a dielectric barrier discharge to form.

Unequal Numbers of Rotor Electrodes and Stator Electrodes

Figure 33A:
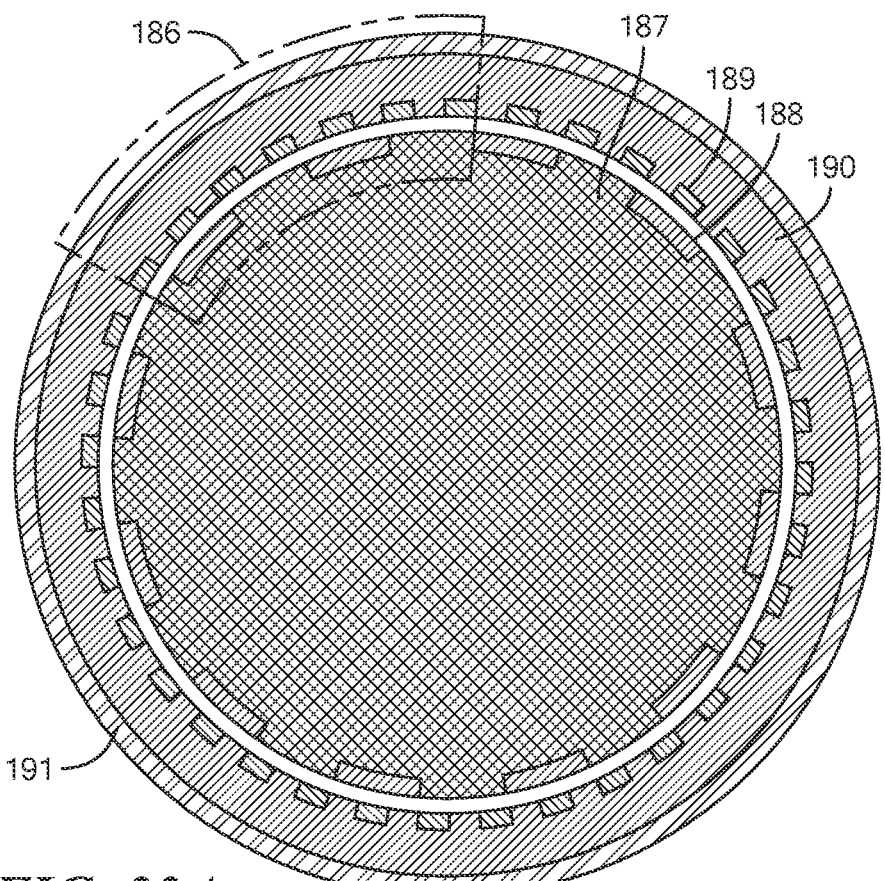
FIG. 33A shows a front section view of an electrostatic machine in which the number of electrodes on the stator exceeds the number of electrodes on the rotor, according to an embodiment of the present invention.
Figure 33B:
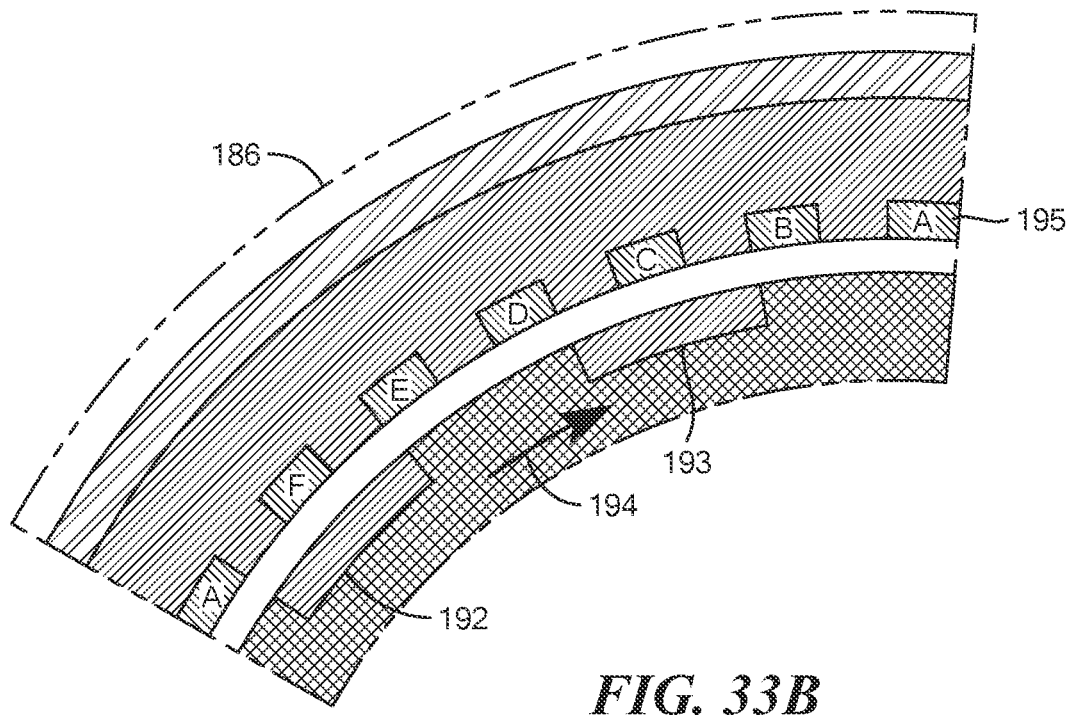
FIG. 33B shows an enlarged view of an area of the electrostatic machine shown in FIG. 33A, according to an embodiment of the present invention.
Figure 33C:
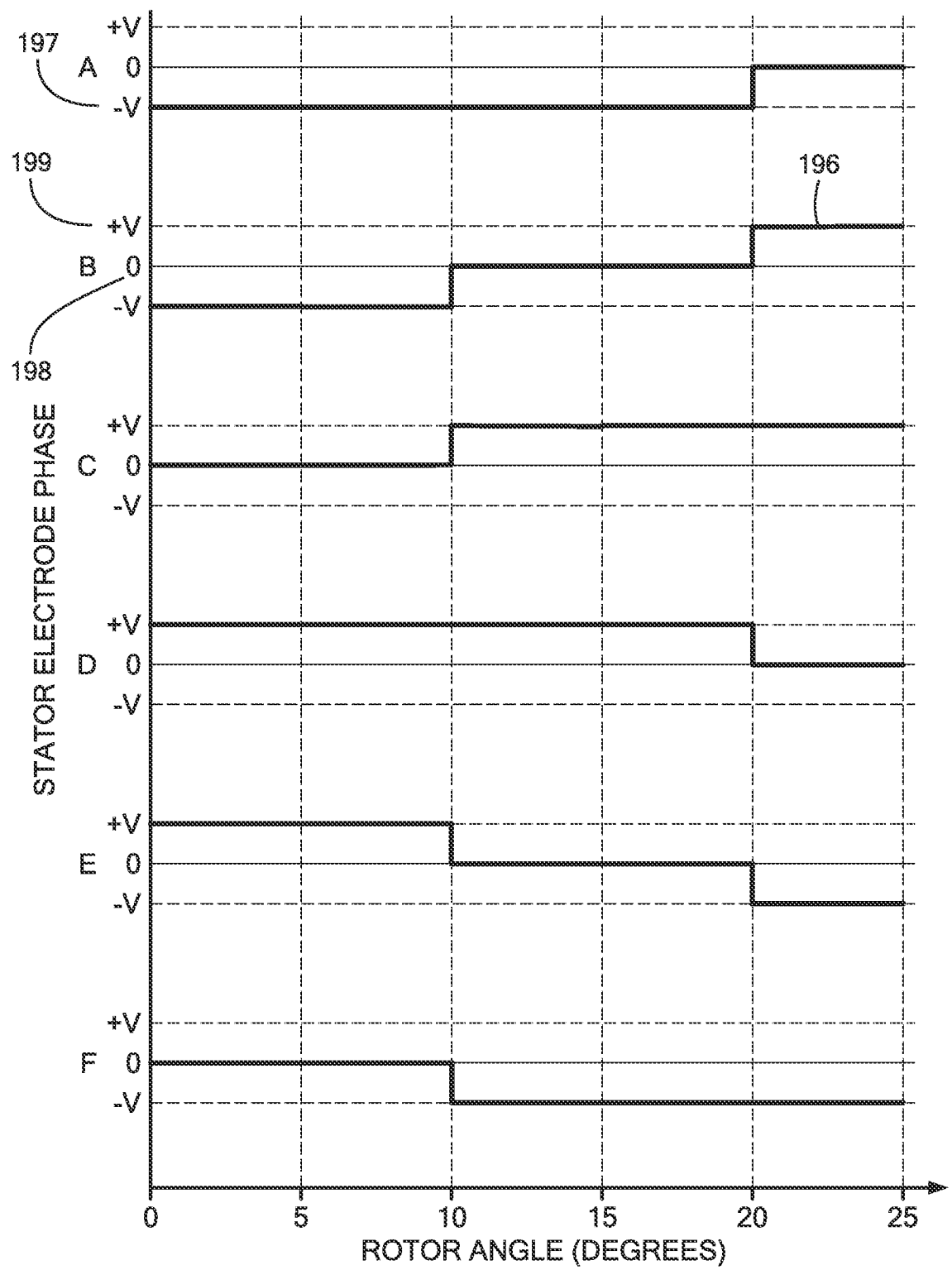
FIG. 33C shows an electrical commutation diagram for the electrostatic machine shown in FIGS. 33A-B, according to an embodiment of the present invention.

In another embodiment, the number of stator electrodes exceeds the number of electrodes or charged surfaces on a rotor by a factor of two or more. FIG. 33A shows a front section view of an electrostatic machine in which the stator electrodes are more numerous than the rotor electrodes. In FIG. 33A the stator electrodes are disposed such that the angle subtended by a plurality of adjacent stator electrodes 189 is equal to the angle subtended by a single rotor electrode 188 (herein, the phrase "rotor electrode" shall be understood to be equivalent to "charged surface on the electrode"). FIG. 33B shows an enlarged view of the area 186 shown in FIG. 33A. In FIG. 33B, the stator electrodes are marked with letters A, B, C, D, E, or F. The alphabetical progression of labelled electrodes A-B-C-D-E-F should be understood to repeat six times about the circumference of the stator shown in FIG. 33A, such that there are six electrodes bearing each alphabetical label on the stator. All six electrodes bearing a common letter label comprise an electrically common group, or phase, that can be energized independent of the other phases. FIG. 33C is a diagram that illustrates one method for energizing the phases A, B, C, D, E, and F to provide high torque to the rotor and cause rotation in the direction indicated by arrow 194. FIG. 33C shows a voltage plot 196 applied to each phase as a function of the rotor angle, where an angle of zero degrees corresponds to the configuration shown in FIG. 33B. The voltage on a stator electrode can be controlled to any value, but for explanatory purposes the plot in FIG. 33C restricts the voltage to three values, a minimum voltage −V (197), a zero voltage (198), and a maximum voltage (199).

The advantage of controlling the stator fields in the above described manner is that the circumferential force between counterfacing electrodes charged to opposite potentials depends on the extent to which the electrodes are misaligned. If the electrodes are perfectly aligned, and of opposite sign, the circumferential force vanishes. Conversely, there is an angle of misalignment between electrodes of opposite sign which produces a maximum circumferential force, and therefore a maximum torque on the rotor. By controlling the rate at which the sequence described above is performed, the circumferential force can be maintained at high levels, because the arrangement of electrodes enables commutation patterns that prevents counterfacing electrodes of opposite charge from becoming perfectly aligned in a stable, minimum energy configuration.

Water-Based Solution Dielectrics

Another embodiment uses water, or a solution of predominately water, as a dielectric fluid of an electrostatic machine operated as a motor to produce very high torques. Water has a very high relative permittivity of approximately 80. In an electrostatic machine, a high permittivity is desirable for a dielectric fluid between stator and rotor electrodes because the mechanical torque output of the machine is approximately proportional the relative permittivity. A disadvantage of using water, or solutions of predominately water, is that such materials break down after a brief period of time, approximately microseconds to milliseconds in duration depending on the particular composition of the solution, the purity of the solution, among other conditions.

Solutions containing water and additives, such as glycol or methanol, are advantageous for extending the period of time for which a high-voltage can be applied to the solution before it breaks down. As used herein, solutions containing pure water or pure water with additive chemicals are collectively referred to as "water-based solutions."

In this embodiment, electrical power is provided to the motor in the form of a succession of brief, high-voltage pulses. For example, the pulses can be provided by a plurality of pulse-forming networks (PFNs), a class of electrical devices known to practitioners of the art which store electrical energy and then release a brief, high-voltage pulse when commanded to do so by a control signal.

After a high-voltage pulse is applied to a pair of electrodes that have a water-based solution between them, a period of time elapses during which the breakdown strength of the water in the region between the electrodes is reduced, known as the recovery time. If a second pulse follows a first pulse between a pair of electrodes before the recovery time has elapsed, the water-based solution may break down. Therefore, the duration of time between pulses is selected to enable the water-based solution to recover to a high breakdown strength.

In an alternative method of operations, electrical pulses are applied to different regions of the stator in successive rotation to provide for recovery time to each region. A further advantage of applying electrical pulses to different regions in successive rotation is that the net torque applied to the rotor more closely approximates a continuous torque than if the pulses were applied simultaneously to all stator regions.

The electrodes of the rotor and stator can be coated with a thin dielectric layer, such as diamond deposited by chemical vapor deposition, to increase the breakdown voltage between the electrodes.

The water can be heated, as described herein, to reduce its viscosity.

The water can be pressurized, which significantly increases its breakdown voltage and decreases its recovery time.

Thin-Wall Cylinder Electrostatic Motor Manufacture

Another embodiment is a method for manufacturing an electrostatic machine from thin-walled cylinders, in which the stator comprises a plurality of concentric, thin-walled cylindrical shells, and in which the rotor also comprises a plurality of concentric, thin-walled cylindrical shells. In some embodiments, the cylindrical surfaces that bound the cylindrical shells of the rotor and stator are curvilinear. An advantage of cylindrical shells bounded by curvilinear cylinders is that such shells can be designed to have double curvature, also known as anticlastic curvature. Thin shells of material become significantly more rigid when formed into a surface characterized by double curvature. The high rigidity provided by a doubly curved shell enables less material to be used than if a straight cylindrical shell were used. Therefore, doubly curved cylindrical shells are advantageous for constructing a light-weight electrostatic machine.

Thin-walled cylindrical shells are formed by deep drawing sheets of thin metal, such as sheets of 100 micrometer-thick steel. A plurality of forming dies of different sizes are used to fabricate a plurality of cylinders that can be nested inside of one another without touching each other. Each forming die is shaped such that the metal that is formed by the die is in the shape of a cylindrical shell, such as a cylindrical shell bounded by curvilinear cylinders. After forming by deep drawing, each cylinder is coated with a dielectric material, such as aluminum oxide, such as by a plasma electric arc coating process. Metal is then patterned on the dielectric surfaces to form electrodes, using methods known to practitioners of the art, such as electroplating, electroless plating and selective etching. Next, the plurality of cylinders that comprise the stator are attached concentrically to a supporting member, such as by ultrasonic welding. The plurality of cylinders that comprise the rotor are similarly attached concentrically to a supporting member.

Figure 29B:
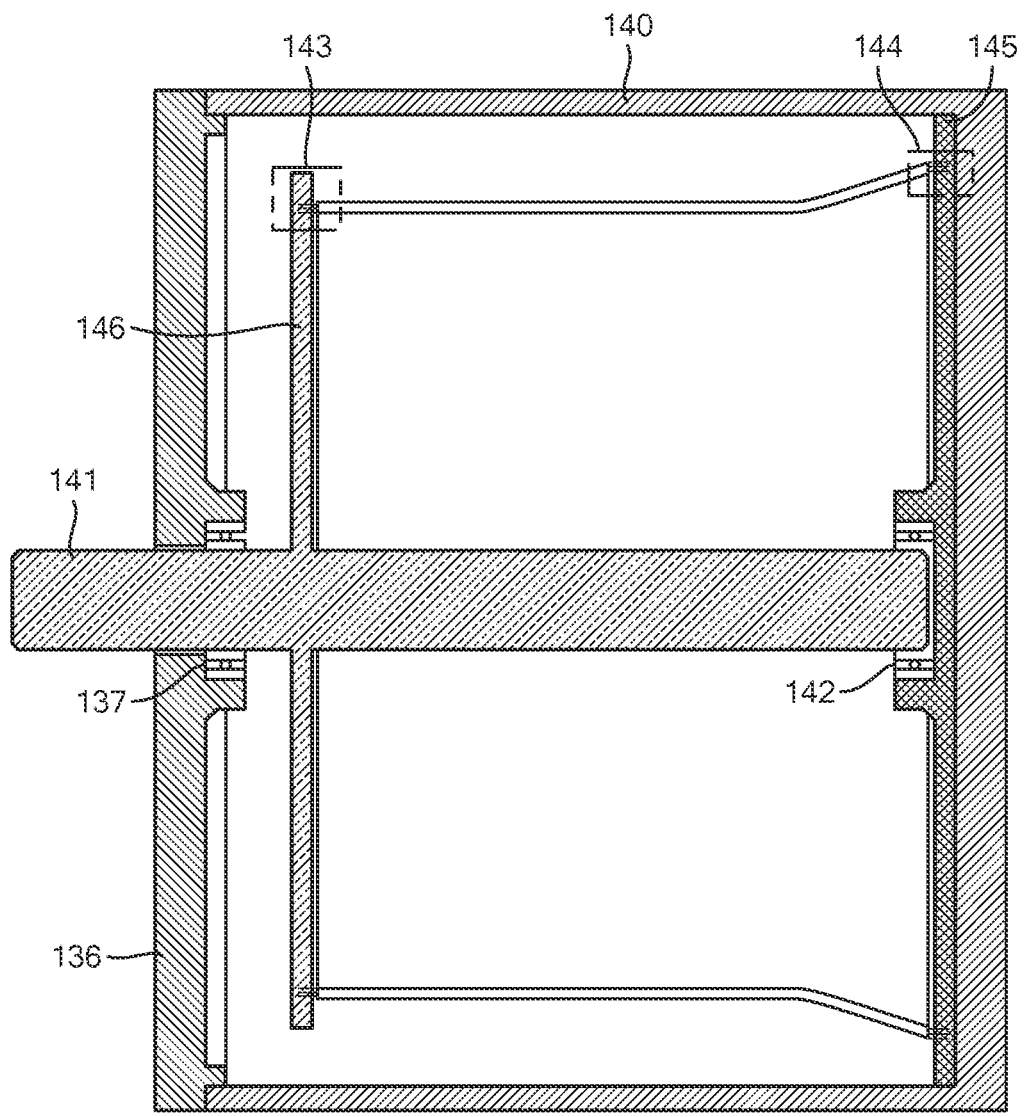
FIG. 29B shows a side section view of the electrostatic machine shown in FIG. 29A, according to an embodiment of the present invention.
Figure 29C:
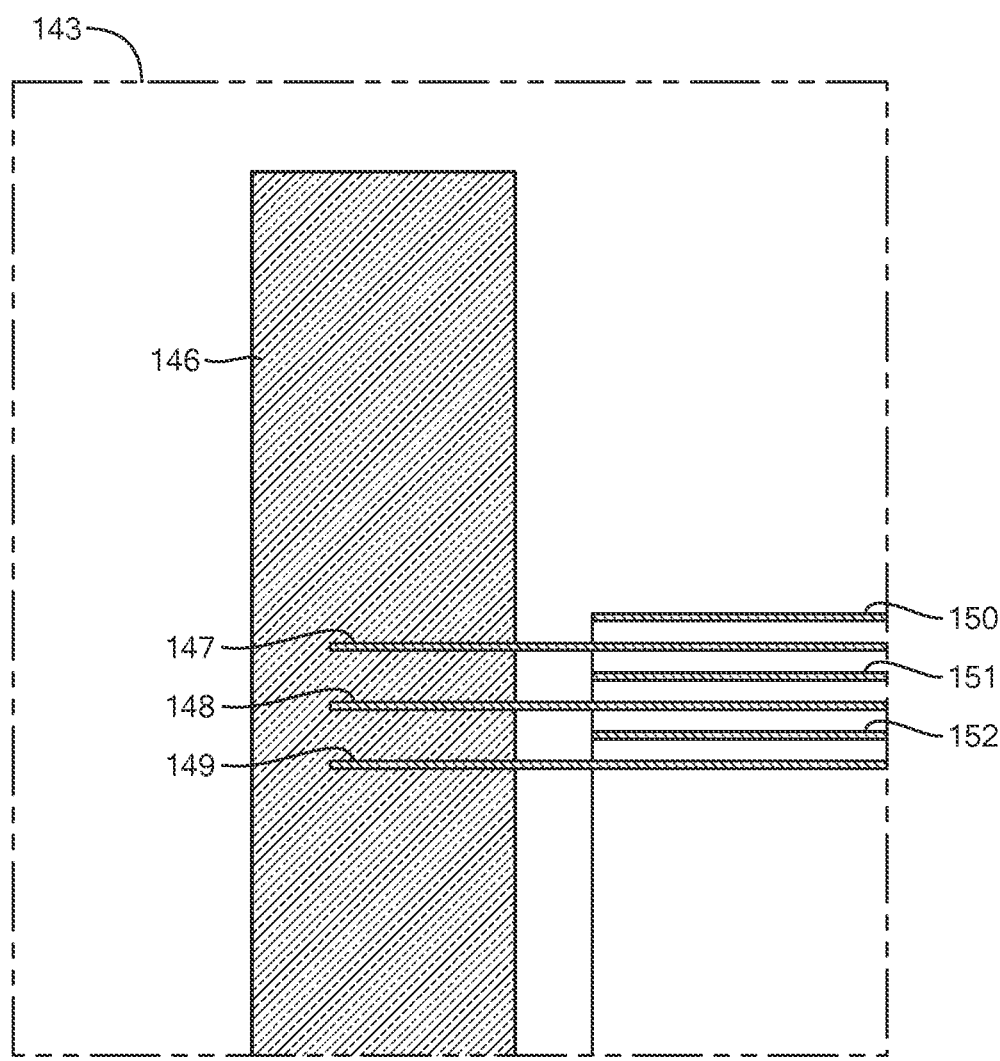
FIG. 29C shows a detail area of the rotor of the machine shown in FIGS. 29A-B, according to an embodiment of the present invention.
Figure 29D:
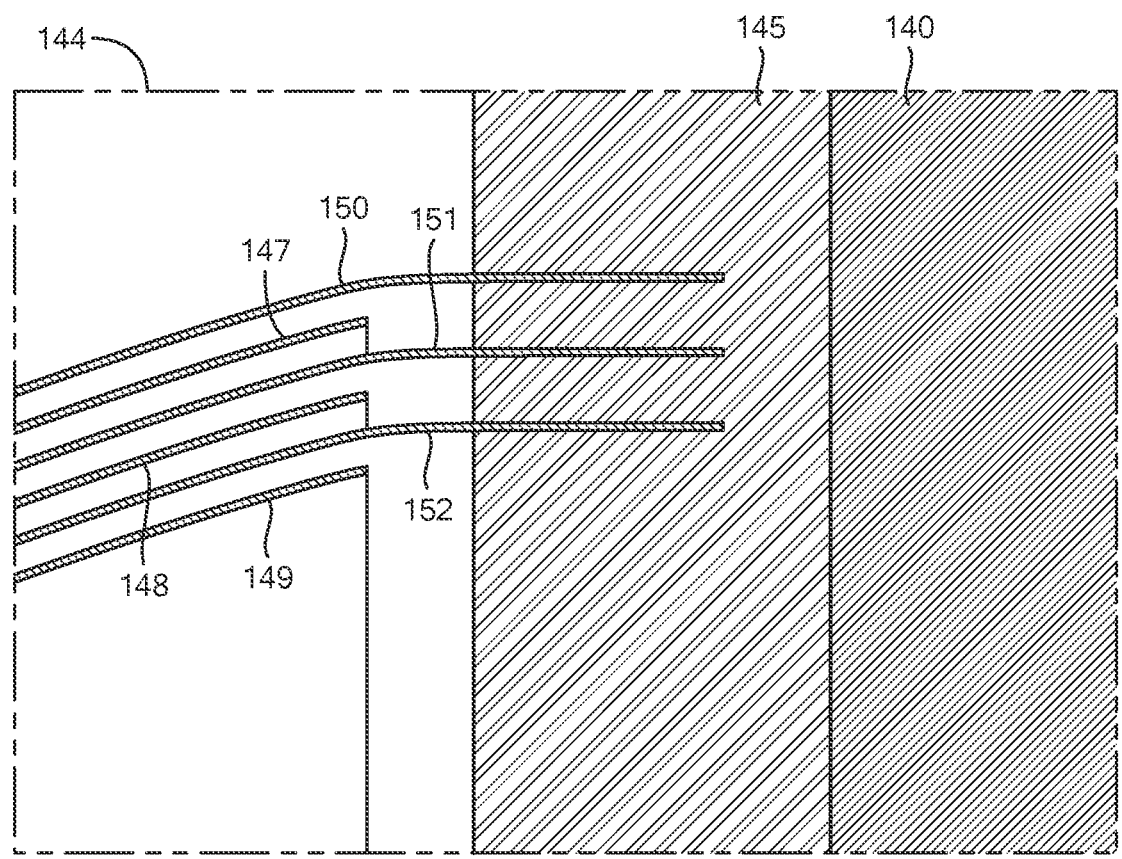
FIG. 29D shows a detail area of the stator of the machine shown in FIGS. 29A-B, according to an embodiment of the present invention.

FIG. 29A shows an exploded view 135 of an electrostatic machine, the rotor 138 of which and the stator 139 of which are each comprised of a plurality of a thin-walled cylinders with double curvature, manufactured as described above. FIG. 29B shows a side section view of the electrostatic machine of FIG. 29A. In FIG. 29B, a front 137 and rear 142 bearing support a shaft. A supporting member for rotor shells 146 is attached to the shaft. A supporting member for stator shells 145 is attached to a case 140, and the case is enclosed by a front panel 136. FIG. 29C shows an enlarged view of the area 143 shown in FIG. 29B. In FIG. 29C, three rotor shells 147, 148, and 149 are interleaved with three stator shells 150, 151, and 152. FIG. 29D shows an enlarge view of the area 144 shown in FIG. 29B. In FIG. 29D, the curved portions of both the stator shells and rotor shells are shown.

FIGS. 29A, 29B, 29C, and 29D show a configuration with three stator shells and three rotor shells. More rotor shells and stator shells can be added to increase the power of the electrostatic machine. In FIGS. 29C and 29D, the thin shells are cross-hatched with a single hatch pattern, which illustrates just the configuration of the metal shell material, and not the very thin layers of dielectric and electrode that are patterned on the metal shells 148-152. Although the thin dielectric layer and electrode layers are not shown in FIGS. 29C and 29D, they should be understood to be present and part of the embodiment.

Wire-tensioning

Another embodiment comprises a system for depositing thin wires to form electrode arrays on cylindrical surfaces, such as the cylindrical surfaces comprising the rotor or stator of an electrostatic machine. Methods are known for depositing wires on flat surfaces, and adhering the wires to the flat surfaces, for the purpose of creating printed circuit boards. This embodiment of the invention includes a method for depositing wires on a cylindrical surface to form an array of electrode comprising the rotor or stator of an electrostatic machine.

It is advantageous to form electrode arrays from wires because the cross-sectional shape of a wire can be selected to reduce the occurrence of electrical breakdown when a large difference in electrical potential is applied between nearby wires. Most methods for depositing conductors on surfaces apply thin films of metal, forming flat electrodes with approximately rectangular cross-sectional shapes. The sharp edges of a rectangular conductor cause a large electric field gradient to exist near the edges, which may cause electrical breakdown to occur.

In this embodiment, a plurality of tensioned spools each hold a substantial length of wire that may have a circular cross-sectional shape, or may have another cross-sectional shape, such as a rectangle with rounded corners. The free ends of wires wrapped around each spool are inserted into one of a plurality of parallel guide channels in a deposition tool. The guide channels in the deposition tool are arranged to be parallel to a cylindrical surface, such that wires exit the deposition tool parallel to one another, and in a cylindrical pattern near the cylindrical surface. The wires are drawn across a cylindrical surface of a rotor or stator upon which the wires are to be attached. The free ends of the wire are then placed into a clamping tool, which comprises a plurality of guide channels and a moveable member that applies force to the wires to prevent them from sliding out of the channels. When wires are suspended between the deposition tool and the guide tool, the arrangement of guide channels in both tools causes the suspended wires to be approximately parallel to one another. The deposition tool and clamping tool may be moved toward the cylindrical surface upon which the wires are to be attached, causing the wires to contact the surface. Alternatively, the cylindrical surface can be moved toward the tensioned wires suspended between the deposition tool and clamping tool. The cylindrical surface comprises a dielectric material that can adhere the wires to the surface, such as an epoxy, thermoplastic, or ceramic slurry. Methods for attaching wires to flat circuit boards are known to persons having ordinary skill in the art. The surface may be heated or energized to bond the wires to the surface, or to submerge the wires, depending on the composition of the dielectric material that comprises the cylindrical surface. Dielectric can also be deposited on top of the wires to attach them to the surface, such as by spray coating or by centrifugal casting.

A cutting blade severs the ends of the wires after the wires have been attached to the cylindrical surface. The cutting blade is attached to a computer-controlled positioning system that is used to designate the wires that are cut and to control the motion of the cutting blade.

Next, the severed ends of the wires can be electrically connected to one another by attaching them to a common conductor. For example, a metal ring can be attached to one end of the cylinder, and the severed ends can be attached to the ring, such as by laser welding, ultrasonic welding, or soldering the ends to the ring. An interdigitated electrode array can be manufactured by attaching rings to both ends of a cylinder, and connecting a portion of wires to one ring, and the remaining portion to the opposite ring. Multiple rings can be connected to each end of the cylinder, and a portion of the wires may be connected to each ring, thereby enabling subsets of the wires on the cylinder to be controlled to different electrical potentials by adjusting the potentials applied to each ring.

The tension in each the wires may be controlled by measuring wire tension with a load cell attached to the clamping tool, and can be adjusted by adjusting the distance between the clamping tool and deposition tool.

In an alternative version of the embodiment, a plurality of clamping tools are each attached to a separate load cell, and each clamping tool holds one wire. The distances between the clamping tools and the deposition tool are individually adjusted to control the tension in each wire separately and precisely. This alternate version is advantageous for use with weak wires that may easily break upon application of excessive tensioning force.

The tension in each spool can be controlled using methods known to persons with ordinary skill in the art. For example, the position of the clamping tool can be controlled using a linear actuator such that a desired force measurement is recorded on the load cell installed between the actuator and the clamping tool. Alternatively, a mechanical brake, such as a magnetic particle brake, can inhibit rotation of a spool to maintain a desired wire tension as a clamping tool is moved. Tension may be applied to a spool using a spring, such as a constant-force spring, an electrical motor, such as a brushless direct current motor, a rotational voice coil, or a weight suspended on a cord that is wrapped around a shaft connected to a spool.

REFERENCES

[1] R. Aflatouni, "Method for improving the efficiency of discharging capacitive loads in H-bridge switching networks," U.S. Pat. No. 6,087,863, Jul. 11, 2000.

[2] John G. Trump, "Vacuum Electrostatic Engineering," Massachusetts Institute of Technology, 1933.

[3] R. J. Baker and B. P. Johnson, "Stacking power MOSFETs for use in high speed instrumentation," Rev. Sci. Instrum., vol. 63, no. 12, pp. 5799-5801, Dec. 1992, doi: 10.1063/1.1143366.

[4] W. C. Johnson, "Design and Analysis of Macro Switched Impedance Motors," p. 145, 2011.

[5] W. C. Johnson, "Axially gapped electrostatic machine having drive structure configured to recycle charge," U.S. Pat. No. 10,056,848, Aug. 21, 2018.

[6] M. A. Petrowsky, M. J. Erickson, D. C. Ludois, W. Mason, and J. K. Reed, "Electrostatic machine system and method of operation," U.S. Pat. No. 9,866,148, Jan. 9, 2018.

[7] R. F. Post, "Electrostatic generator/motor having rotors of varying thickness and a central stator electrically connected together into two groups," U.S. Pat. No. 7,834,513, Nov. 16, 2010.

[8] M. Garg, D. J. Baldwin, and B. XIAO, "Driver for capacitive loads," WO 2013/188616A1, Dec. 19, 2013.

[9] A. Fitzi and S. Dobretsberger, "Method for Switching an Electrical Load in a Bridge Branch of a Bridge Circuit, and Bridge Circuit," US 2011/0309803A1, Dec. 22, 2011.

While the invention is described through the above-described exemplary embodiments, modifications to, and variations of, the illustrated embodiments may be made without departing from the inventive concepts disclosed herein. For example, although specific parameter values, such as voltages, materials, thicknesses, spacings and numbers of electrodes, may be recited in relation to disclosed embodiments, within the scope of the invention, the values of all parameters may vary over wide ranges to suit different applications. Unless otherwise indicated in context, or would be understood by one of ordinary skill in the art, terms such as "about" mean within +20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or," unless explicitly so stated.

As used herein, including in the claims, an element described as being configured to perform an operation "or" another operation is met by an element that is configured to perform only one of the two operations. That is, the element need not be configured to operate in one mode in which the element performs one of the operations, and in another mode in which the element performs the other operation. The element may, however, but need not, be configured to perform more than one of the operations.

Although aspects of embodiments may be described with reference to flowcharts and/or block diagrams, functions, operations, decisions, etc. of all or a portion of each block, or a combination of blocks, may be combined, separated into separate operations or performed in other orders. References to a "module," "operation," "step" and similar terms are for convenience and not intended to limit their implementation. All or a portion of each block, module, operation, step or combination thereof may be implemented as computer program instructions (such as software), hardware (such as combinatorial logic, Application Specific Integrated Circuits (ASICs), Field-Programmable Gate Arrays (FPGAs), processor or other hardware), firmware or combinations thereof.

The switch controller, control circuit, etc. or portions thereof may be implemented by one or more suitable processors executing, or controlled by, instructions stored in a memory. Each processor may be a general-purpose processor, such as a central processing unit (CPU), a graphic processing unit (GPU), digital signal processor (DSP), a special purpose processor, etc., as appropriate, or combination thereof.

The memory may be random access memory (RAM), read-only memory (ROM), non-volatile memory (NVM), non-volatile random access memory (NVRAM), flash memory or any other memory, or combination thereof, suitable for storing control software or other instructions and data. Instructions defining the functions of the present invention may be delivered to a processor in many forms, including, but not limited to, information permanently stored on tangible non-transitory non-writable storage media (e.g., read-only memory devices within a computer, such as ROM, or devices readable by a computer I/O attachment, such as CD-ROM or DVD disks), information alterably stored on tangible non-transitory writable storage media (e.g., floppy disks, removable flash memory and hard drives) or information conveyed to a computer through a communication medium, including wired or wireless computer networks. Moreover, while embodiments may be described in connection with various illustrative data structures, database schemas and the like, systems may be embodied using a variety of data structures, schemas, etc.

Disclosed aspects, or portions thereof, may be combined in ways not listed herein and/or not explicitly claimed. In addition, embodiments disclosed herein may be suitably practiced, absent any element that is not specifically disclosed herein. Accordingly, the invention should not be viewed as being limited to the disclosed embodiments.

As used herein, numerical terms, such as "first," "second" and "third," are used to distinguish respective windings, types of distance, polarities, groups of electrodes, etc. from one another and are not intended to indicate any particular order or total number of windings, types of distance, polarities, groups of electrodes, etc. in any particular embodiment. Thus, for example, a given embodiment may include only a second group of electrodes.

What is claimed is:

1. A control circuit for an electrostatic machine, the control circuit comprising:
    a current source or sink;
    an inductor;
    a switching network coupled between the current source or sink and the electrostatic machine, and between the inductor and the electrostatic machine; and
    a controller configured to automatically cause the switching network to:
        connect the current source or sink to the electrostatic machine each half-cycle of a periodically alternating polarity of the electrostatic machine;
        at each polarity alternation of the electrostatic machine, isolate the electrostatic machine from the current source or sink for a first period of time; and
        at each polarity alternation, connect the inductor to the electrostatic machine for a second period of time while the electrostatic machine is isolated from the current source or sink, and then disconnect the inductor from the electrostatic machine.

2. A control circuit according to claim 1, wherein the current source or sink comprises a DC source.

3. A control circuit according to claim 1, wherein the current source or sink comprises an AC source.

4. A control circuit according to claim 1, wherein the current source or sink comprises a DC sink.

5. A control circuit according to claim 1, wherein the current source or sink comprises an AC sink.

6. A control circuit according to claim 1, wherein the inductor is configured to form a resonant circuit with capacitance of the electrostatic machine, the resonant circuit having a resonant frequency related to a speed of operation of the electrostatic machine.

7. A control circuit according to claim 1, further comprising a snubber in parallel with the inductor.

8. A control circuit according to claim 1, wherein:
    the switching network comprises an H-bridge comprising a first switch, a second switch, a third switch, and a fourth switch;
    one terminal of the first switch is coupled to one terminal of the third switch at a first node, and the first node is connected to a first terminal of the current source or sink;
    one terminal of the second switch is coupled to one terminal of the fourth switch at a second node, and the second node is connected to a second terminal of the current source or sink;
    the first switch is coupled in series with the second switch at a third node, wherein the third node is on an opposite side of the first switch from the first node, and on an opposite side of the second switch from the second node;
    the third switch is coupled in series with the fourth switch at a fourth node, wherein the fourth node is on an opposite side of the third switch from the first node, and on an opposite side of the fourth switch from the second node; and
    the third and fourth nodes are connected to respective terminals of the electrostatic machine;
    the switching network comprises a fifth switch;
    the fifth switch is in series with the inductor to form a series arrangement, and the series arrangement is connected between the third and fourth nodes; and
    the controller is configured to automatically repeatedly actuate the first, second, third, fourth and fifth switches such that:
        the first, second, third and fourth switches open and close to repeatedly alternate polarity of the first and second nodes;
        at each polarity alternation, the first, second, third and fourth switches are open for at least the first period of time; and
        at each polarity alternation, the fifth switch is closed for the second period of time while all of the first, second, third and fourth switches are open, and then the fifth switch is open.

* * * * *